United States Patent [19]

Texter et al.

[11] Patent Number: 5,624,467
[45] Date of Patent: Apr. 29, 1997

[54] MICROPRECIPITATION PROCESS FOR DISPERSING PHOTOGRAPHIC FILTER DYES

[75] Inventors: John Texter, Rochester; William B. Travis, Holcomb; Vincent J. Flow, Kendall, all of N.Y.

[73] Assignee: Eastman Kodak Company, Rochester, N.Y.

[21] Appl. No.: 812,503

[22] Filed: Dec. 20, 1991

[51] Int. Cl.$^6$ ........................................ G03C 1/00
[52] U.S. Cl. .................. 23/295 R; 252/351; 430/546; 430/552; 430/558
[58] Field of Search .................. 430/546, 552, 430/558; 252/351; 106/22, 22 A, 22 B, 22 C, 22 D, 22 E, 22 F, 22 H, 22 K, 22 R; 23/295 R

[56] References Cited

U.S. PATENT DOCUMENTS

| | | | |
|---|---|---|---|
| 2,274,782 | 3/1942 | Gasper | 95/2 |
| 2,581,414 | 1/1952 | Hochberg | 241/22 |
| 2,855,156 | 10/1958 | Hochberg et al. | 241/22 |
| 3,765,897 | 10/1973 | Nittel | 96/100 |
| 4,092,168 | 5/1978 | Lemahieu et al. | 96/84 |
| 4,294,916 | 10/1981 | Postle et al. | 430/522 |
| 4,294,917 | 10/1981 | Postle et al. | 430/522 |
| 4,388,403 | 6/1983 | Hellig et al. | 430/546 |
| 4,770,984 | 9/1988 | Ailliet et al. | 430/505 |
| 4,803,150 | 2/1989 | Dickerson et al. | 430/502 |
| 4,855,221 | 8/1989 | Factor et al. | 430/510 |
| 4,857,446 | 8/1989 | Diehl et al. | 430/510 |
| 4,877,721 | 10/1989 | Diehl et al. | 430/522 |
| 4,900,652 | 2/1990 | Dickerson et al. | 430/502 |
| 4,900,653 | 2/1990 | Factor et al. | 430/522 |
| 4,904,565 | 2/1990 | Schmidt et al. | 430/264 |
| 4,933,268 | 6/1990 | Ohno et al. | 430/518 |
| 4,940,654 | 7/1990 | Diehl et al. | 430/522 |
| 4,948,717 | 8/1990 | Diehl et al. | 430/510 |
| 4,950,586 | 8/1990 | Diehl et al. | 430/507 |
| 4,957,857 | 9/1990 | Chari | 430/546 |
| 4,970,139 | 11/1990 | Bagchi | 430/449 |
| 4,988,611 | 1/1991 | Anderson et al. | 430/494 |
| 4,994,356 | 2/1991 | Diehl et al. | 430/522 |
| 5,008,179 | 4/1991 | Chari et al. | 430/546 |
| 5,015,564 | 5/1991 | Chari | 430/546 |
| 5,158,863 | 10/1992 | Bagchi et al. | 430/449 |

FOREIGN PATENT DOCUMENTS

| | | |
|---|---|---|
| 0351593 | 1/1990 | European Pat. Off. . |
| 1193349 | 5/1970 | United Kingdom . |
| 1570362 | 7/1980 | United Kingdom . |
| WO88/04794 | 6/1988 | WIPO . |

OTHER PUBLICATIONS

Gutoff et al, "Dispersions of Spherical Dye Particles by Continuous Precipitation", The American Institute of Chemical Engineers Symposium Series, No. 193, vol. 76, pp. 43–51, 1980 (no month).

Primary Examiner—Gary P. Straub
Assistant Examiner—Timothy C. Vanoy
Attorney, Agent, or Firm—Robert A. Gerlach; Carl F. Ruoff

[57] ABSTRACT

A process is provided for preparing microprecipitated dispersions of filter dyes by preparing a concentrated slurry in aqueous medium of a filter dye having ionizable acid sites on the dye molecule, adding sufficient aqueous hydroxide to dissolve the filter dye, acidifying the solution with a stoichiometric amount of acidic protons to reprotonate up to 100% of the total ionizable acid sites on the dye molecule and provide a microprecipitated dispersion of the filter dye that is insoluble in aqueous media at pH values less than 3 but soluble in aqueous media at pH greater than 10.

30 Claims, 6 Drawing Sheets

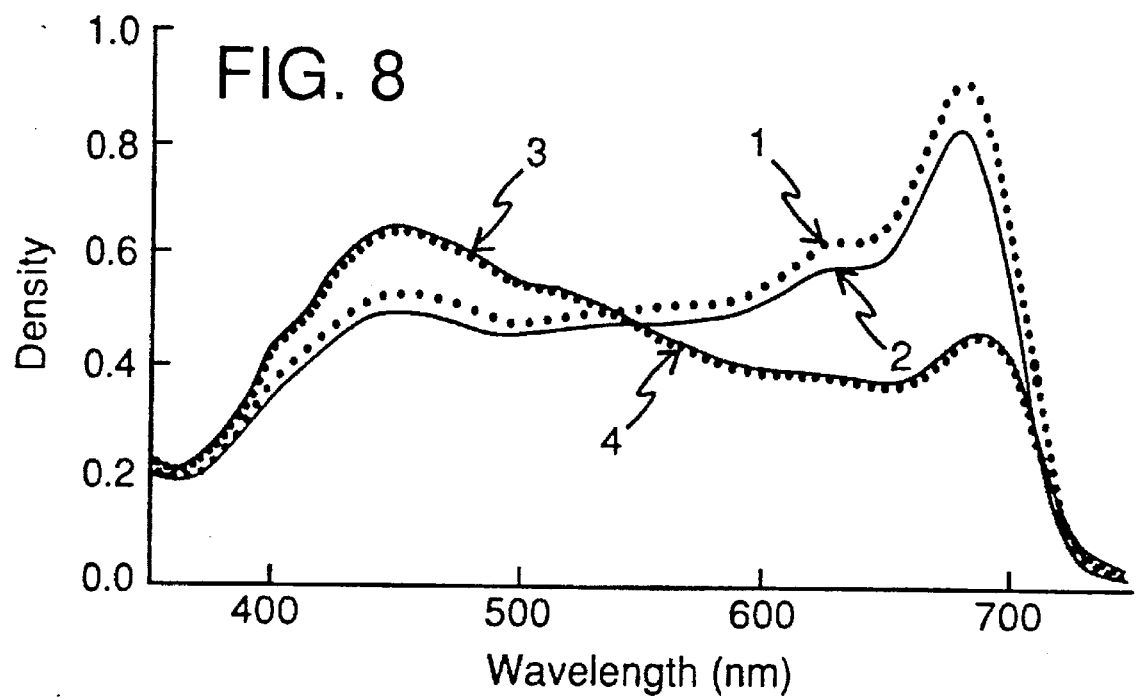

MICROPRECIPITATION PROCESS FOR DISPERSING PHOTOGRAPHIC FILTER DYES

This application relates to commonly assigned application Ser. No. 812,519 of John Texter, for Microprecipitated Methine Oxonol Filter Dye Dispersions, filed simultaneously herewith, now U.S. Pat. No. 5,274,109, and hereby incorporated herein by reference for all that it discloses.

TECHNICAL FIELD

This invention relates to a process for the production of microprecipitated dispersions of filter dyes. More particularly, this invention relates to a process for producing microprecipitated filter dye dispersions having particularly advantageous properties when used in photographic elements.

BACKGROUND ART

The use of filter dyes in photographic elements is well known. Filter dyes may be located in radiation-sensitive layers, in overcoat layers, in layers adjacent to radiation-sensitive layers, in interlayers in multilayer elements, in undercoat and antihalation layers, and on the side of the support opposite the radiation sensitive layer. When incorporated in the radiation sensitive layer, filter dyes can improve sharpness by absorbing light scattered from one silver halide grain to another. Filter dyes can also be used in antihalation layers to retard the sensitivity of one light sensitive layer to another in a multilayer element by absorbing unwanted radiation due to reflection or refraction.

In these as well as the many other uses for filter dyes in photographic elements described, for example, in U.S. Pat. No. 4,855,221, it is important that the dyes do not wander or diffuse into adjacent layers. Filter dyes must also be completely decolorized or removed from photographic elements, or both, usually during processing when their function is complete, or staining results. The latter problem is compounded when a polymeric mordant is used in the filter layer to prevent dye wandering.

Filter dye stability, particularly at high temperature and humidity conditions is also important. It is often also highly desirable that the filter dye has a steep absorption peak; that is, that the dye is "sharp cutting".

One method used to incorporate soluble filter dyes into photographic film element layers involves adding them as aqueous or alcohol solutions. Dyes introduced by this method often wander into other layers of the element, usually with deleterious effect. While the use of polymeric mordants can prevent dye wandering, such mordants aggravate the stain problem encountered when the dye remains in the element through processing.

Filter dyes have also been prepared as conventional dispersions in aqueous gelatin using standard colloid milling or homogenization methods or as loaded latexes. More recently, ball-milling, sand milling, media-milling, and related methods of producing fine particle size slurries and suspensions of filter dyes have become standard tools for producing slurries and dispersions that can readily be used in photographic melt formulations. Solid particulate filter dyes introduced as dispersions, when coated at sufficiently low pH, can eliminate problems associated with dye wandering. However, filter dye dispersions prepared by milling tend to have slow wash-out rates resulting in lengthy processing or unacceptable dye staining. Further, milled particulate filter dyes provide relatively low absorption coefficients, requiring that an excessive amount of dye be coated. Among other things, milled dyes can also provide too broad an absorption envelope for the contemplated use; the wavelength of maximum absorption may not be at optimal position in the visible region, or the long-wavelength absorption edge of the absorption band may not be optimally placed for the intended application.

In addition, the time and expense involved in preparing serviceable solid particulate filter dye dispersions by milling techniques are a deterrent to their use, especially in large volume applications.

Sodium salts of color couplers containing carboxy groups have been incorporated in photographic binders and elements in the pH range of 6 to 6.5 in order to disperse photographic dyes. However, such expedients can cause recrystallization effects resulting in unwanted sensitivity changes and degradation of gradation and color saturation.

The precipitation of hydrophobic photographically useful components such as couplers from solution to obtain small particle size dispersions is also known. Such processes generally involve dissolving the photographically useful component in a water miscible organic solvent, optionally augmented by the addition of base to ionize the component and increase solubility. Dispersing aids such as surfactants or steric stabilizers can be added with subsequent precipitation achieved by lowering the pH or by flooding the solution with water or other solvent in which the component is insoluble.

One such prior process disclosed in U.K. Patent 1,193,349 disperses color couplers that contain no sulfonic acid or carboxylic acid solubilizing groups from solution in a mixture of water-miscible organic solvent and aqueous alkali using a homogeneous acid solution to form a colloidal precipitate which is stabilized with dispersing aids. Large amounts of water-miscible organic solvent are used, greater than 50% of the total solvent mixture, as well as high concentrations of aqueous alkali. Such high concentrations of alkali cause severe decomposition of filter dyes. American Institute of Chemical Engineers Symposium Series (Vol. 76, No. 193, pp 43–51, 1980) discusses a continuous precipitation process for dispersing spherical particles of metallized dye of the type commonly used in instant photographic image-transfer systems. In the process described, the dyes are dissolved in a water-miscible organic solvent in the presence of dispersing aids and precipitated as stabilized colloidal dispersions when the organic homogeneous solution is diluted with water until the dye is no longer soluble in the solvent. The solvent is then removed to provide an aqueous dispersion of colloidal particles. Unfortunately, the process is not adaptable to large scale manufacturing operations, nor is it applicable to dyes that are insoluble in water-miscible organic solvents.

U.S. Pat. No. 4,388,403 teaches a process for preparing dispersions of hydrophobic photographic couplers in water using a variety of polymers and polymeric latexes to aid dissolution and/or stabilize homogeneous solutions and heterogeneous suspensions of the couplers in water-miscible organic solvents and mixtures thereof with water. A dispersion is obtained when the organic solvent is removed. This process can only be used with materials that are soluble in water-miscible organic solvents in applications that can tolerate the ionomeric polymers and latexes used as dissolution aids and stabilizers. It is not advantageous with components that will migrate out of the polymeric stabilizing aggregate or latex to form crystals in the stored dispersion or photographic element due to trace solubility in water.

U.S. Pat. No. 4,933,270 discloses a method for forming dispersions of hydrophobic photographic components having groups that are destroyed in base (high pH) solutions, particularly ester-terminated photographic couplers. U.S. Pat. Nos. 4,957,857 and 5,015,564 disclose processes for stabilizing precipitated dispersions of hydrophobic couplers and U.S. Pat. No. 5,008,179 discloses a process for the preparation of dispersions of photographic couplers and the use thereof in photographic elements having increased activity.

These and other prior processes require removal of organic solvent by activated stripping or distillation, evaporation, or extensive washing, and bring with them the attendant disadvantages of such operations. Generally, if elevated temperatures are not used, too little solvent will be removed. If elevated temperatures are used, extensive ripening and particle size growth often occurs while thermally unstable components decompose. If a vacuum is used to remove solvent, extensive foaming often results.

If all of the solvent is not completely removed, recrystallization (ripening) during storage of the dispersion or of the coated photographic element containing the dispersion can occur. Further, residual solvent can cause agglomeration and coalescence of particles in the hydrophilic-binder melt and flocculation of the dispersion in the coating melt.

Notwithstanding, dispersions of filter dyes particularly useful in photographic applications are not prepared by such methods. Generally, a milling or grinding procedure such as ball milling is used to prepare filter dye dispersions. Such processes are slow and cumbersome and do not provide uniformly very small particle sizes.

U.S. Pat. No. 4,855,221 discloses that oxonol filter dyes may be prepared and purified by dissolution with a base followed by reprecipitation in excess concentrated acid (pH<1 in the slurry), such as concentrated hydrochloric acid. Such macroscopic precipitation processes yield agglomerated particles which are easy to wash and filter and are highly suitable for the bulk solid storage of said dyes. The agglomerates and slurries of the same are not small particle colloid dispersions, and such agglomerates are unsuitable for use as photographic filter dyes without extensive treatment by mechanical milling techniques (roller milling, sand milling, etc.) in the presence of dispersing aids and stabilizers.

A need therefore exists for a process for dispersing filter dyes that is faster than ordinary milling procedures and that provides solid particulate filter dyes that do not wander but wash out easily during processing leaving little or no residual stain. The dispersion process should provide average particle sizes as small as or smaller than can be obtained by conventional methods, such as grinding, and filter dye dispersions that have hues that differ from those obtained when grinding processes may be employed. Further, a filter dye dispersion process is needed that will provide dispersions having improved covering power and high light absorption coefficients with sharp-cutting absorbance peaks.

DISCLOSURE OF INVENTION

The unique microprecipitation process of the invention provides a method for rapidly and easily preparing microdispersions of solid very small particulate filter dyes which, when used in photographic elements, provide enhanced wash-out rates, leave little or no stain, have sharp-cutting long-wavelength absorption bands, enhanced covering power, high light absorption efficiencies and ease of formulation and manufacture.

The microprecipitation process of the invention comprises preparing a concentrated slurry in an aqueous medium of a filter dye having ionizable acid sites on the dye molecule, generally containing from about 0.1 to about 50 weight %, preferably from about 0.1 to about 20 weight %, of the filter dye in aqueous media such as water or a mixture of water and any suitable water miscible organic solvent including methanol, ethanol, isopropanol, tetrahydrofuran, and the like and mixtures thereof, provided that such water-solvent mixtures contain less than about 50% by volume of solvent to water (v/v), preferably less than about 10%; adding sufficient aqueous base to dissolve the filter dye, preferably aqueous alkali metal hydroxide or tetraalkylammonium hydroxides of cations such as lithium, sodium, potassium, cesium, rubidium, tetramethylammonium and the like and mixtures thereof, with sodium and potassium cations being preferred, preferably under pH-stat conditions in a pH range of from about 8 to about 12, preferably 8.5 to 10, and then acidifying the resulting solution in the presence of added dispersing aids and stabilizers with a stoichiometric amount of acidic protons to reprotonate up to about 100% of the total ionizable acid sites on the dye molecule, preferably with stirring, to provide a microprecipitated colloidal dispersion of a filter dye that is insoluble in aqueous media at pH<3 and soluble in aqueous media at pH>10 as well as filter dyes that have less than 0.05% (w/w) solubility in water at pH 5 or less but are soluble in aqueous media (water/water-miscible solvents) to a degree greater than 1% (w/w).

The microprecipitated filter dye dispersions prepared in accordance with the invention tend to be insoluble and nondiffusable in hydrophilic colloid layers at a pH of about 6.5 or less. At processing pH values of about 8 or more, the microprecipitated dyes become soluble and diffuse rapidly in the hydrophilic colloid layers resulting in rapid wash-out with negligible or no stain.

BRIEF DESCRIPTION OF THE DRAWINGS

FIGS. 3–6 and 8 are visible spectra of coated dispersions of dyes of the examples.

MODES FOR CARRYING OUT THE INVENTION

Figure 1:
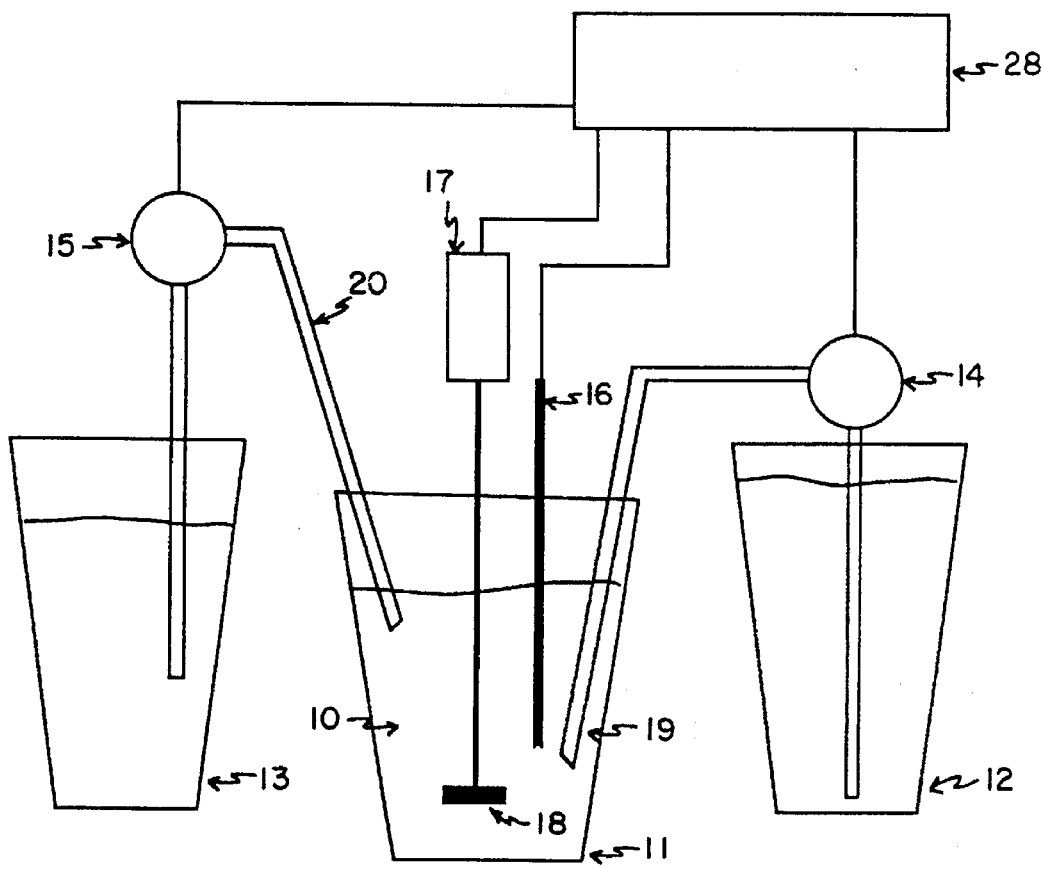
FIG. 1 is a schematic illustration of a batch-reactor for carrying out the process of the invention.

The process of the invention provides unique filter dye dispersions which, when used in photographic elements, offer surprising advantages not heretofore obtainable using known filter dyes incorporated as loaded polymer latexes, oil-in-water dispersions using high-boiling water-immiscible solvents, or even solid particle dispersions of fully protonated filter dyes produced by conventional milling techniques such as roller-milling, sand-milling, media-milling, and so on.

The process of the invention provides unique microprecipitated filter dye dispersions having enhanced washout rates, improved light capturing efficiency, and selectively enhanced and positioned absorption bands relative to dispersions obtained when solid particle dispersion technology is applied to oxonol filter dyes without impairment of any of the other advantages of solid particle dispersions known in the art.

The incorporation of microprecipitated filter dye dispersions prepared by the process of the invention into photographic elements substantially obviates the problems encountered when prior methods are used to incorporate dyes such as, for example, dye wandering, photographic speed loss, degradation of color reproduction, retained dye stain, poor light absorbing efficiency and the like.

The process of the invention is applicable to filter dyes that are insoluble in aqueous solutions at pH<3 and soluble in aqueous solutions at pH>10. Further, the process of the invention is applicable to filter dyes that have less than 0.05 weight % solubility in water at pH 5 or greater but a solubility greater than 1 weight % in water/water-miscible solvent mixtures.

The process of the invention provides microprecipitated dispersions of filter dyes having the formulae:

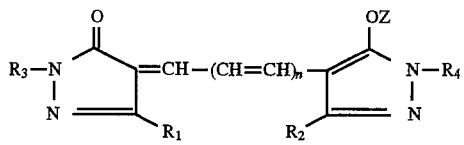

wherein n is 0, 1, or 2; $R_1$, $R_2$, $R_3$, and $R_4$ are the same or different substituted or unsubstituted alkyl, aryl, alkaryl, or aralkyl groups; one or more of $R_1$, $R_2$, $R_3$, and $R_4$ contains a carboxy substituent —$CO_2^-Z^+$, wherein $Z^+$ is a statistical mixture of hydrogen ($H^+$) and alkali or tetraalkylammonium cations ($M^+$) such that $Z^+=xH^++(1-x)M^+$, where x is less than or equal to 1;

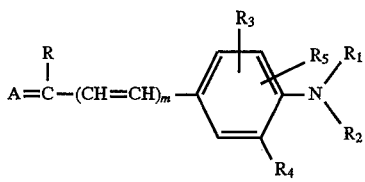

wherein A is a substituted or unsubstituted nucleus derived from a rhodanine, hydantoin, 2-thiohydantoin, 4-thiohydantoin, 2,4-oxazolidindione, 2-thio-2,4-oxazolidindione, isoxazolinone, barbituric, w-thiobarbituric, or indandione, the nucleus having a carboxyphenyl or sulfonamidophenyl substituent; R is hydrogen, alkyl having 1 to 4 carbon atoms, or benzyl; $R_1$ and $R_2$ are each independently alkyl or aryl or, taken together with $R_4$, $R_5$, N and the carbon atoms to which they are attached, complete a julolidinyl ring; $R_3$ is H, alkyl or aryl; $R_4$ and $R_5$ are each independently H, or $R_4$, taken together with $R_1$, or $R_5$, taken together with $R_2$, each may complete a carbocyclic ring; and m is 0 or 1;

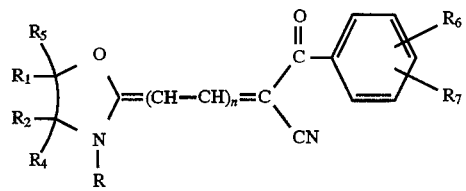

wherein n is 1 or 2; $R_1$ and $R_2$ are each independently substituted or unsubstituted alkyl or aryl or, taken together, may complete a substituted or unsubstituted 5- or 6-membered ring, provided that $R_1$ is hydrogen when $R_4$ is substituted or unsubstituted alkyl; $R_3$ is substituted or unsubstituted alkyl or aryl; $R_4$ is substituted alkyl or, together with $R_5$, forms a double bond; $R_5$ is H or, together with $R_4$, forms a double bond; $R_6$ and $R_7$ are each independently H, substituted or unsubstituted alkyl, substituted or unsubstituted aryl, secondary or tertiary amine, —$CO_2H$ or —$NHSO_2R_8$, provided that at least one of $R_6$, $R_7$, or a substituent on an aryl ring in $R_3$, or on an aryl ring in $R_1$ or $R_2$, or on an aryl ring in $R_6$, or $R_7$, or on an aryl ring formed by $R_1$ and $R_2$ is —$CO_2H$ or —$NHSO_2R_8$; and $R_8$ is substituted or unsubstituted alkyl or aryl;

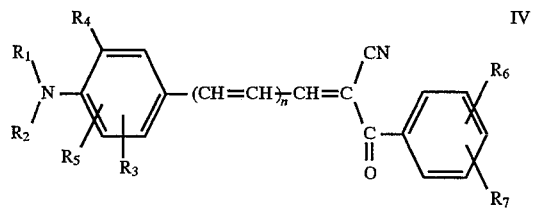

wherein n is 0 or 1; $R_1$ and $R_2$ are each independently substituted or unsubstituted alkyl or aryl or, taken together with $R_4$, $R_5$, N and the atoms to which they are attached, complete a juloyldyl ring; $R_3$ is H, substituted or unsubstituted alkyl or aryl; $R_4$ and $R_5$ are each independently H, or $R_5$, taken together with $R_2$, or $R_4$, taken together with $R_1$, represent the atoms necessary to complete a heterocyclic ring; $R_6$ and $R_7$ are each independently H, substituted or unsubstituted alkyl or aryl, secondary or tertiary amino, —$CO_2H$, or —$NHSO_2R_8$, provided that at least one of $R_6$, $R_7$, or a substituent on an aryl ring in $R_6$ or $R_7$, is —$CO_2H$ or —$NHSO_2R_8$; $R_8$ is substituted or unsubstituted alkyl or aryl;

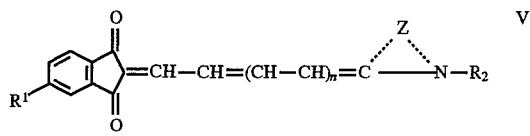

wherein n is 0 or 1; $R_1$ is —$CO_2H$ or —$NHSO_2R_2$, where $R_2$ is substituted or unsubstituted alkyl or aryl; $R_3$ is substituted or unsubstituted alkyl or aryl; Z represents atoms necessary to complete a substituted or unsubstituted heterocyclic ring;

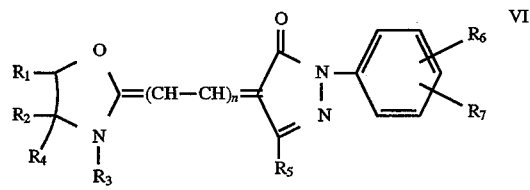

wherein n is 1 or 2; $R_1$ and $R_4$ are each independently substituted or unsubstituted alkyl or aryl or, taken together, complete a substituted or unsubstituted 5- or 6-member ring; $R_2$ is substituted or unsubstituted alkyl or part of a double bond between the ring carbon atoms to which $R_1$ and $R_4$ are attached; $R_3$ and $R_8$ are each independently substituted or unsubstituted alkyl or aryl; $R_5$ is H, substituted or unsubstituted alkyl or aryl, carboxylate, or substituted or unsubstituted acyl; $R_6$ and $R_7$ are each independently H, substituted or unsubstituted alkyl, aryl, —$CO_2H$, or —$NHSO_2R_8$, provided that at least one of the aryl rings of the molecule has at least one substituent that is —$CO_2H$ or —$NHSO_2R_8$;

$$[D-(A)_y]-X_n \qquad \text{VII}$$

wherein D is a chromophoric light-absorbing moiety which is an aromatic ring if y is 0; A is an aromatic ring bonded directly or indirectly to D; X is a substituent other than carboxy having an ionizable proton either on A or on an aromatic ring portion of D, having a p$K_a$ of 4 to 11 in a 50/50 mixture (volume basis) of ethanol and water; y is 0 to 4; n is 1 to 7; and the compound has a log partition coefficient of from 0 to 6 when the compound is in unionized form.

Some preferred dyes of formula I–VII are set forth in corresponding Tables I–VII.

TABLE I

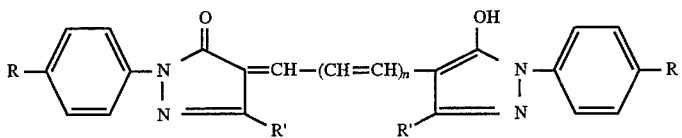

| n | R | R' | Dye |
|---|---|----|-----|
| 0 | $CO_2H$ | $CH_3$ | I-1 |
| 0 | $CO_2H$ | $CH_2CH_3$ | I-2 |
| 1 | $CO_2H$ | $CH_3$ | I-3 |
| 1 | $CO_2H$ | $CH_2CH_3$ | I-4 |
| 2 | $CO_2H$ | $CH_3$ | I-5 |
| 2 | $CO_2H$ | $CH_2CH_3$ | I-6 |

TABLE II

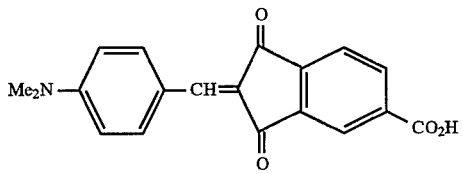

II-1

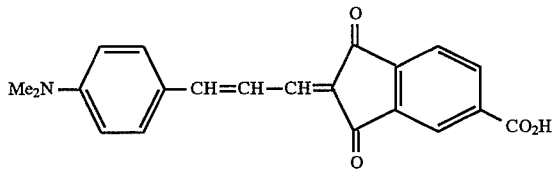

II-2

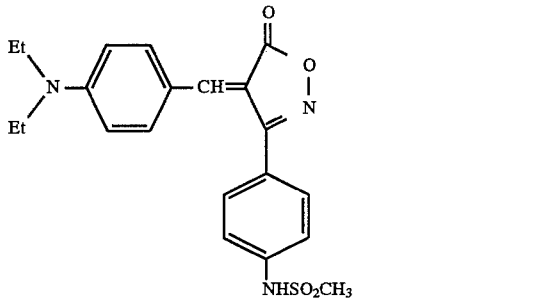

II-3

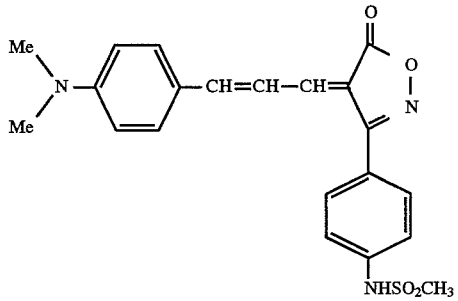

II-4

TABLE II-continued
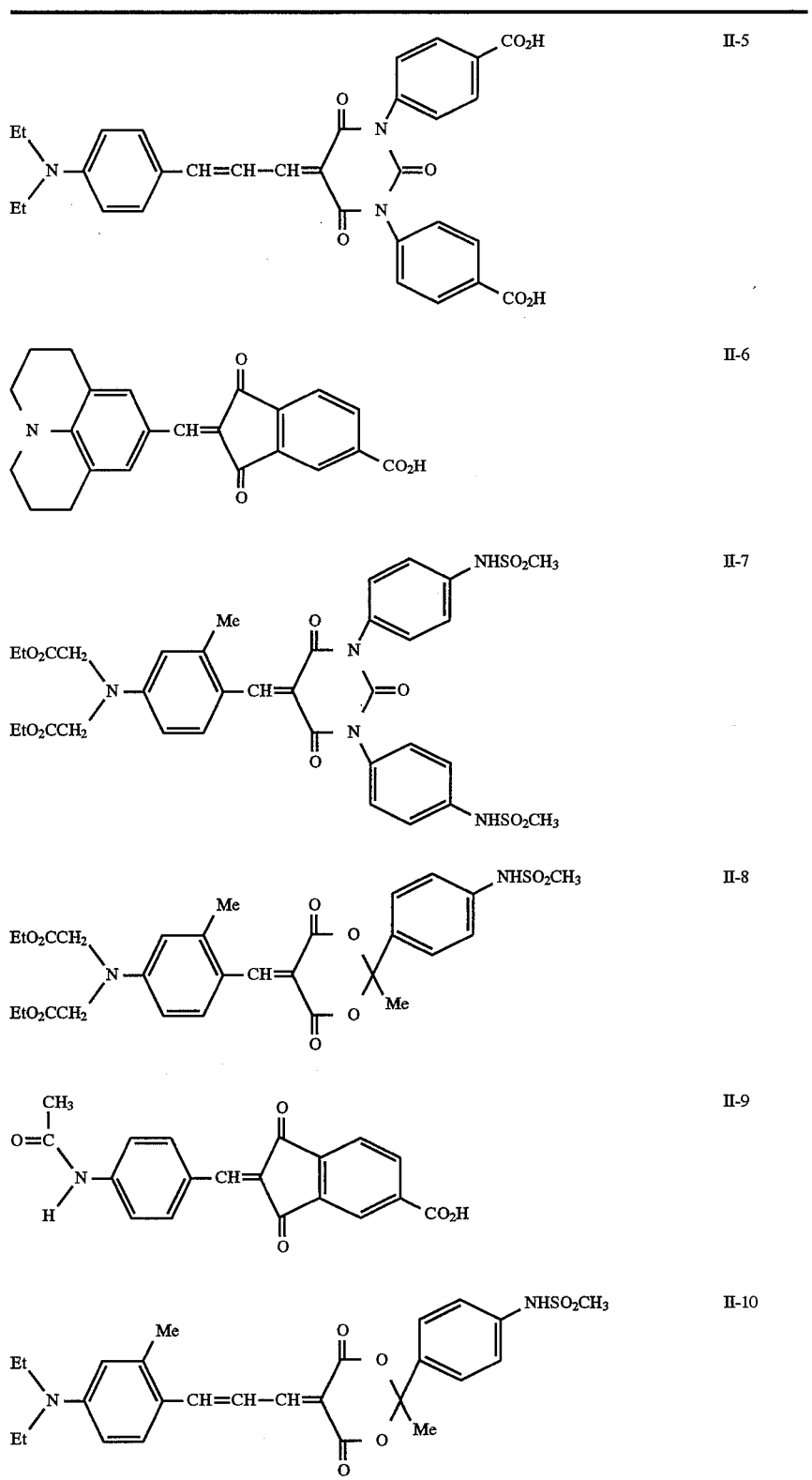

TABLE II-continued
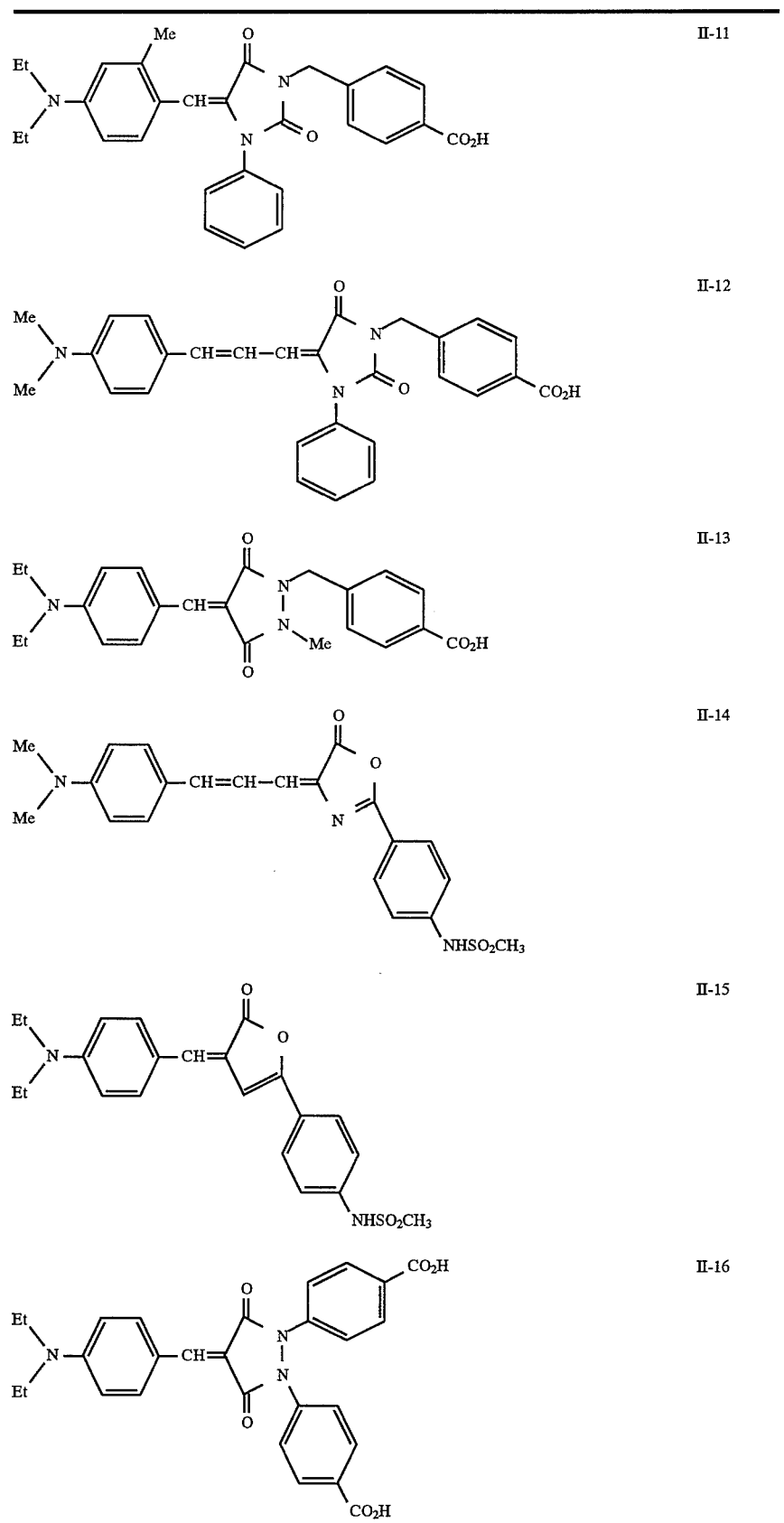

TABLE II-continued
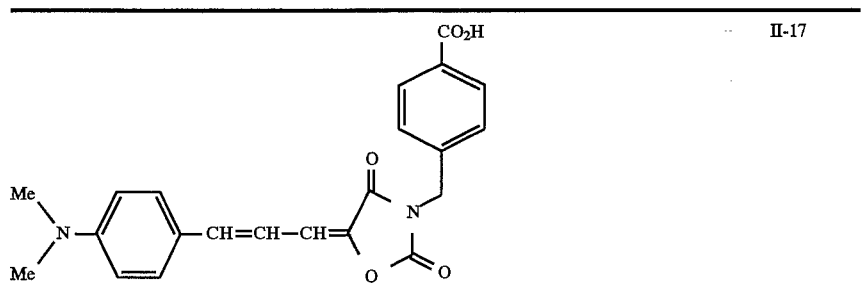
II-17
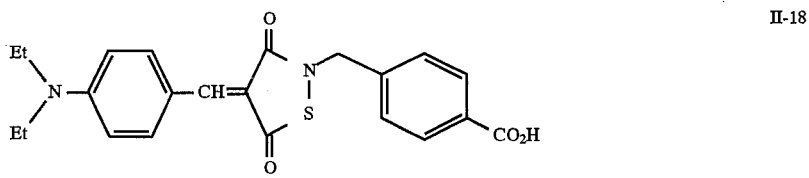
II-18
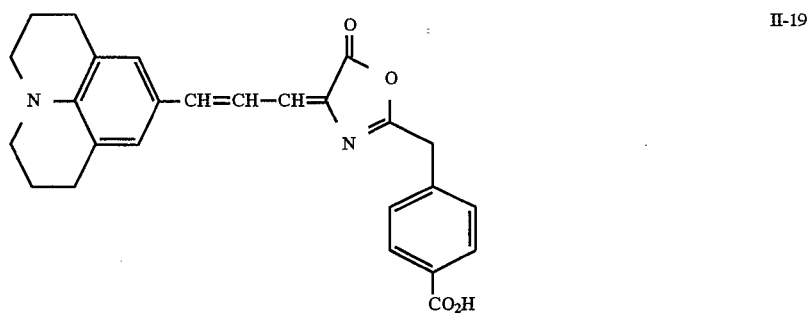
II-19
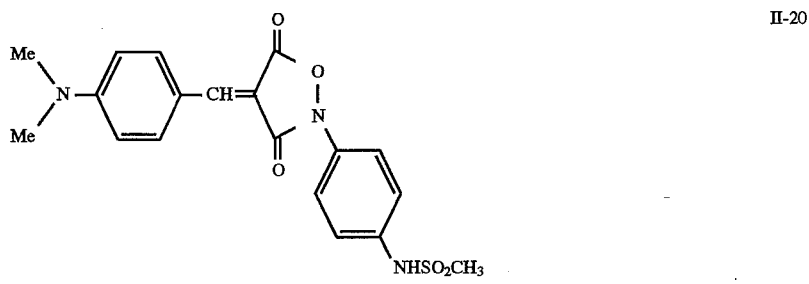
II-20
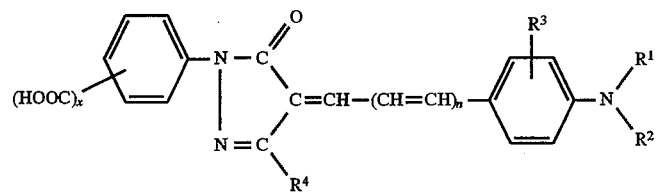
| 1-Ph Subst. x-position | | $R^1, R^2$ | $R^3$ | $R^4$ | Dye | n |
|---|---|---|---|---|---|---|
| 1 | 4 | $CH_3$ | H | $CH_3$ | II-21 | 0 |
| 1 | 4 | $CH_2CH_3$ | H | $CH_3$ | II-22 | 0 |
| 1 | 4 | $n-C_4H_9$ | H | $CH_3$ | II-23 | 0 |
| 1 | 4 | $CH_3$ | H | $CO_2C_2H_5$ | II-24 | 0 |
| 1 | 4 | $i-C_3H_7OCOCH_2$ | $CH_3$ | $CH_3$ | II-25 | 0 |
| 2 | 3,5 | $CH_3$ | H | $CH_3$ | II-26 | 0 |
| 2 | 3,5 | $CH_2CH_3$ | H | $CH_3$ | II-27 | 0 |
| 2 | 3,5 | $n-C_4H_9$ | H | $CH_3$ | II-28 | 0 |
| 2 | 3,5 | $i-C_3H_7OCOCH_2$ | H | $CH_3$ | II-29 | 0 |
| 2 | 3,5 | $i-C_3H_7OCOCH_2$ | $CH_3$ | $CH_3$ | II-30 | 0 |
| 1 | 4 | $CH_3$ | H | $CH_3$ | II-31 | 1 |
| 1 | 4 | $i-C_3H_7OCOCH_2$ | H | $CH_3$ | II-32 | 0 |
| 1 | 4 | $CH_3$ | H | $CH_3C(=O)-$ | II-33 | 0 |

TABLE II-continued
| 1 | 4 | CH$_3$ | H | CO$_2$C$_2$H$_5$ | II-34 | 1 |
| 2 | 3,5 | CH$_3$ | H | CH$_3$ | II-35 | 1 |
| 1 | 4 | CH$_3$ | H | CO$_2$C$_2$H$_5$ | II-36 | 0 |
| 2 | 3,5 | CH$_3$ | H | CO$_2$C$_2$H$_5$ | II-37 | 1 |
| 1 | 4 | CH$_3$ | H | CO$_2$C$_2$H$_5$ | II-38 | 0 |
| 1 | 4 | CH$_3$ | H | CF$_3$ | II-39 | 0 |
| 1 | 4 | CH$_3$ | H | Ph | II-40 | 0 |
| 1 | 4 | CH$_3$ | H | CH$_3$C(=O) | II-41 | 0 |
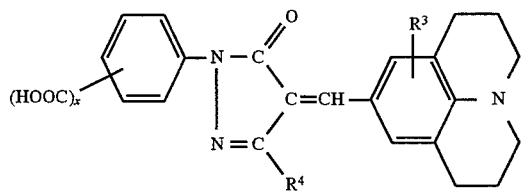
| 1-Ph Subst. x-position | | R$^3$ | R$^4$ | Dye |
|---|---|---|---|---|
| 1 | 4 | H | CH$_3$ | II-42 |
| 2 | 3,5 | H | CH$_3$ | II-43 |
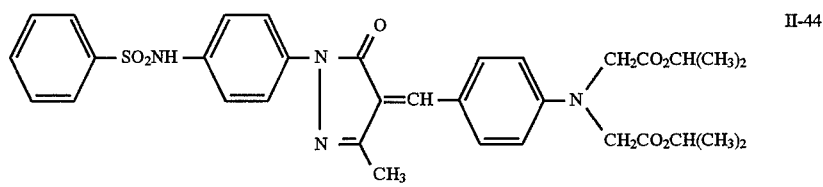
II-44
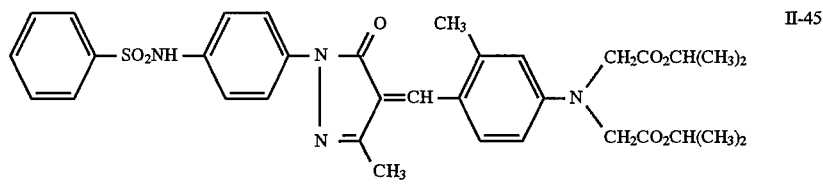
II-45
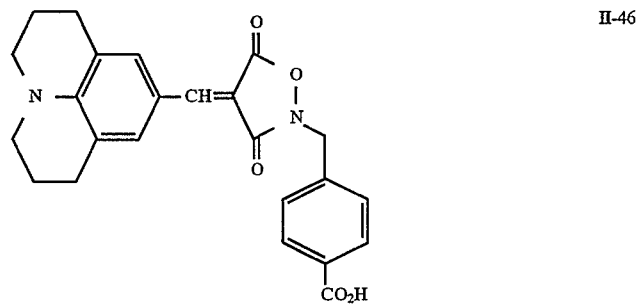
II-46
TABLE III
III-11

TABLE III-continued
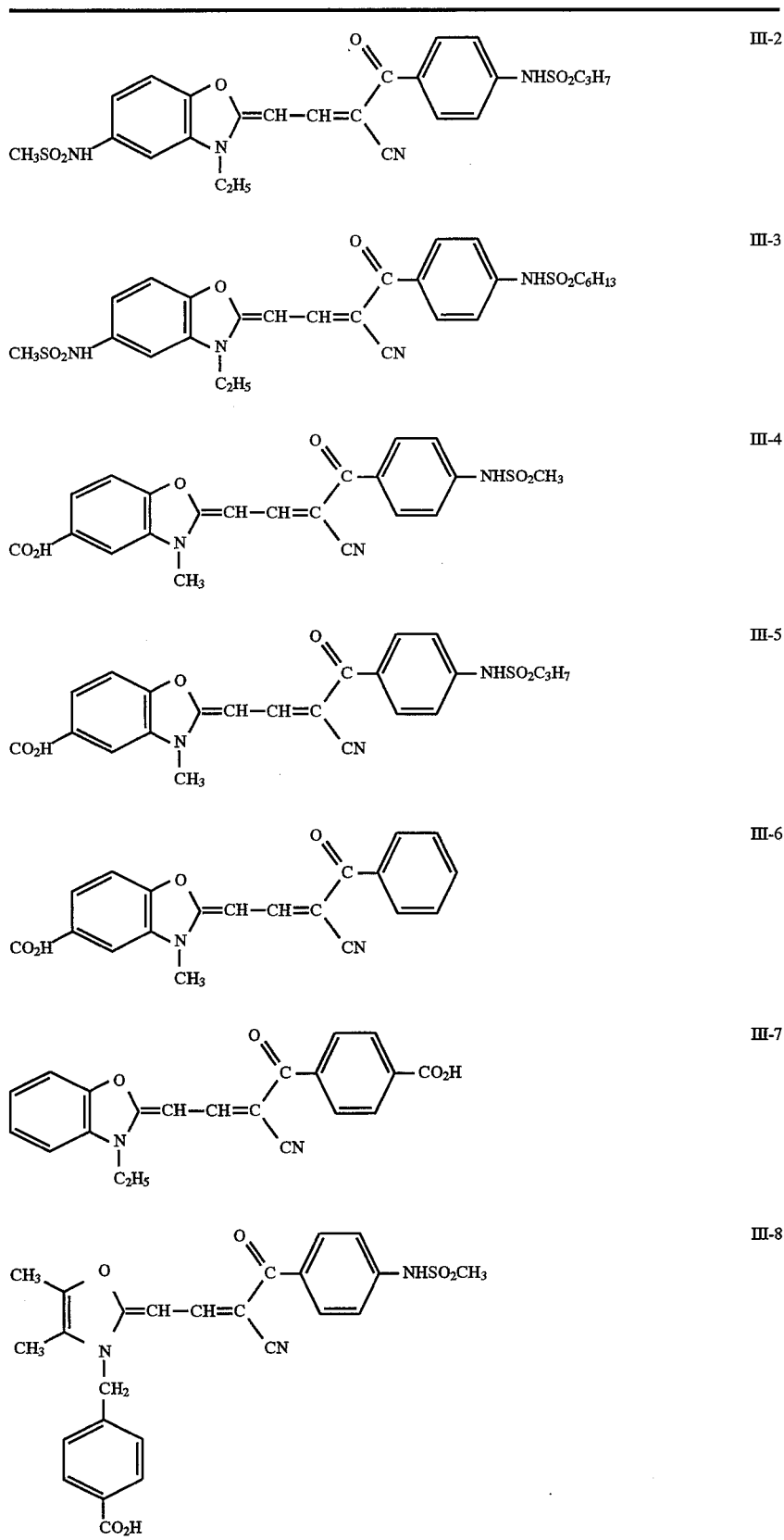

TABLE III-continued
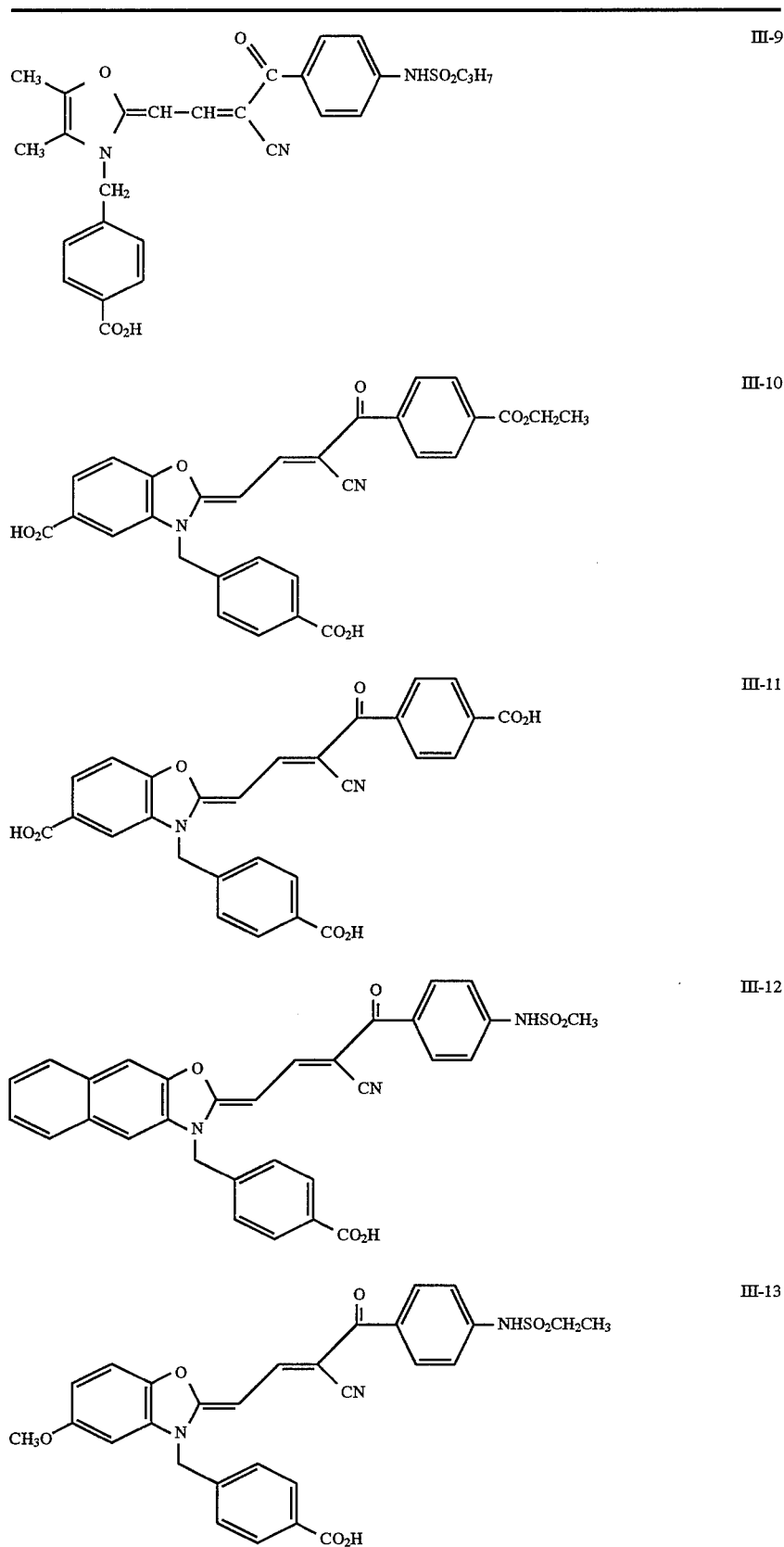

TABLE III-continued
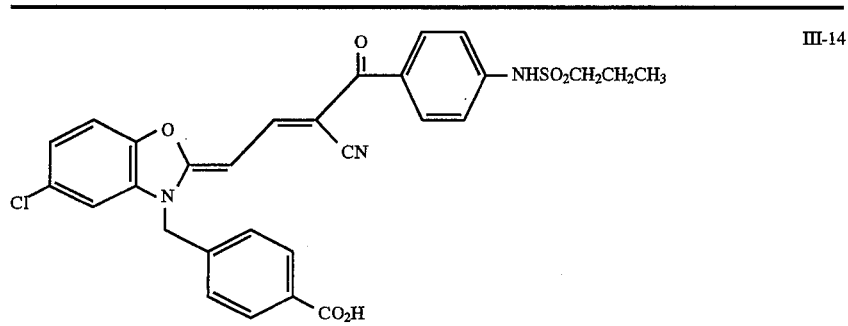  III-14
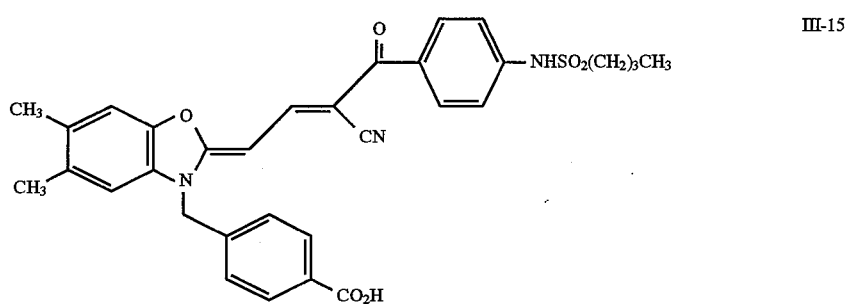  III-15
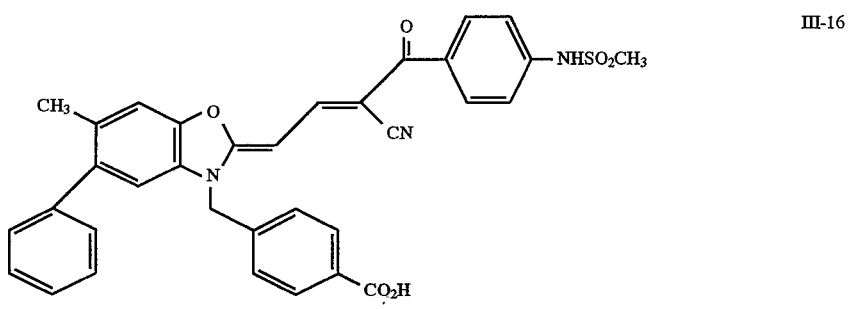  III-16
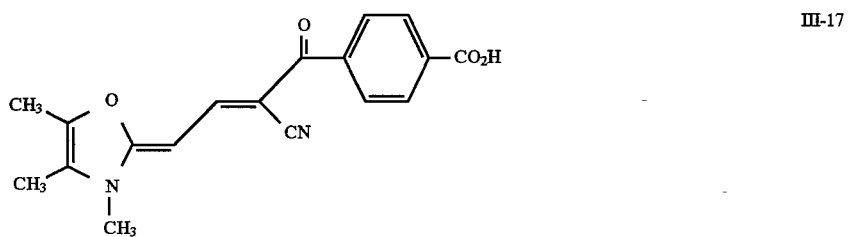  III-17
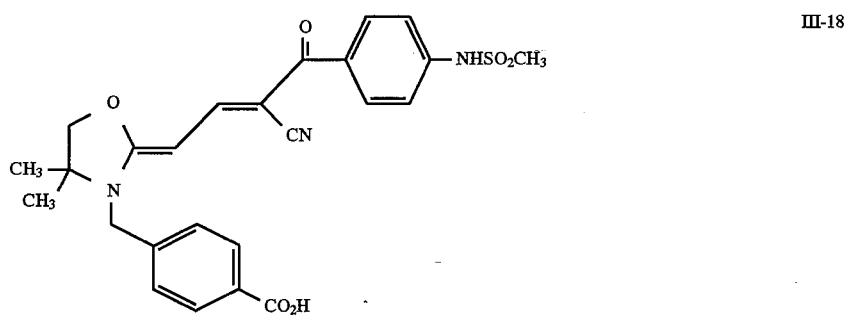  III-18

TABLE III-continued
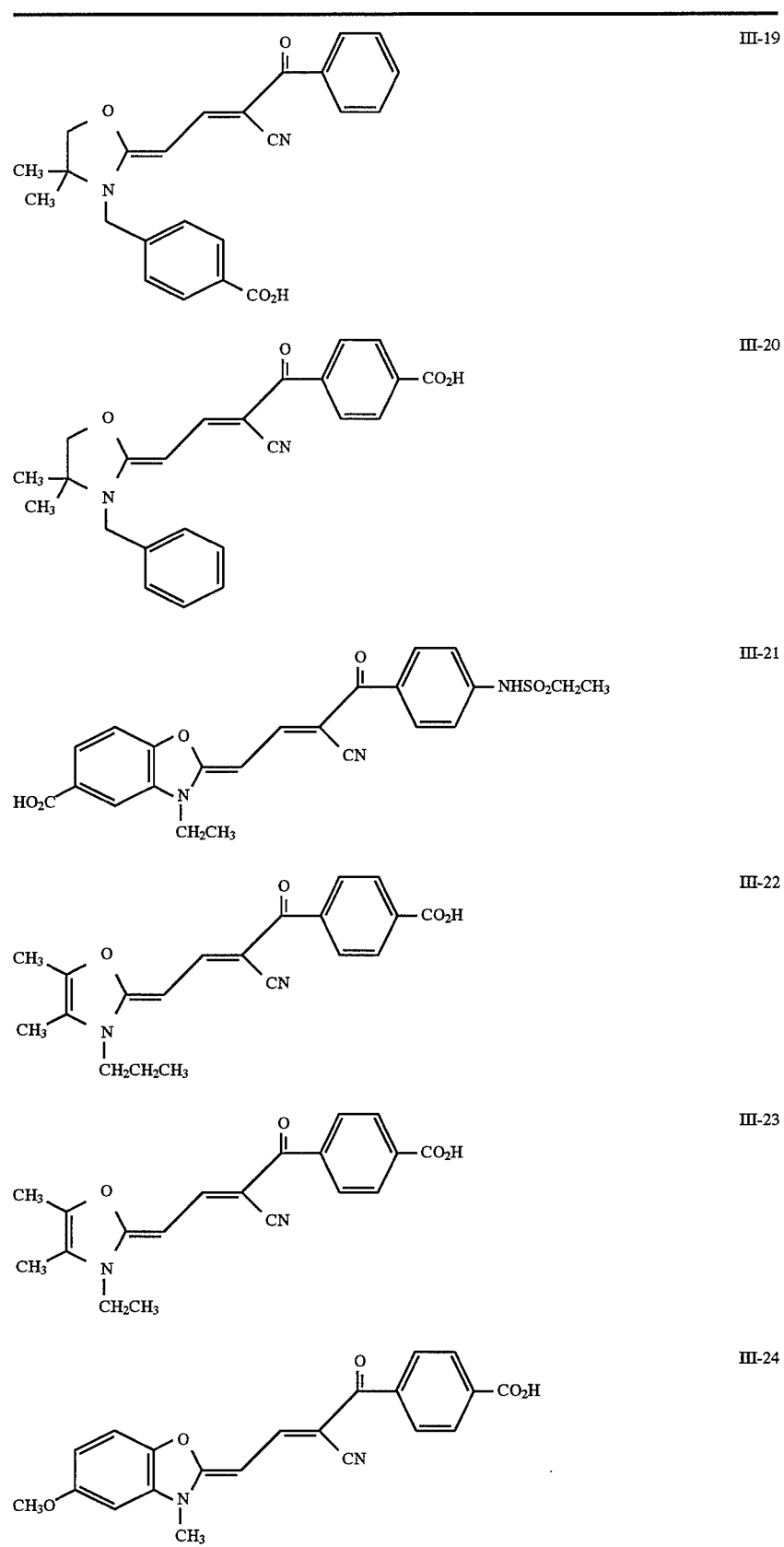
III-19
III-20
III-21
III-22
III-23
III-24

TABLE III-continued
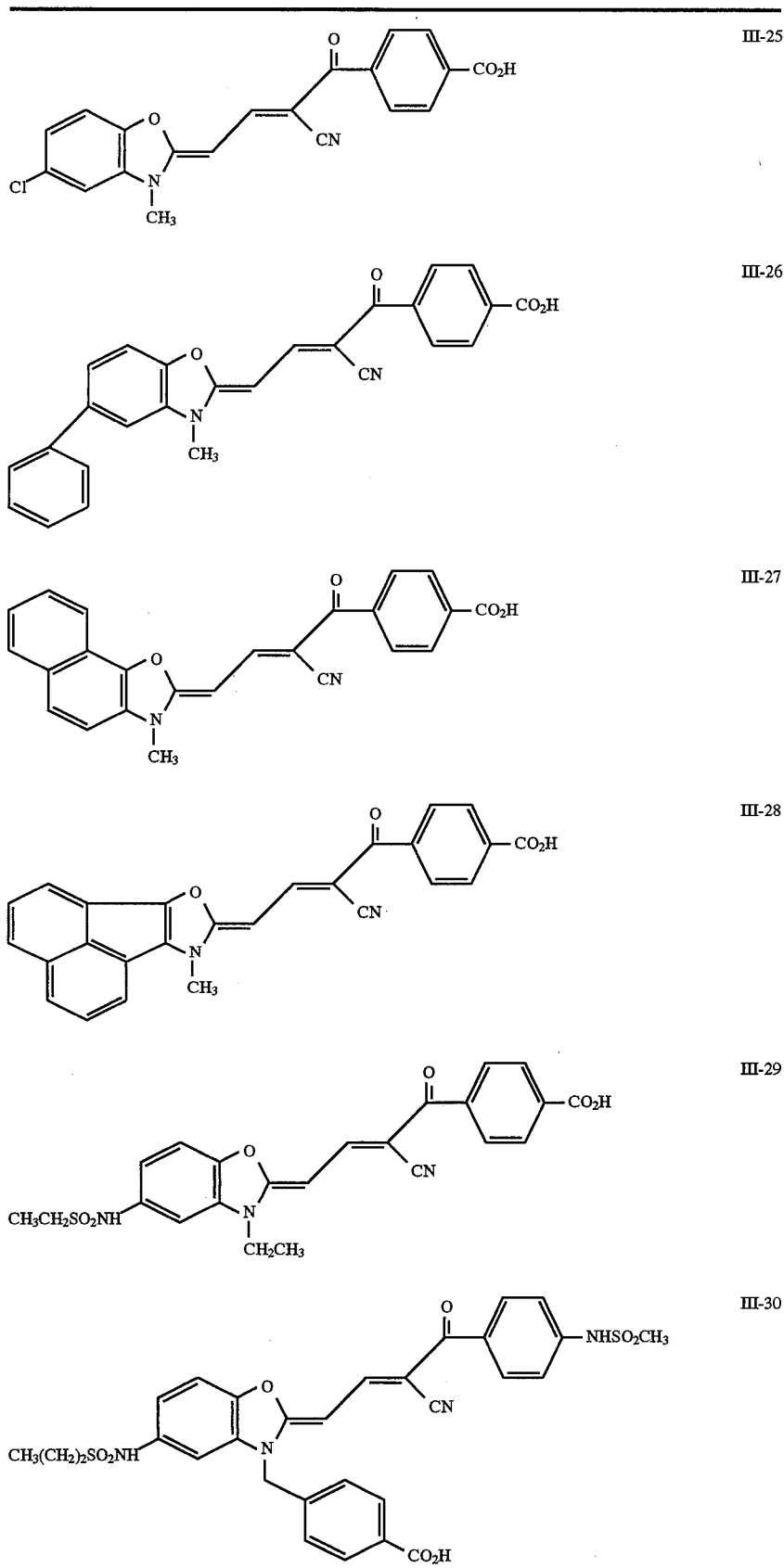
III-25
III-26
III-27
III-28
III-29
III-30

TABLE III-continued
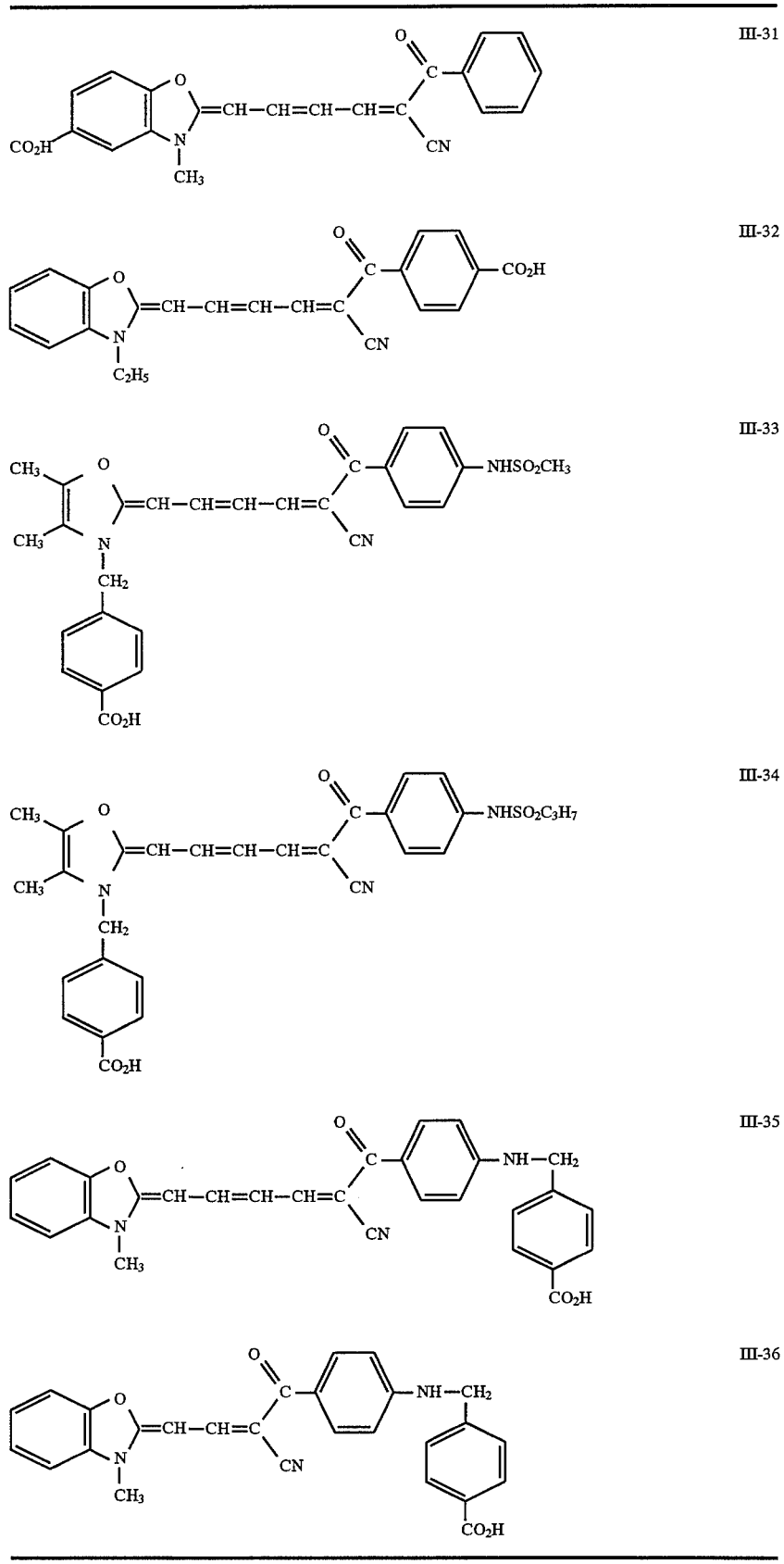

TABLE IV

| Structure | ID |
|---|---|
| (CH₃)₂CH—O—C(=O)—CH₂ and (CH₃)₂CH—O—C(=O)—CH₂ on N, attached to phenyl bearing CH₃, with CH=C(CN)—C(=O)—C₆H₄—NHSO₂CH₃ | IV-1 |
| CF₃—CH₂—O—C(=O)—CH₂ and C₂H₅ on N, attached to phenyl bearing CH₃, with CH=C(CN)—C(=O)—C₆H₄—NHSO₂CH₃ | IV-2 |
| CF₃—CH₂—O—C(=O)—CH₂ and C₂H₅ on N, attached to phenyl bearing CH₃, with CH=C(CN)—C(=O)—C₆H₄—NHSO₂C₃H₇-n | IV-3 |
| (CH₃)₂CH—O—C(=O)—CH₂ and (CH₃)₂CH—O—C(=O)—CH₂ on N, attached to phenyl bearing CH₃, with CH=C(CN)—C(=O)—C₆H₄—NHSO₂C₃H₇-n | IV-4 |
| (CH₃)₂N—C₆H₄—CH=C(CN)—C(=O)—C₆H₄—NH—CH₂—C₆H₄—CO₂H | IV-5 |
| (CH₃)₂N—C₆H₄—CH=C(CN)—C(=O)—C₆H₄—CO₂H | IV-6 |
| (CH₃)₂N—C₆H₄—CH=C(CN)—C(=O)—C₆H₄—NHSO₂CH₃ | IV-7 |
| (CH₃)₂N—C₆H₄—CH=C(CN)—C(=O)—C₆H₄—NHSO₂C₂H₅ | IV-8 |
| (n-C₃H₇)₂N—C₆H₄—CH=C(CN)—C(=O)—C₆H₄—NHSO₂C₃H₇-n | IV-9 |
| (n-C₄H₉)₂N—C₆H₄—CH=C(CN)—C(=O)—C₆H₄—NHSO₂CH₃ | IV-10 |

TABLE IV-continued
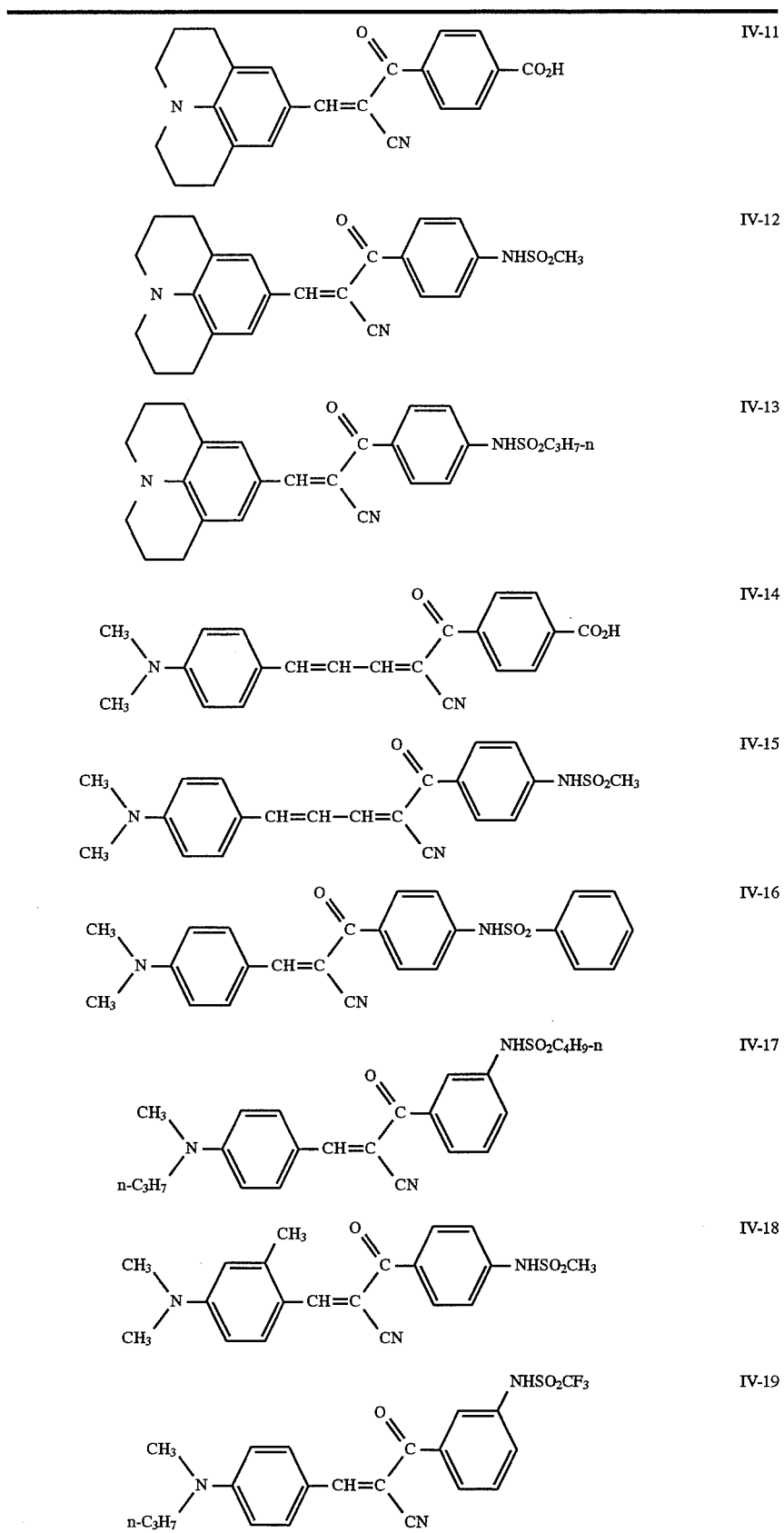

TABLE IV-continued
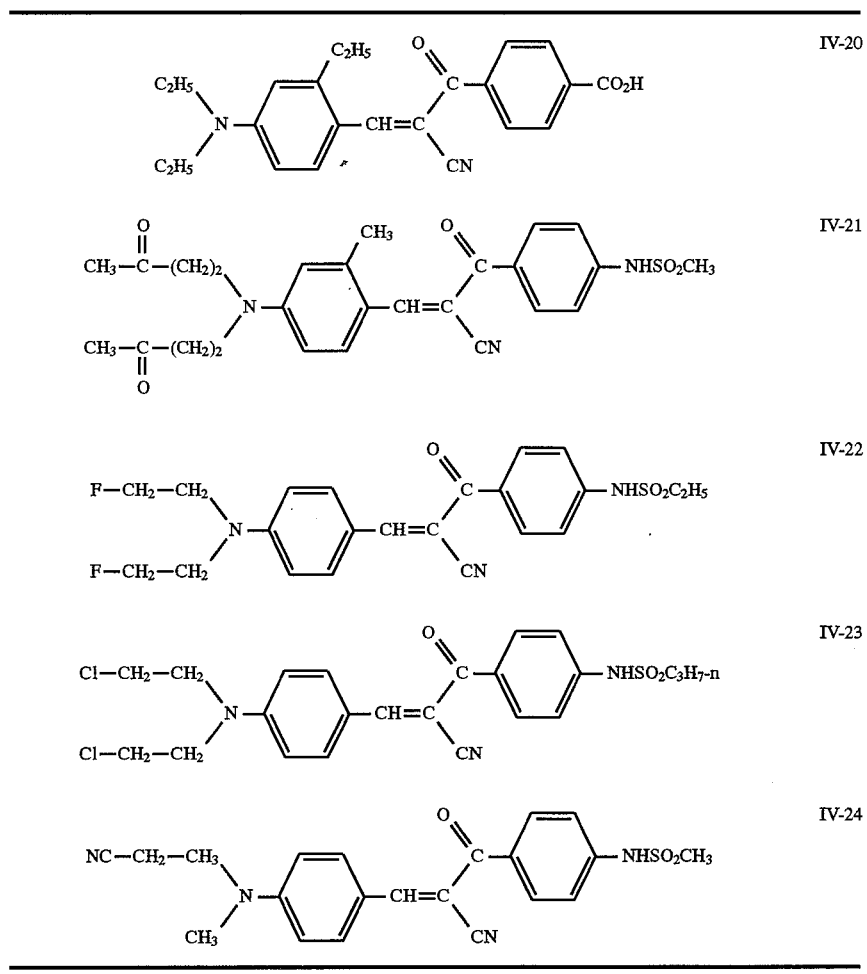
TABLE V
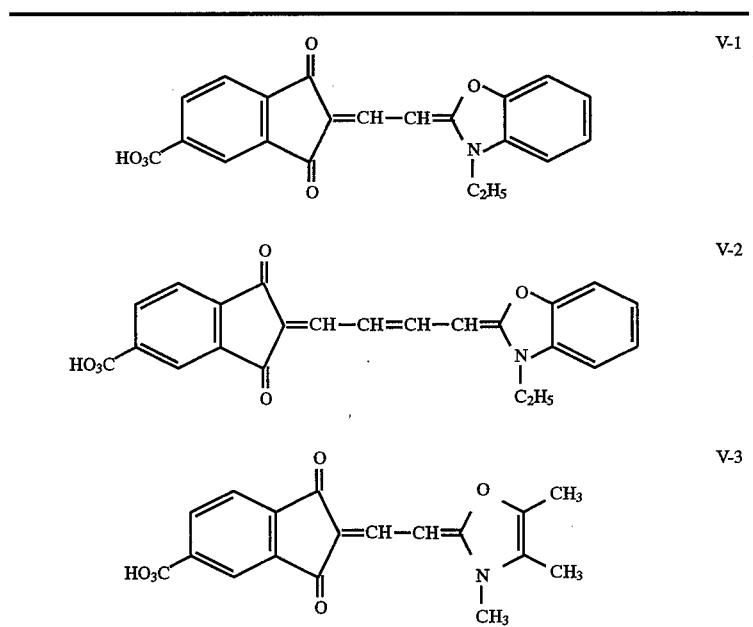

TABLE V-continued
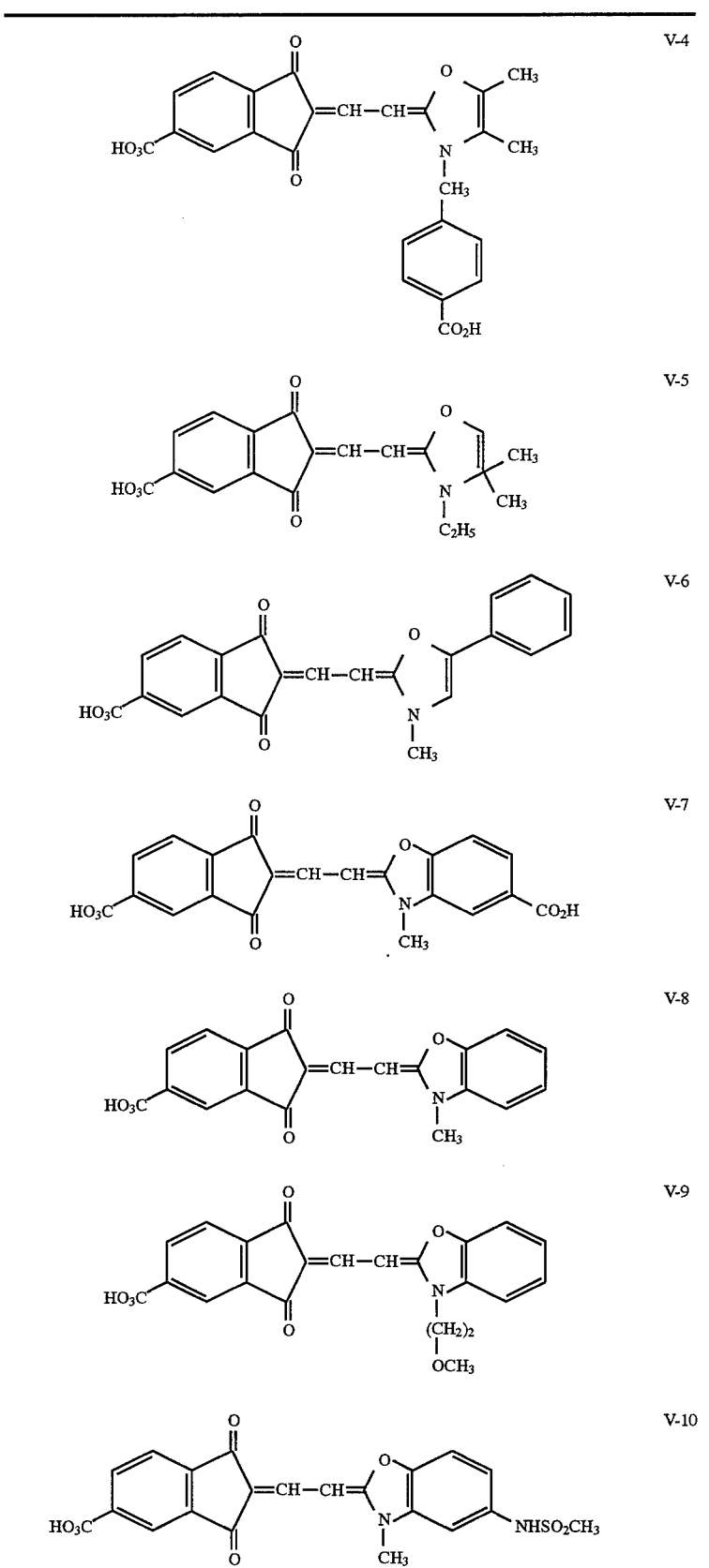

TABLE V-continued
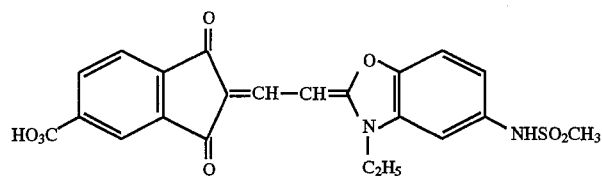
V-11
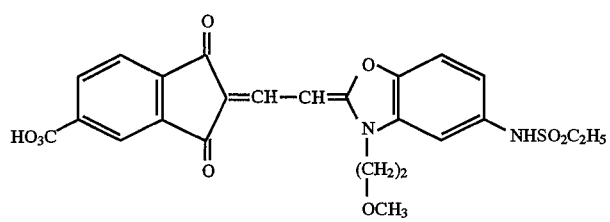
V-12
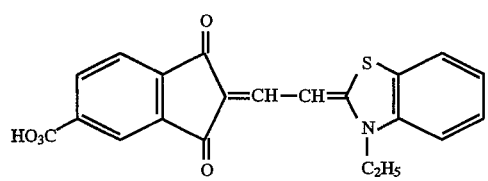
V-13
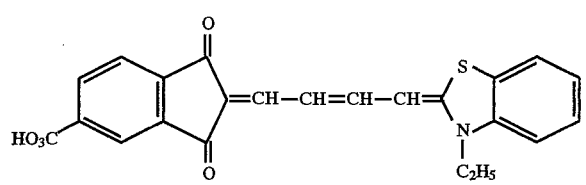
V-14
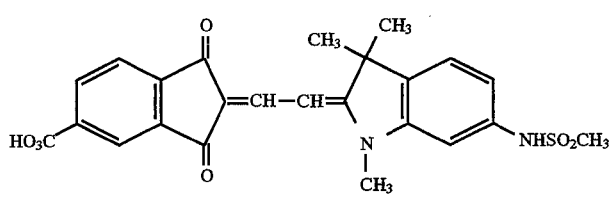
V-15
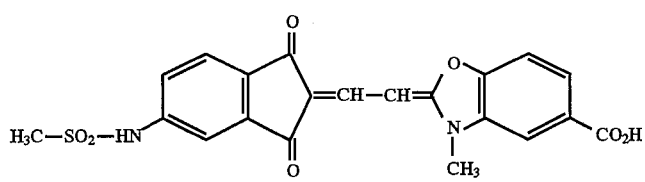
V-16
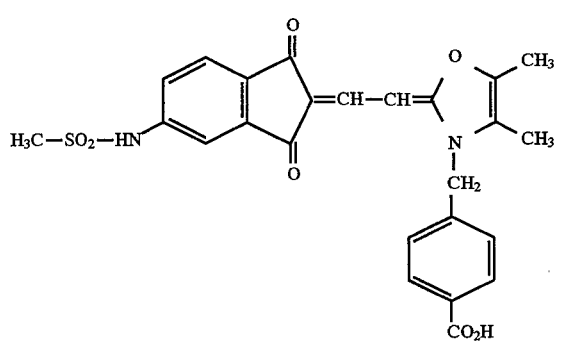
V-17

TABLE VI
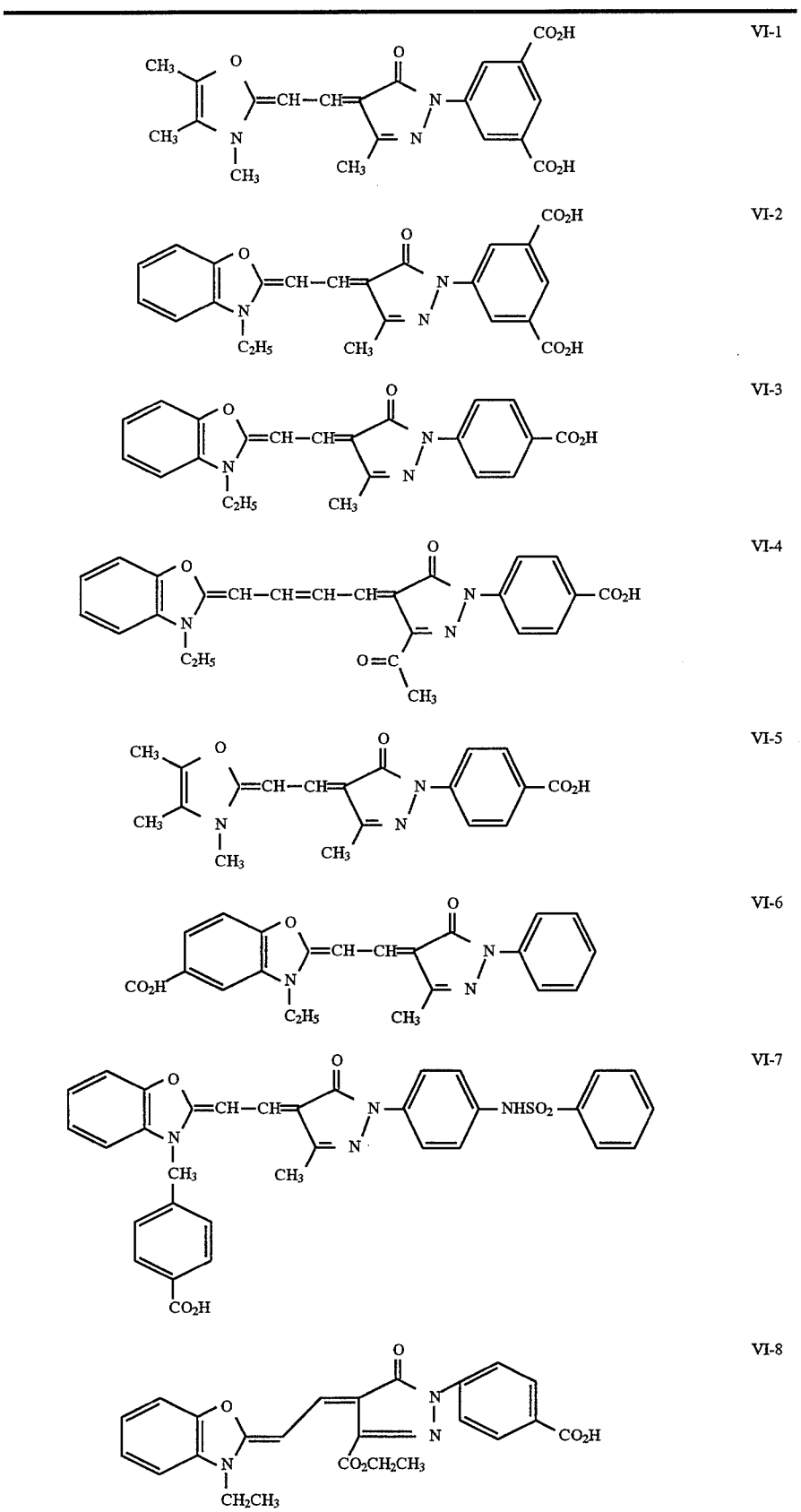

TABLE VI-continued
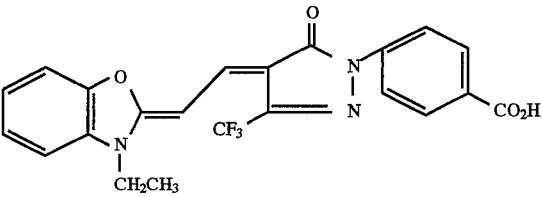  VI-9
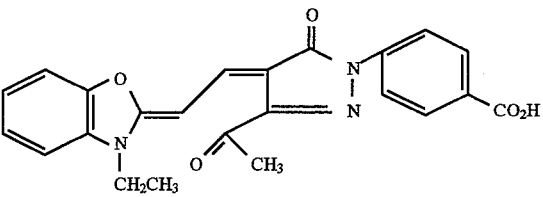  VI-10
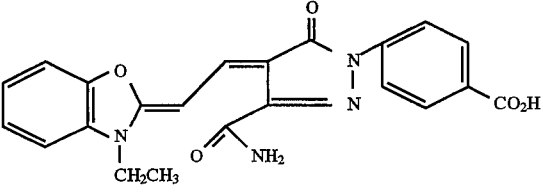  VI-11
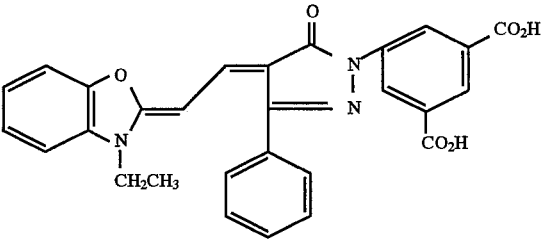  VI-12
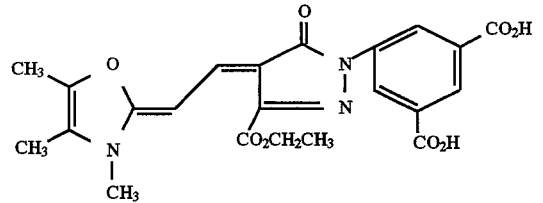  VI-13
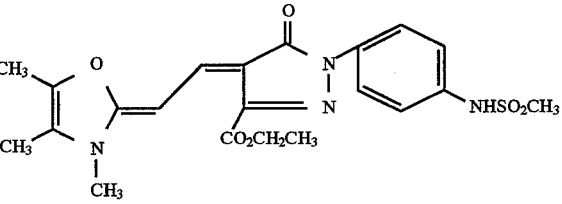  VI-14
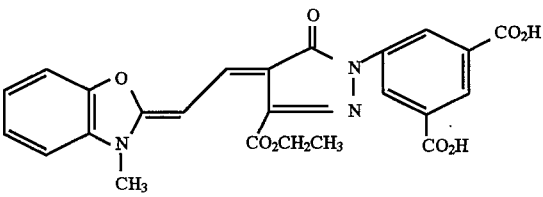  VI-15

TABLE VI-continued
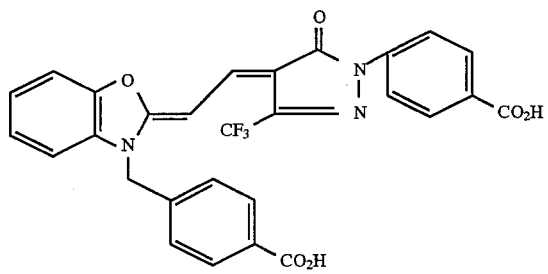
VI-16
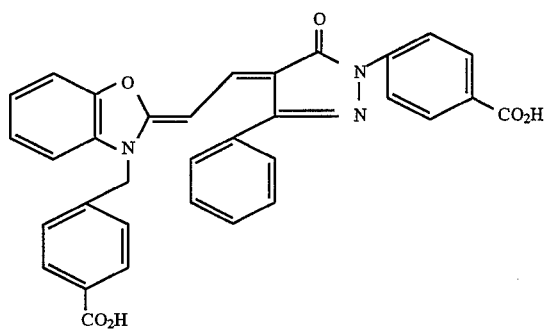
VI-17
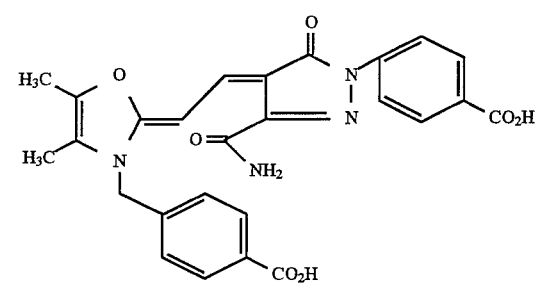
VI-18
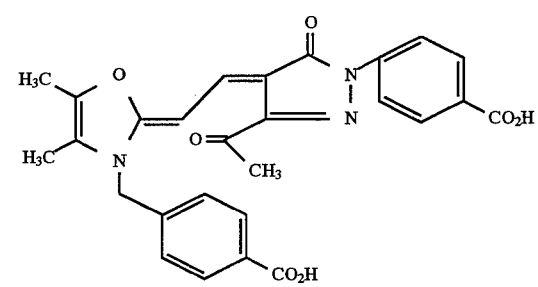
VI-19
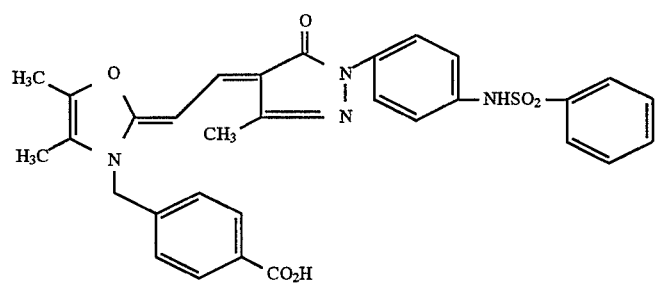
VI-20

TABLE VI-continued
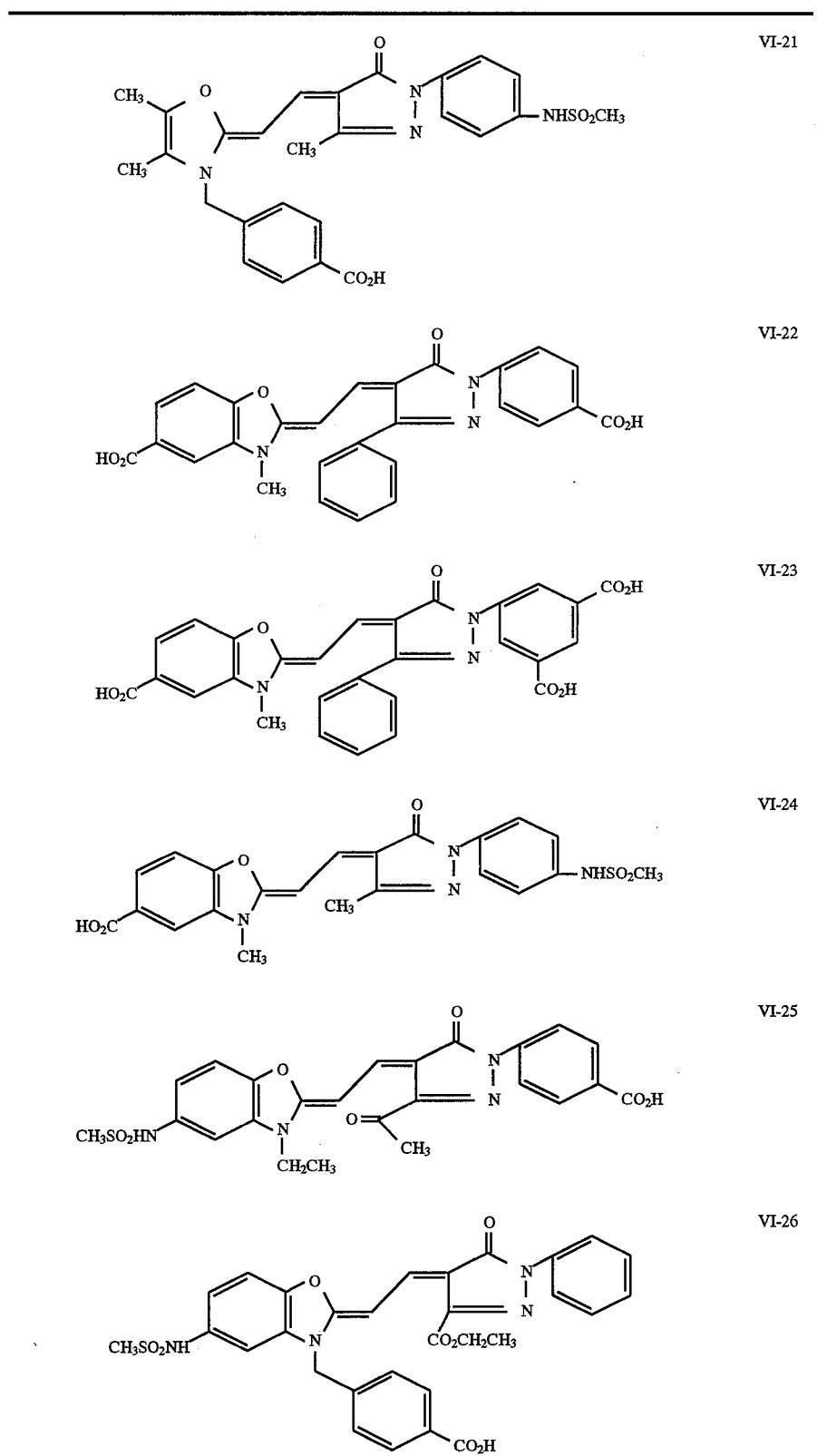
VI-21
VI-22
VI-23
VI-24
VI-25
VI-26

TABLE VI-continued
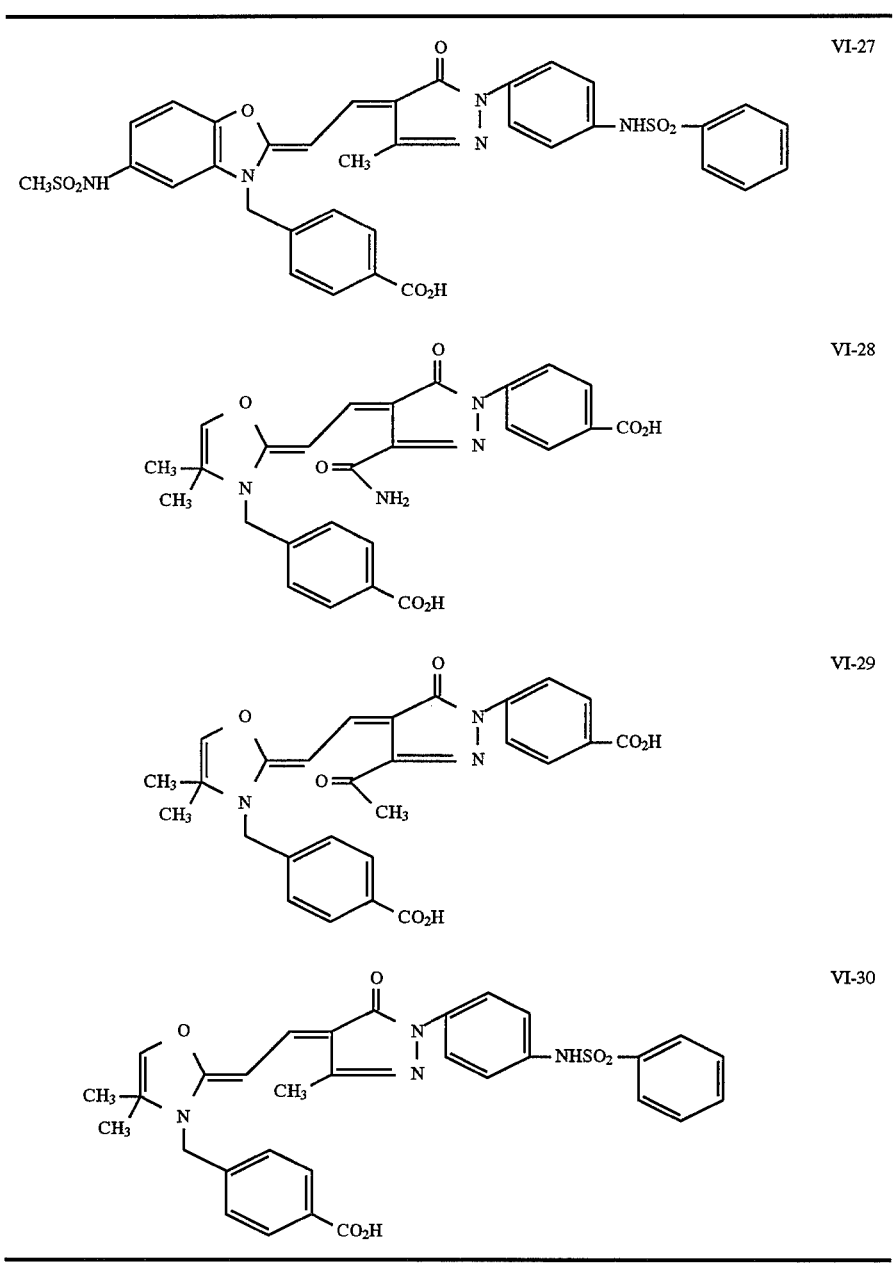
TABLE VII
| $R^1$ | $R^2$ | Dye |
|---|---|---|
| n-$C_6H_{13}SO_2NH$ | $CH_3$ | VII-1 |
| $CH_3SO_2NH$ | $C_3H_7$ | VII-2 |
| $CH_3SO_2NH$ | n-$C_6H_{13}$ | VII-3 |
| H | $CH_3$ | VII-4 |

TABLE VII-continued

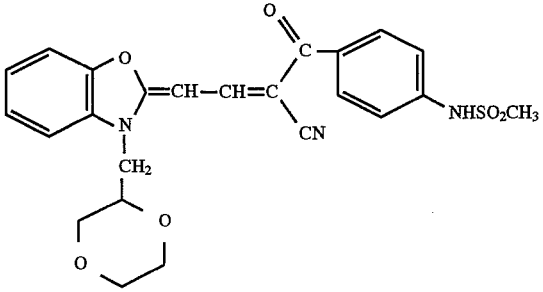

VII-5

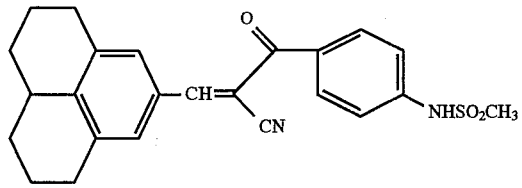

VII-6

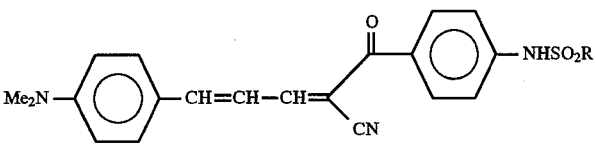

| R₁ | R₂ | R₃ | Dye |
|---|---|---|---|
| H | CH₃CH₂ | CH₃OCH₂CH₂SO₂NH | VII-7 |
| H | CH₃ | CH₃SO₂NH | VII-8 |
| CH₃OCH₂CH₂SO₂NH | CH₃CH₂ | CH₃OCH₂CH₂SO₂NH | VII-9 |
| CH₃OCH₂CH₂SO₂NH | CH₃CH₂ | n-C₆H₁₃—SO₂NH | VII-10 |
| CH₃SO₂NH | CH₃OCH₂CH₂ | CH₃SO₂NH | VII-11 |
| CH₃SO₂NH | CH₃OCH₂CH₂ | n-C₃H₇—SO₂NH | VII-12 |
| CH₃OCH₂CH₂SO₂NH | CH₃OCH₂CH₂ | n-C₃H₇—SO₂NH | VII-13 |
| CH₃CH₂SO₂NH | CH₃CH₂ | CH₃SO₂NH | VII-14 |
| CH₃CH₂SO₂NH | CH₃ | CH₃SO₂NH | VII-15 |
| CH₃OCH₂CH₂SO₂NH | CH₃OCH₂CH₂ | CH₃OCH₂CH₂SO₂NH | VII-16 |
| n-C₆H₁₃—SO₂NH | CH₃OCH₂CH₂ | CH₃SO₂NH | VII-17 |
| CH₃OCH₂CH₂SO₂NH | CH₃OCH₂CH₂ | n-C₆H₁₃—SO₂NH | VII-18 |
| CH₃SO₂NH | CH₃ | CH₃SO₂NH | VII-19 |
| CH₃CH₂(OCH₂CH₂)₂SO₂NH | CH₃CH₂ | CH₃SO₂NH | VII-20 |
| CH₃CH₂(OCH₂CH₂)₂SO₂NH | CH₃CH₂ | i-C₃H₇—SO₂NH | VII-21 |
| n-C₃H₇—SO₂NH | CH₃CH₂ | CH₃SO₂NH | VII-22 |
| CH₃CH₂(OCH₂CH₂)₂SO₂NH | CH₃CH₂ | CH₃CH₂SO₂NH | VII-23 |
| CH₃SO₂NH | CH₃CH₂ | CH₃CH₂SO₂NH | VII-24 |
| CH₃CH₂SO₂NH | CH₃CH₂ | CH₂CH₂SO₂NH | VII-25 |
| n-C₄H₉SO₂NH | CH₃CH₂ | CH₃SO₂NH | VII-26 |
| n-C₄H₉SO₂NH | CH₃ | CH₃SO₂NH | VII-27 |
| CH₃SO₂NH | CH₃CH₂ | n-C₄H₉—SO₂NH | VII-28 |

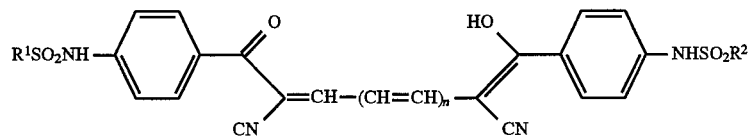

| R | Dye |
|---|---|
| CH₃ | VII-29 |
| n-C₃H₇ | VII-30 |

TABLE VII-continued

| $R^1$ | $R^2$ | n | Dye |
|---|---|---|---|
| $CH_3$ | $CH_3$ | 1 | VII-31 |
| $n-C_3H_7$ | $n-C_3H_7$ | 1 | VII-32 |
| $CH_3$ | $CH_3$ | 2 | VII-33 |
| $n-C_3H_7$ | $n-C_3H_7$ | 2 | VII-34 |

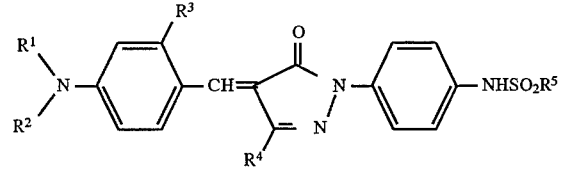

| $R^1$ | $R^2$ | $R^3$ | $R^4$ | $R^5$ | Dye |
|---|---|---|---|---|---|
| $i-C_3H_7O_2CCH_2$ | $i-C_3H_7O_2CCH_2$ | H | $CH_3$ | Ph | VII-35 |
| $i-C_3H_7O_2CCH_2$ | $i-C_3H_7O_2CCH_2$ | $CH_3$ | $CH_3$ | Ph | VII-36 |
| $CH_3$ | $CH_3$ | H | $CH_3$ | $CH_3$ | VII-37 |

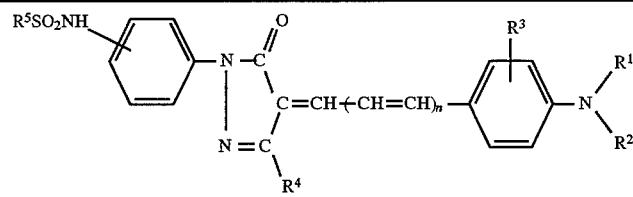

| $R^1, R^2$ | $R^3$ | $R^4$ | $R^5$ | n | Dye |
|---|---|---|---|---|---|
| $CH_3CH_2$ | H | $CH_3$ | $CH_3$ | 0 | VII-38 |
| $n-C_4H_9$ | H | $CH_3$ | $CH_3$ | 0 | VII-39 |
| $CH_3$ | H | $CO_2CH_2CH_3$ | $CH_3$ | 0 | VII-40 |
| $i-C_3H_7O_2CCH_2$ | $CH_3$ | $CH_3$ | $CH_3CH_2$ | 0 | VII-41 |
| $CH_3$ | H | $CH_3$ | $n-C_3H_7$ | 0 | VII-42 |
| $CH_3CH_2$ | H | $CH_3$ | $CH_3CH_2$ | 0 | VII-43 |
| $n-C_4H_9$ | H | $CH_3$ | $CH_3CH_2$ | 0 | VII-44 |
| $i-C_3H_7O_2CCH_2$ | H | $CH_3$ | $CH_3$ | 0 | VII-45 |
| $i-C_3H_7O_2CCH_2$ | $CH_3$ | $CH_3$ | $CH_3$ | 0 | VII-46 |
| $i-C_3H_7O_2CCH_2$ | H | $CH_3$ | $n-C_3H_7$ | 0 | VII-47 |
| $CH_3$ | H | $\overset{O}{\underset{CH_3}{C}}$ | $CH_3CH_2$ | 1 | VII-48 |
| $CH_3$ | H | $CO_2CH_2CH_3$ | $CH_3CH_2$ | 0 | VII-49 |
| $CH_3CH_2$ | H | $CO_2CH_2CH_3$ | $CH_3CH_2$ | 0 | VII-50 |

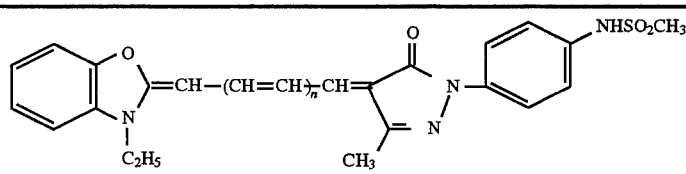

| n | Dye |
|---|---|
| 1 | VII-51 |
| 0 | VII-52 |

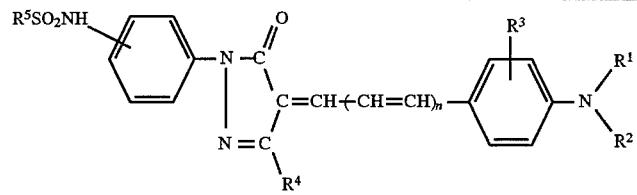

| $R^1, R^2$ | $R^3$ | $R^4$ | $R^5$ | n | Dye |
|---|---|---|---|---|---|
| $CH_3$ | H | $CF_3$ | $CH_3$ | 0 | VII-53 |

TABLE VII-continued

| | | | | | |
|---|---|---|---|---|---|
| CH₃ | H | Ph | CH₃ | 0 | VII-54 |
| CH₃ | H | −C(=O)CH₃ | CH₃ | 0 | VII-55 |
| CH₃ | H | CH₃ | CH₃ | 1 | VII-56 |
| CH₃ | H | −CO₂CH₂CH₂ | CH₃ | 1 | VII-57 |

VII-58: structure with Et₂N−C₆H₄−CH=C(COCH₃)−(furan O)−C₆H₄−NHSO₂CH₃

Bis-pyrazolone dye structure: R¹SO₂NH−C₆H₄−N(pyrazolone, R²)=CH−(CH=CH)ₙ−C(OH)=(pyrazole, R²)−N=N−C₆H₄−NHSO₂R¹

| R¹ | R² | n | Dye |
|---|---|---|---|
| Ph | CH₃ | 1 | VII-59 |
| CH₃ | CH₃ | 1 | VII-60 |
| CH₃ | CH₃ | 2 | VII-61 |
| CH₃ | CH₃ | 0 | VII-62 |

VII-63: pyrrole with =C(CN)₂ substituent and N-aryl bearing NHSO₂(CH₂)₃CH₃

VII-64: 4-hydroxy-naphthalene azo dye with 8-NHSO₂(3-SO₂NH₂-phenyl) and azo coupled to 2-SO₂CH₃-4-NO₂-phenyl TABLE VII-continued
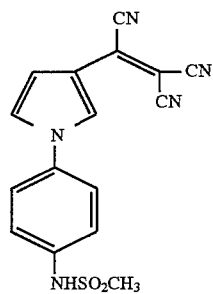 VII-65
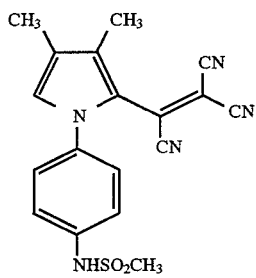 VII-66
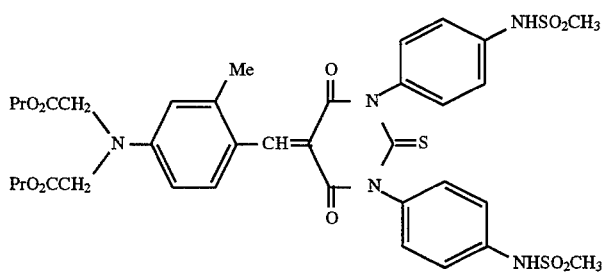 VII-67
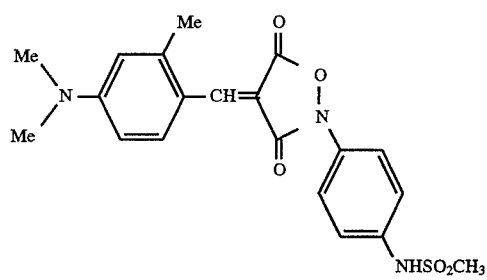 VII-68
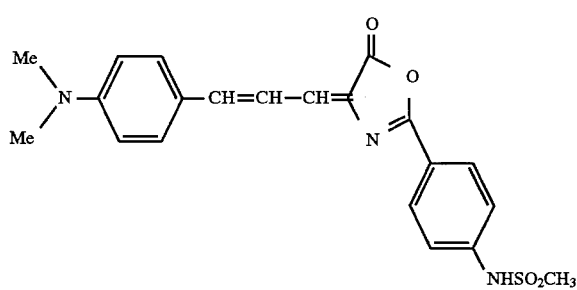 VII-69
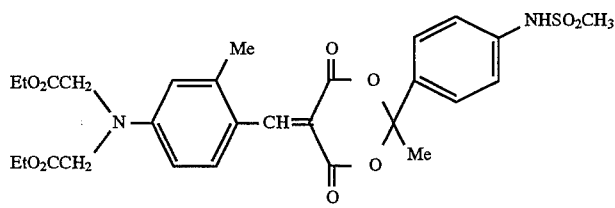 VII-70

TABLE VII-continued

VII-71

[Structure: dye VII-71 with EtO₂CCH₂ groups on N, tolyl, CH=CH-CH= linker to a dioxo ring containing O-C(Me)₂-O and aryl-NHSO₂CH₃]

[Structure: benzoxazole with R¹, R² substituents, =CH—CH= linker to pyrazolone-type ring with R³, and N-N-aryl-R⁴]

| R¹ | R² | R³ | R⁴ | Dye |
|---|---|---|---|---|
| CH₃SO₂NH | CH₃ | CH₃ | CONHSO₂CH₃ | VII-72 |
| CH₃CH₂SO₂NH | CH₃CH₂ | CO₂CH₂CH₃ | CONHSO₂Ph | VII-73 |
| n-C₃H₇SO₂NH | CH₃ | CONHSO₂CH₃ | Ph | VII-74 |
| H | CH₂PhNHSO₂CH₃ | CH₃ | SO₂NHCOCH₃ | VII-75 |
| H | CH₂PhCONHSO₂CH₃ | CH₃ | SO₂NHPh | VII-76 |
| CH₃SO₂ | CH₃CH₂ | CONHSO₂CH₃ | Ph | VII-77 |
| CH₃SO₂NHCO | CH₃ | CH₃ | CH₂SO₂NH | VII-78 |

VII-79

[Structure: dye VII-79 with EtO₂CCH₂ groups on N, tolyl, CH= linker to a central C with two C=O groups to N-aryl-NHSO₂CH₃ groups forming imide ring]

VII-80

[Structure: Et₂N-phenyl-CH=CH-CH= linker to C(=O) and N-O, with aryl-NHSO₂CH₃ substituent]

[Structure: benzoxazole with R¹, R², =CH—CH= linker to C(CN) and C(=O)-phenyl-R³]

| R¹ | R² | R³ | Dye |
|---|---|---|---|
| CH₃SO₂NHCO | CH₃ | CONHSO₂CH₃ | VII-81 |
| CH₃SO₂NH | CH₃CH₂ | CONHSO₂Ph | VII-82 |
| H | CH₂PhCONHSO₂CH₃ | NHSO₂CH₃ | VII-83 |
| H | CH₂PhNHSO₂CH₃ | NHSO₂CH₃ | VII-84 |
| CH₃SO₂NHCO | CH₃ | NHSO₂—C₃H₇-n | VII-85 |
| CH₃SO₂NH | CH₂PhNHSO₂Ph | NHSO₂—C₃H₇-n | VII-86 |

TABLE VII-continued

[Structure VII-87: A compound with Et₂N-substituted methylphenyl group connected via CH=C to an isoxazolone with a phenyl bearing NHSO₂CH₃]

[Structure VII-88: A bis-pyrazolone dye with phthalimide groups connected by a CH-CH=CH chain]

[Structure for VII-89 through VII-98: bis-pyrazolone structure with R¹-phenyl groups, R² substituents, and (CH=CH)ₙ linker with OH group]

| R¹ | R² | n | Dye |
| --- | --- | --- | --- |
| Ph | CONHSO₂CH₃ | 1 | VII-89 |
| SO₂NHCOCH₃ | CH₃ | 1 | VII-90 |
| SO₂NHPh | CH₃ | 1 | VII-91 |
| CONHSO₂CH₃ | CH₃ | 1 | VII-92 |
| CONHSO₂Ph | CH₃ | 1 | VII-93 |
| Ph | CONHSO₂CH₃ | 2 | VII-94 |
| SO₂NHCOCH₃ | CH₃ | 2 | VII-95 |
| SO₂NHPh | CH₃ | 2 | VII-96 |
| CONHSO₂CH₃ | CH₃ | 2 | VII-97 |
| CONHSO₂Ph | CH₃ | 2 | VII-98 |

[Structure: bis-benzoyl dicyano polyene dye with NHSO₂R groups]

R = CH₃    VII-99
R = n-C₃H₇    VII-100

[Structure for VII-101 through VII-106: Me₂N-phenyl-(CH=CH)ₙ-CH= connected to pyrazolone with R¹-phenyl and R² substituents]

| R¹ | R² | n | Dye |
| --- | --- | --- | --- |
| CONHSO₂CH₃ | CH₃ | 0 | VII-101 |
| Ph | CONHSO₂CH₃ | 0 | VII-102 |
| CONHSO₂Ph | CH₃ | 0 | VII-103 |
| Ph | CONHCOPh | 0 | VII-104 |
| SO₂NHCOCH₃ | CH₃ | 0 | VII-105 |
| CONHCO-p-NO₂—Ph | CH₃ | 0 | VII-106 |

TABLE VII-continued

| | | | |
|---|---|---|---|
| CONHSO₂CH₃ | CH₃ | 1 | VII-107 |
| Ph | CONHSO₂CH₃ | 1 | VII-108 |
| CONHSO₂Ph | CH₃ | 1 | VII-109 |
| Ph | CONHCOPh | 1 | VII-110 |
| SO₂NHCOCH₃ | CH₃ | 1 | VII-111 |
| CONHCO-p-NO₂—Ph | CH₃ | 1 | VII-112 |

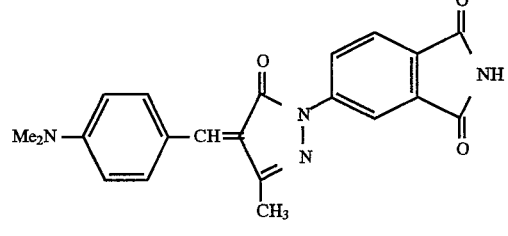

VII-113

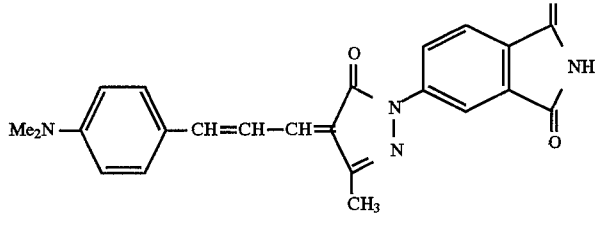

VII-114

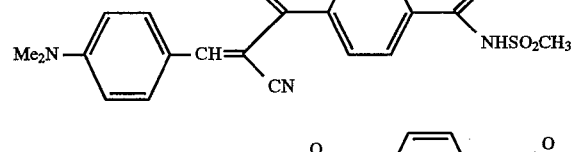

VII-115

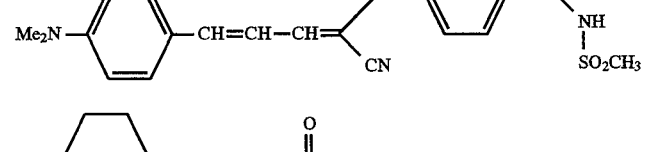

VII-116

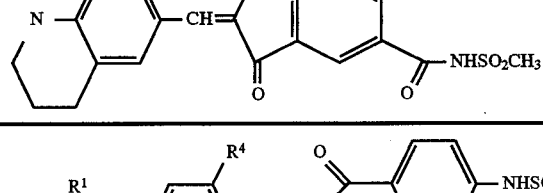

VII-117

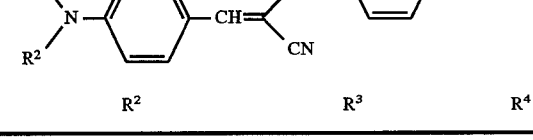

| R¹ | R² | R³ | R⁴ | Dye |
|---|---|---|---|---|
| i-C₃H₇O₂CCH₂ | i-C₃H₇O₂CCH₂ | n-C₃H₇ | CH₃ | VII-118 |
| C₂H₅ | CF₃CH₂O₂CCH₂ | CH₃ | CH₃ | VII-119 |
| i-C₃H₇O₂CCH₂ | i-C₃H₇O₂CCH₂ | CH₃ | CH₃ | VII-120 |
| C₂H₅ | CF₃CH₂O₂CCH₂ | n-C₃H₇ | CH₃ | VII-121 |
| CH₃ | CH₃ | CH₃ | H | VII-122 |
| CH₃ | CH₃ | CH₃CH₂ | H | VII-123 |
| CH₃ | CH₃ | n-C₃H₇ | H | VII-124 |
| CH₃ | CH₃ | n-C₄H₉ | H | VII-125 |

TABLE VII-continued
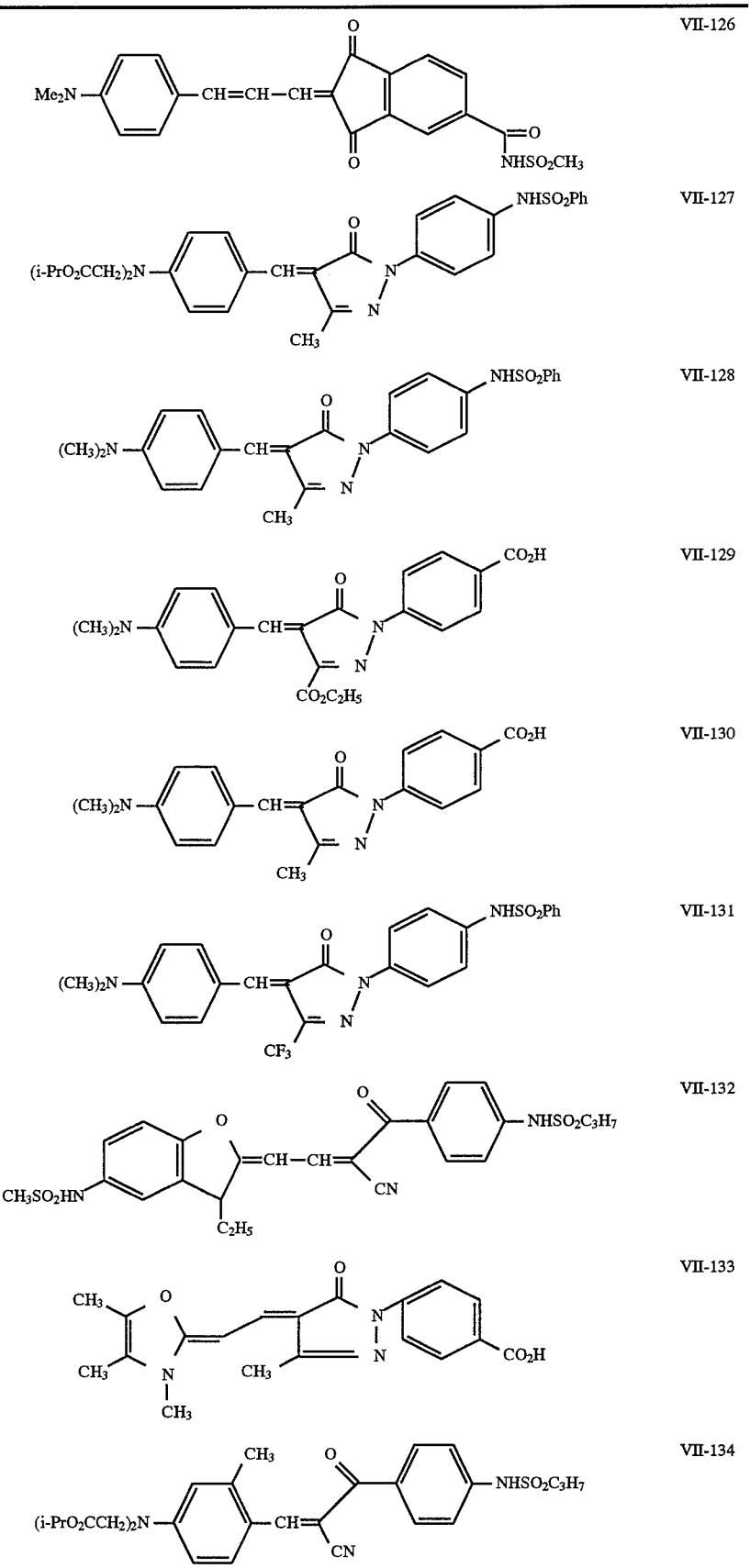

TABLE VII-continued
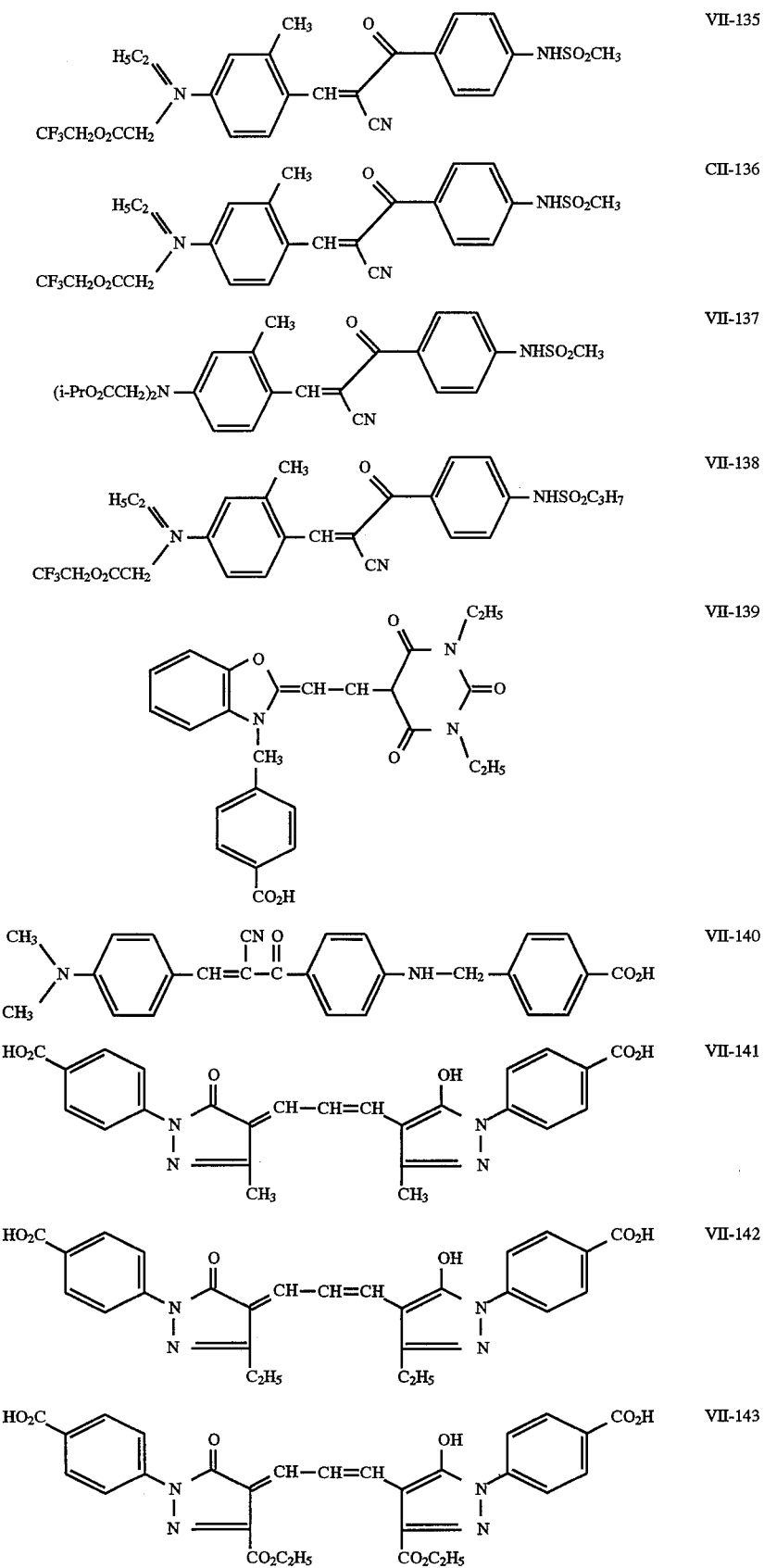

TABLE VII-continued
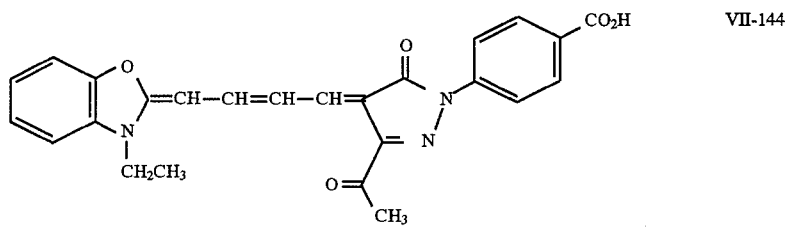 VII-144
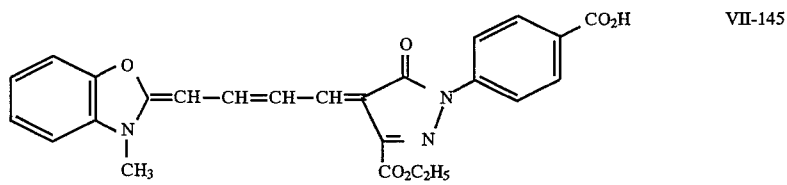 VII-145
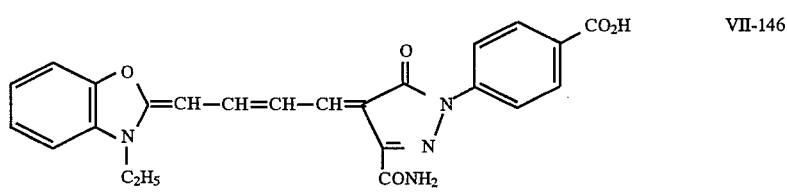 VII-146
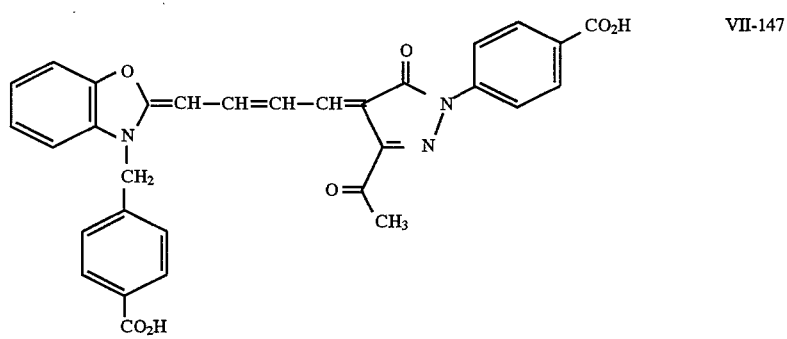 VII-147
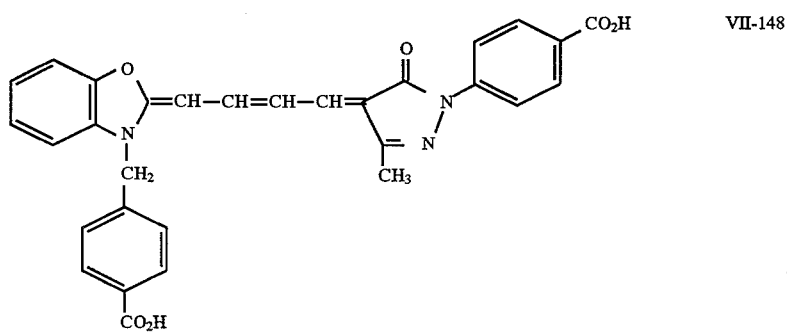 VII-148
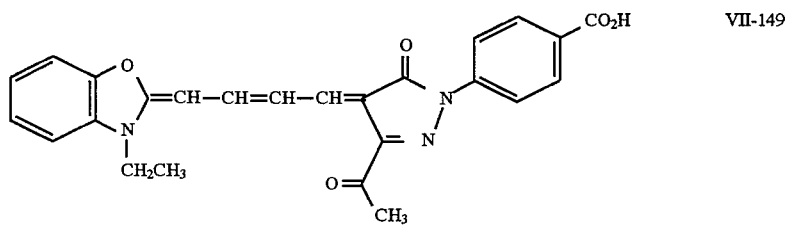 VII-149

TABLE VII-continued

VII-150, VII-151, VII-152, VII-153, VII-154, VII-155

TABLE VII-continued
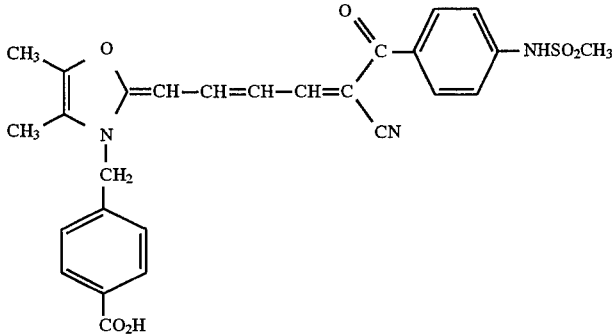 VII-156
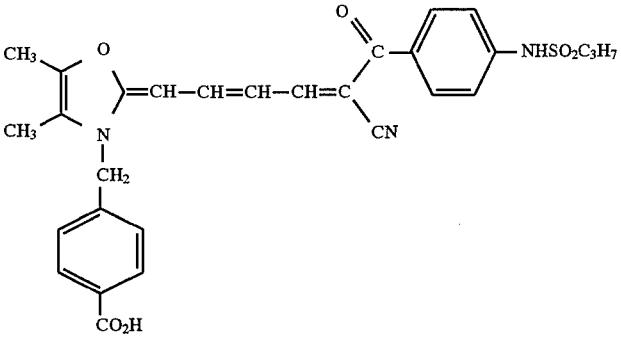 VII-157
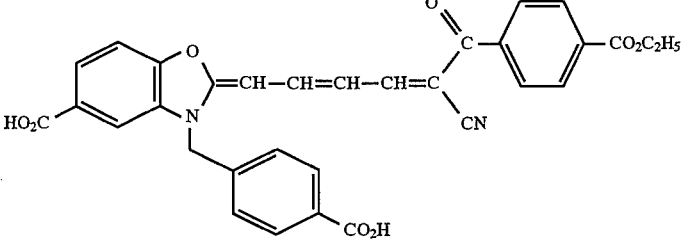 VII-158
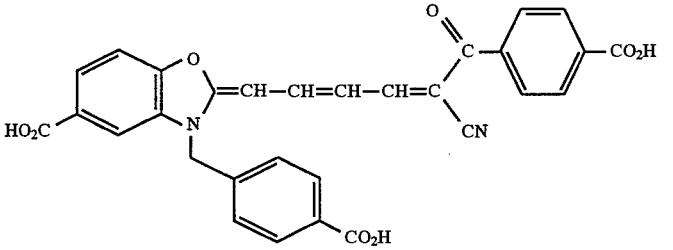 VII-159
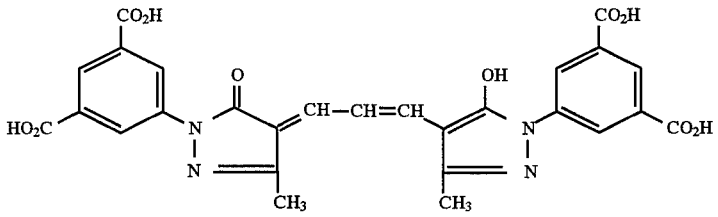 VII-160
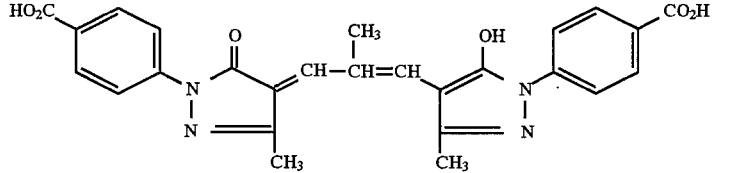 VII-161

TABLE VII-continued

| $R^1$ | $R^2$ | $R^3$ | Dye |
|---|---|---|---|
| $CH_3$ | H | $CO_2H$ | VII-167 |
| $CH_3CO$ | H | $CO_2H$ | VII-168 |
| $CO_2CH_2CH_3$ | H | $CO_2H$ | VII-169 |
| $CH_3$ | $CO_2H$ | H | VII-170 |
| $CO_2CH_2CH_3$ | $CO_2H$ | H | VII-171 |

TABLE VII-continued

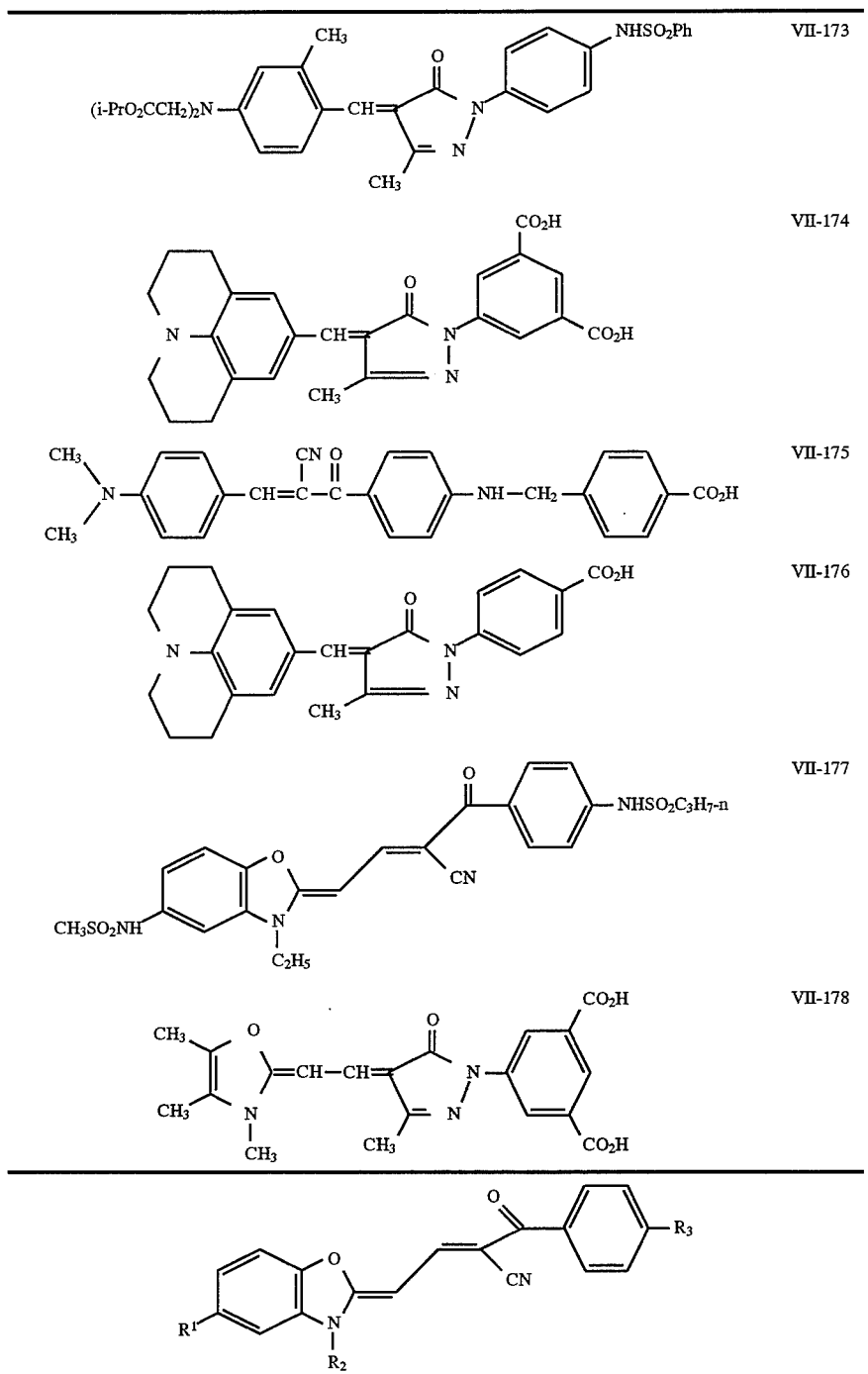

| $R_1$ | $R_2$ | $R_3$ | Dye |
|---|---|---|---|
| H | $CH_3CH_2$ | $CH_3OCH_2CH_2SO_2NH$ | VII-179 |
| H | $CH_3$ | $CH_3SO_2NH$ | VII-180 |
| $CH_3OCH_2CH_2SO_2NH$ | $CH_3CH_2$ | $CH_3OCH_2CH_2SO_2NH$ | VII-181 |
| $CH_3OCH_2CH_2SO_2NH$ | $CH_3CH_2$ | $n-C_6H_{13}SO_2NH$ | VII-182 |
| $CH_2SO_2NH$ | $CH_3OCH_2CH_2$ | $CH_3SO_2NH$ | VII-183 |
| H | $CH_2PhCO_2H$ | $n-C_3H_7SO_2NH$ | VII-184 |
| $CH_3SO_2NH$ | $CH_3OCH_2CH_2$ | $n-C_3H_7SO_2NH$ | VII-185 |
| $CH_3OCH_2CH_2SO_2NH$ | $CH_3OCH_2CH_2$ | $n-C_3H_7SO_2NH$ | VII-186 |
| $CH_3CH_2SO_2NH$ | $CH_3CH_2$ | $CH_3SO_2NH$ | VII-187 |
| $CH_3CH_2SO_2NH$ | $CH_3$ | $CH_3SO_2NH$ | VII-188 |
| $CH_3OCH_2CH_2SO_2NH$ | $CH_3OCH_2CH_2$ | $CH_3OCH_2CH_2SO_2NH$ | VII-189 |
| $n-C_6H_{13}-SO_2NH$ | $CH_3OCH_2CH_2$ | $CH_3SO_2NH$ | VII-190 |

TABLE VII-continued

| | | | |
|---|---|---|---|
| CH₃OCH₂CH₂SO₂NH | CH₃OCH₂ | n-C₆H₁₃—SO₂NH | VII-191 |
| H | CH₂PhCO₂H | CH₃SO₂NH | VII-192 |
| CH₃SO₂NH | CH₃ | CH₃SO₂NH | VII-193 |
| CO₂H | CH₃ | CH₃SO₂NH | VII-194 |
| CO₂H | CH₃ | n-C₃H₇—SO₂NH | VII-195 |
| CH₃CH₂(OCH₂CH₂)₂SO₂NH | CH₃CH₂ | CH₃SO₂NH | VII-196 |
| CH₃CH₂(OCH₂CH₂)₂SO₂NH | CH₃CH₂ | n-C₃H₇—SO₂NH | VII-197 |
| n-C₃H₇—SO₂NH | CH₃CH₂ | CH₃SO₂NH | VII-198 |
| n-C₃H₇—SO₂NH | CH₃ | CH₃SO₂NH | VII-199 |
| CH₃SO₂NH | CH₃CH₂ | CH₃CH₂SO₂NH | VII-200 |
| CH₃CH₂SO₂NH | CH₃CH₂ | CH₃CH₂SO₂NH | VII-201 |
| n-C₄H₉—SO₂NH | CH₃CH₂ | CH₃SO₂NH | VII-202 |
| n-C₄H₉—SO₂NH | CH₃CH₂ | CO₂H | VII-203 |
| n-C₄H₉—SO₂NH | CH₃ | CH₃SO₂NH | VII-204 |
| CH₃SO₂NH | CH₃CH₂ | n-C₄H₉SO₂NH | VII-205 |

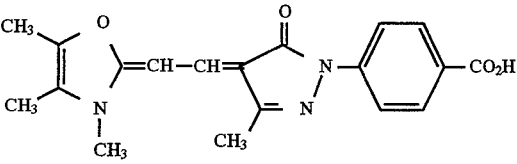

VII-206

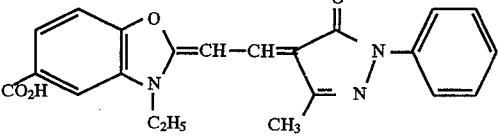

VII-207

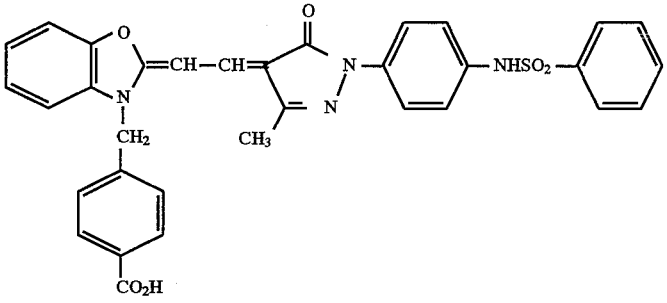

VII-208

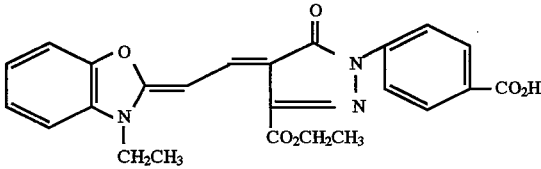

VII-209

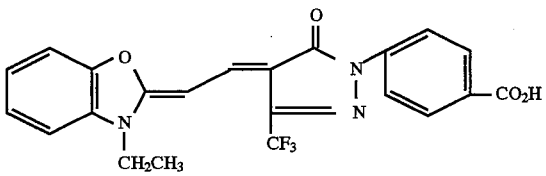

VII-210

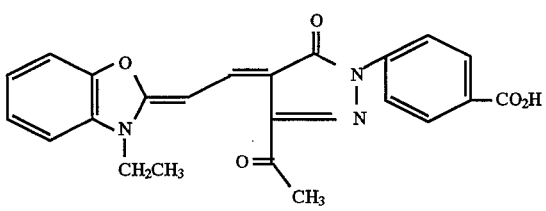

VII-211

TABLE VII-continued

Structures VII-212 through VII-218 (chemical structures not transcribed).

TABLE VII-continued

| | |
|---|---|
| (structure) | VII-219 |
| (structure) | VII-220 |
| (structure) | VII-221 |
| (structure) | VII-222 |
| (structure) | VII-223 |
| (structure) | VII-224 |

TABLE VII-continued
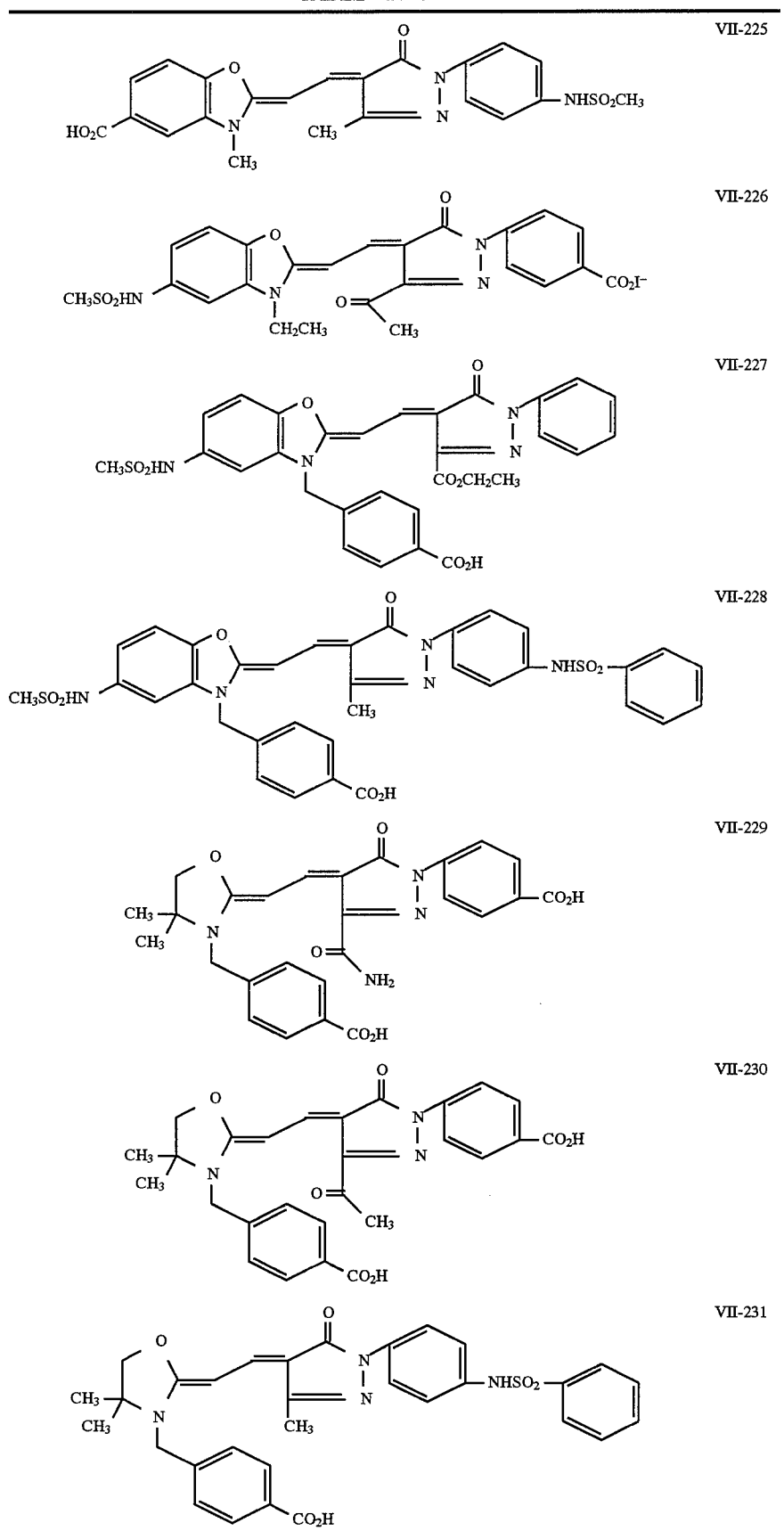

TABLE VII-continued
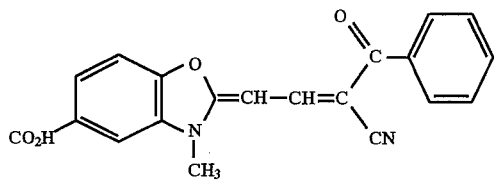　VII-232
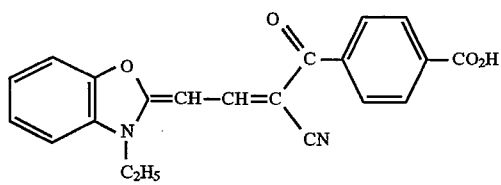　VII-233
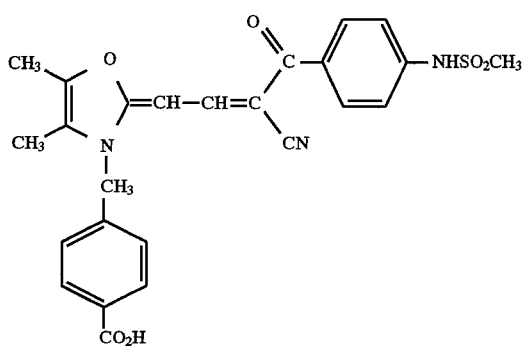　VII-234
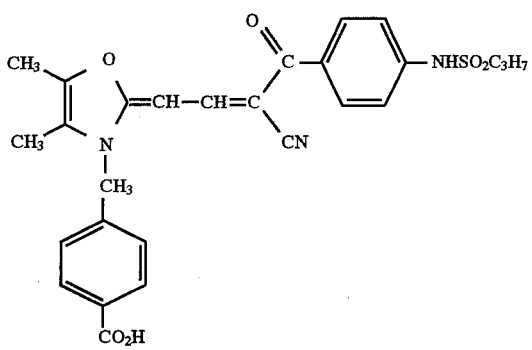　VII-235
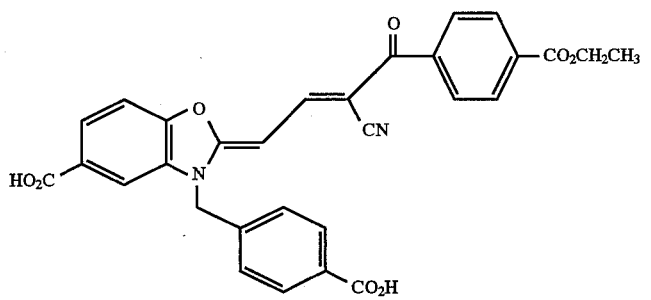　VII-236

TABLE VII-continued
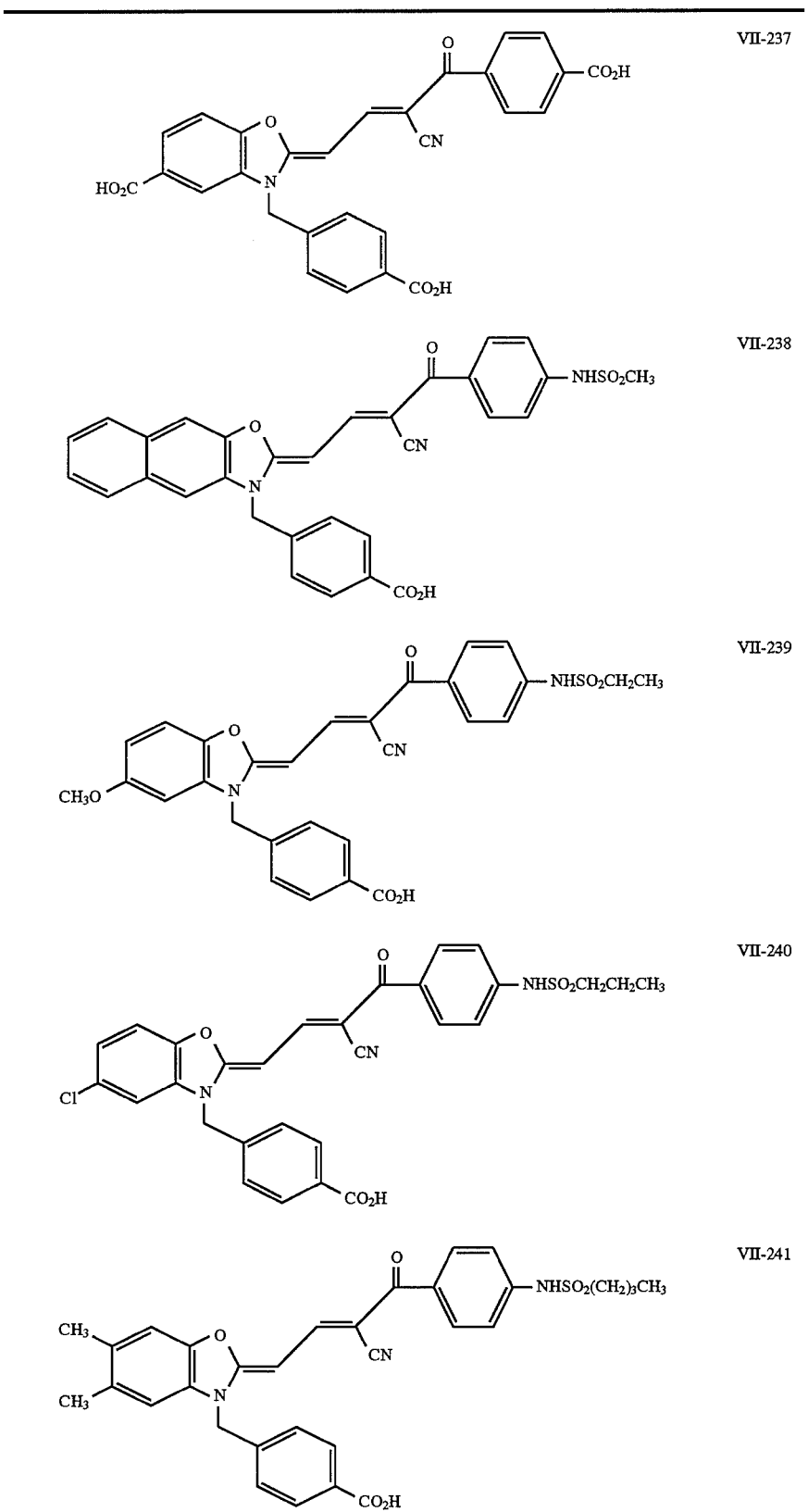
VII-237
VII-238
VII-239
VII-240
VII-241

TABLE VII-continued
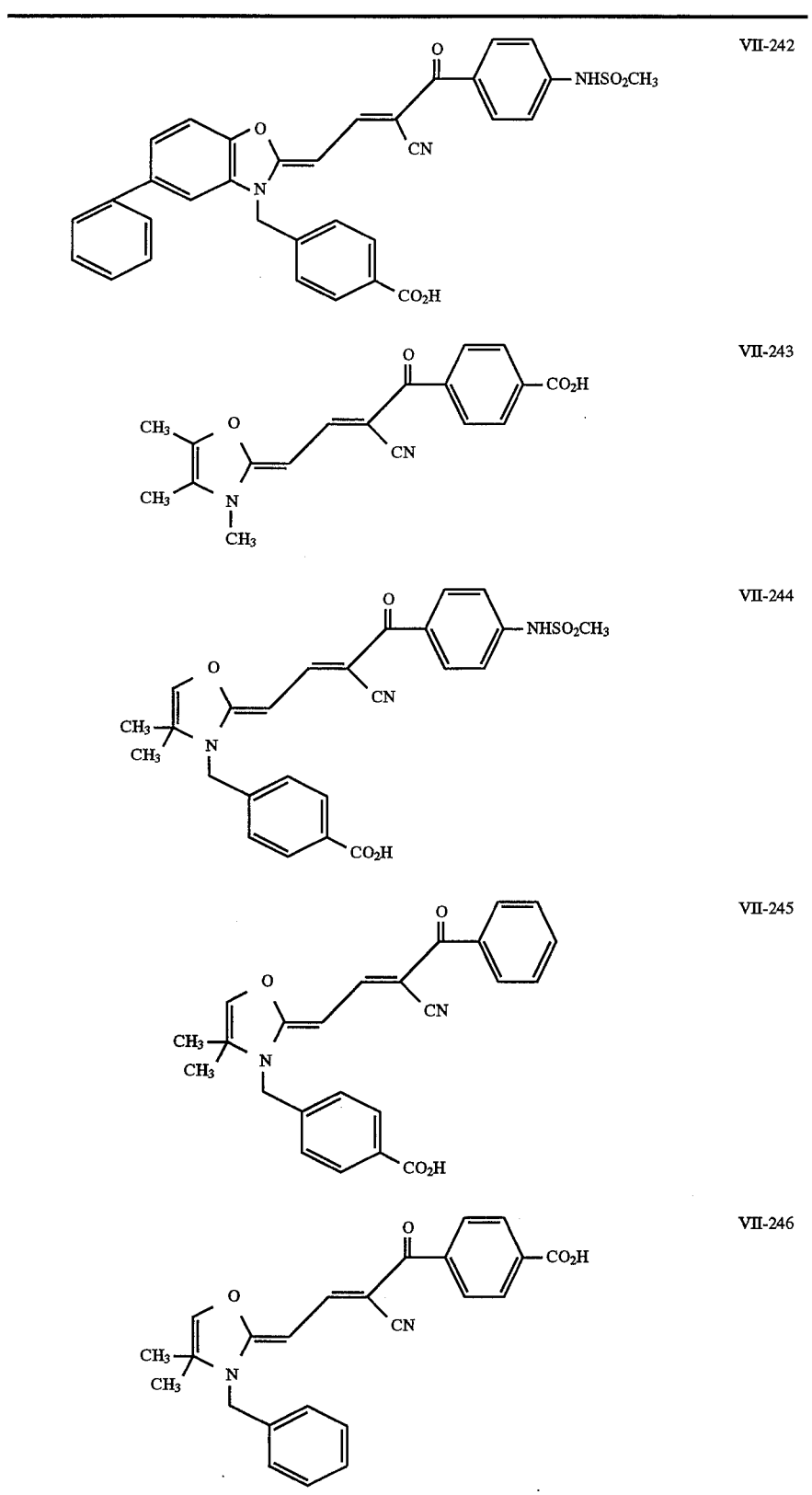
VII-242
VII-243
VII-244
VII-245
VII-246

TABLE VII-continued
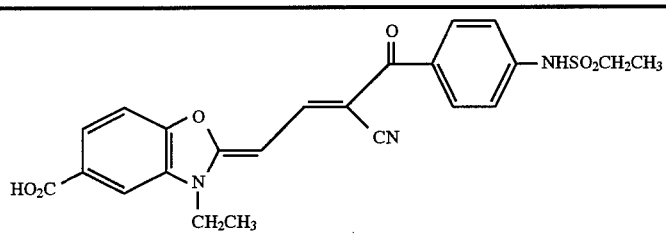
VII-247
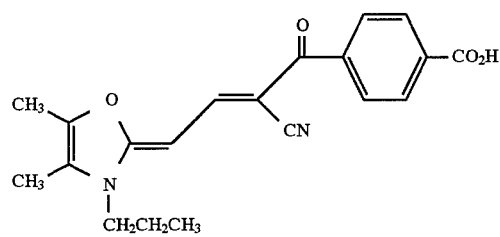
VII-248
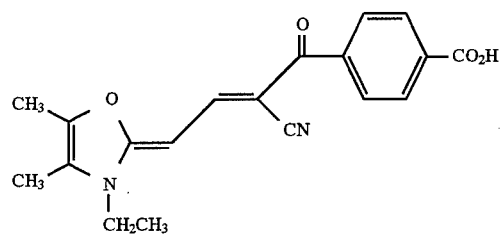
VII-249
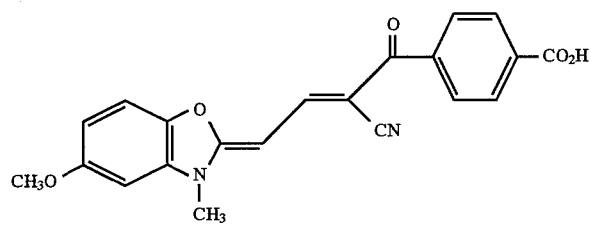
VII-250
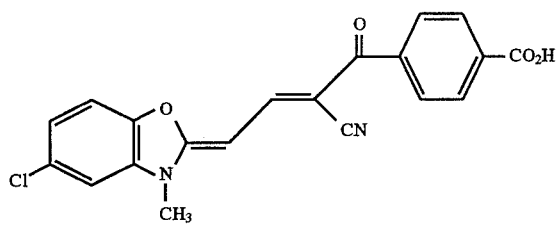
VII-251
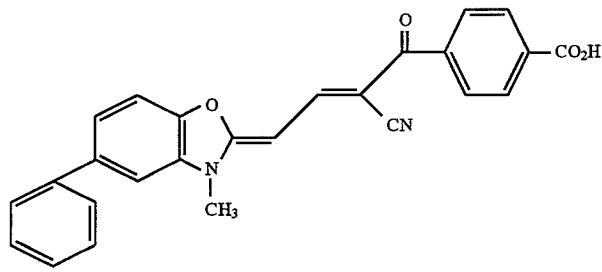
VII-252
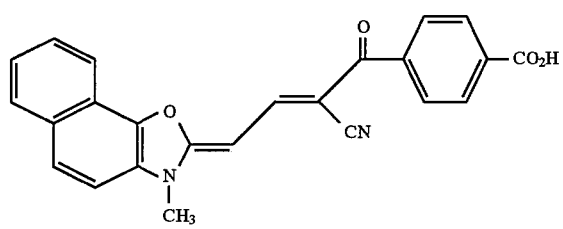
VII-253

TABLE VII-continued
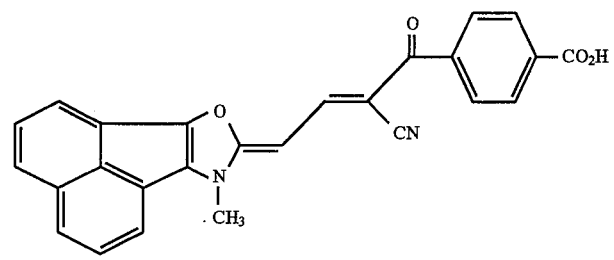
VII-254
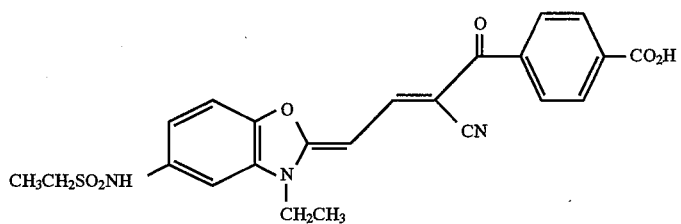
VII-255
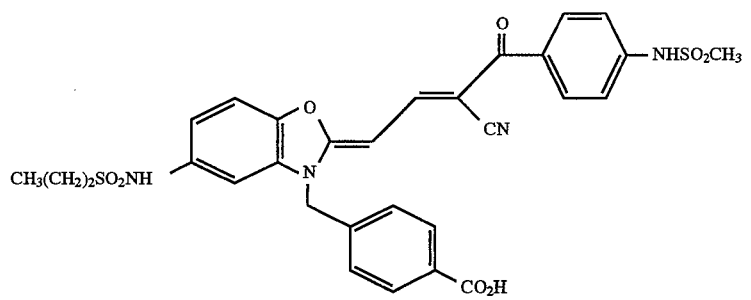
VII-256
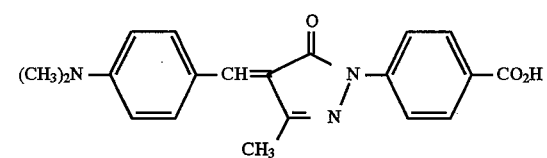
VII-257
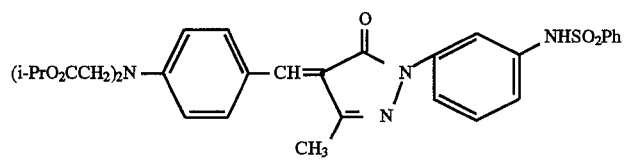
VII-258
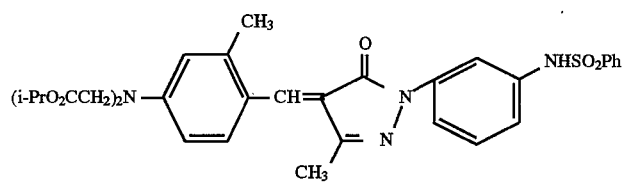
VII-259
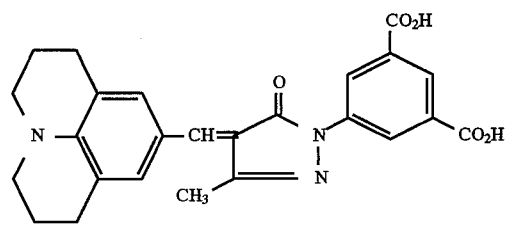
VII-260

TABLE VII-continued

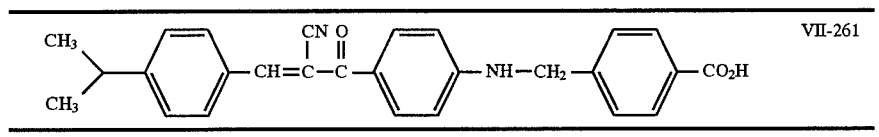
VII-261

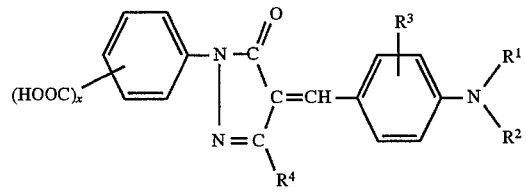

| $R^1, R^2$ | $R^3$ | $R^4$ | 1-Ph Subst. x-Position | | Dye |
|---|---|---|---|---|---|
| $CH_3CH_2$ | H | $CH_3$ | 1 | 4 | VII-262 |
| $n-C_4H_9$ | H | $CH_3$ | 1 | 4 | VII-263 |
| $CH_3$ | H | $CO_2CH_2CH_3$ | 1 | 4 | VII-264 |
| $i-C_3H_7OCCH_2$<br>$\quad \\\!\!O$ | $CH_3$ | $CH_3$ | 1 | 4 | VII-265 |
| $CH_3$ | H | $CH_3$ | 2 | 3,5 | VII-266 |
| $CH_3CH_2$ | H | $CH_3$ | 2 | 3,5 | VII-267 |
| $n-C_4H_9$ | H | $CH_3$ | 2 | 3,5 | VII-268 |
| $i-C_3H_7OCCH_2$<br>$\quad \\\!\!O$ | H | $CH_3$ | 2 | 3,5 | VII-269 |
| $i-C_3H_7OCCH_2$<br>$\quad \\\!\!O$ | $CH_3$ | $CH_3$ | 2 | 3,5 | VII-270 |
| $i-C_3H_7OCCH_2$<br>$\quad \\\!\!O$ | H | $CH_3$ | 1 | 4 | VII-271 |
| $CH_3$ | H | $CO_2CH_2CH_3$ | 2 | 3,5 | VII-272 |
| $CH_3CH_2$ | H | $CO_2CH_2CH_3$ | 1 | 4 | VII-273 |
| $CH_3$ | H | $CF_3$ | 1 | 4 | VII-274 |
| $CH_3$ | H | Ph | 1 | 4 | VII-275 |
| $CH_3$ | H | $-C(\\\!\!O)CH_3$ | 1 | 4 | VII-276 |

The starting filter dyes can be prepared by well-known techniques such as those described in U.S. Pat. Nos. 2,274,782; 4,857,446; 4,855,221; 4,900,653; 4,940,654; 4,948,717; 4,948,718; 4,950,586; 4,988,611 and 4,994,356, which are hereby incorporated herein by reference.

The microprecipitation processes of the invention are preceded in all cases by the dissolution of the filter dye of interest. Such dissolution is generally accomplished by preparing a concentrated slurry of the powdered solid filter dye in water or a mixture of water and a water miscible organic solvent such as methanol, ethanol, isopropanol, tetrahydrofuran or the like. The preferred solvent is water although water mixtures containing less than about 50 volume % of solvent (relative to water), more preferably less than about 10 volume %, are also advantageous.

The upper limit of dye concentration in solution will vary with the particular dye and "cation-hydroxide" used to prepare the dye stock solution. Generally, the concentration of dye in the slurry ranges from about 0.1 to 50 weight %, preferably 0.1 to 20 weight %.

If the precipitation of the filter dye dispersion is to be done by solvent-shifting whereby precipitation occurs as a result of supersaturation of dye in the solvent system after dilution by water, complete dissolution is accomplished at this stage and the homogeneous dye solution is stored until used. When precipitation is to be facilitated by the addition of acid and the filter dye is not significantly soluble in the aqueous slurry or water/water miscible solvent slurry, alkali is added to the slurry to promote dissolution.

Any suitable alkali hydroxide can be used including the hydroxide of sodium, lithium, potassium, cesium, rubidium, with sodium and/or potassium being preferred. Any suitable tetraalkylammonium hydroxide can be used, with tetramethylammonium hydroxide being preferred.

A solution of the hydroxide in water or a mixture of water and a water miscible solvent such as methanol, ethanol, isopropanol, tetrahydrofuran or the like can be used. Water is preferred although water/solvent mixtures containing less than about 50 volume % of solvent, preferably less than about 10 volume %, are also advantageous.

For the purpose of dye dissolution, alkali (base) solution is preferably added by a controller to maintain the high pH necessary for dye dissolution. As the dye dissolves, hydroxide ions are consumed by the protons that come off the acid sites on the dye. As the aqueous hydroxide ions are consumed thereby, the pH tends to fall. Addition of aqueous hydroxide at an automatically controlled, not necessarily constant, rate can be made to keep the pH essentially constant or in a convenient range of pH 7 to pH 12 or preferably in the range of pH 8.5 to pH 10.

Any suitable concentration of the hydroxide in solution can be used, preferably concentrations ranging from about 0.1 to 6 molar, particularly when the preferred aqueous sodium hydroxide is employed. Sufficient hydroxide is added to the filter dye slurry to dissolve the filter dye under pH conditions controlled within a range of from about 8 to 12, preferably 8.5 to 10, to prepare dye stock solutions containing 0.1–20 weight % (w/w) dye. Such solutions are easily prepared by this process of the invention.

The solid dye sample need not necessarily be reduced to a dry powder before such dissolution but may be used in a form wetted with the principle organic solvent used in the last step of dye synthesis.

Dissolution is facilitated by the addition of dispersing aids such as stabilizers, dispersants, surfactants, or other polymeric colloids or polymeric stabilizers (aqueous gelatin, polyvinyl alcohol and the like) known in the an to the dye slurry and resulting stock solution. Examples of some preferred dispersing aids are listed in Table VIII below:

TABLE VIII

| | | |
|---|---|---|
| DA-1 | $CH_3-(CH_2)_{11}-SO_4^-Na^+$ | Sodium Dodecyl Sulfate |
| DA-2 | $CH_3-(CH_2)_{11}-C_6H_4-SO_3^-Na^+$ | Sodium Dodecyl Benzene Sulfonate |
| DA-3 | (bis(2-ethylhexyl) sulfosuccinate structure) | Aerosol OT (Cyanamid) |
| DA-4 | n-$C_{18}H_{37}$–N(CH–$CH_2$–$COO^-Na^+$)(COO$^-$Na$^+$) with C=O–$CH_2$–CH($SO_3^-Na^+$)–$COO^-Na^+$ | Aerosol 22 (Cyanamid) |
| DA-5 | t-$C_9H_{19}$–$C_6H_4$–O–($CH_2$–CH(–$CH_2$–OH)–O)$_{10}$–H | Olin 10G (Dixie) |
| DA-6 | n-$C_{12}H_{25}$–O–($CH_2$–$CH_2$–O)$_{12}$–$SO_3^-Na^+$ | Polystep B-23 (Stepan) |
| DA-7 | $C_8H_{17}$–$C_6H_4$–O–($CH_2$–CH–O)$_{12}$–OH | Triton TX-102 (Rohm & Haas) |
| DA-8 | 2,6-diisopropyl naphthalene sulfonate (tetraisopropyl naphthalene with $SO_3^-Na^+$) | Alkanol-XC (Du Pont) |
| DA-9 | R–O–C(=O)–CH($SO_3^-Na^+$)–$CH_2$–C(=O)–O–R, where R = CH(CH$_3$)C$_4$H$_9$ | Aerosol MA (Cyanamid) |

TABLE VIII-continued

| | | |
|---|---|---|
| DA-10 | 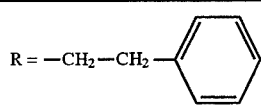 $R = -CH_2-CH_2-\text{phenyl}$ | |
| DA-11 | 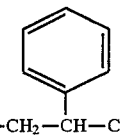 $R = -CH_2-CH-CH_3$ (with phenyl) | |
| DA-12 | $R = -CH_2-CH(CH_2CH_3)C_3H_7$ | |
| DA-13 | $R = -(CH_2)_n CH_3$ (n = 2, 3 & 5) | |
| DA-14 | 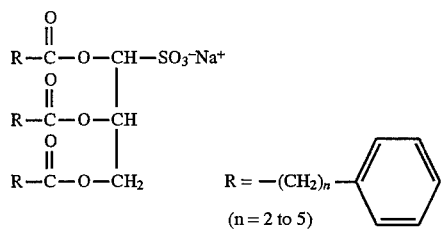 $R = -(CH_2)_n$-phenyl (n = 2 to 5) | |
| DA-15 | $n\text{-}C_{12}H_{25}-O-(CH_2-CH_2-O)_{23}-OH$ | Tricol LAL-23 (Emery) |
| DA-16 | 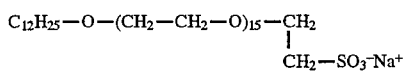 $C_{12}H_{25}-O-(CH_2-CH_2-O)_{15}-CH_2-CH_2-SO_3^-Na^+$ | Avanel S-150 (PPG) |
| DA-17 | 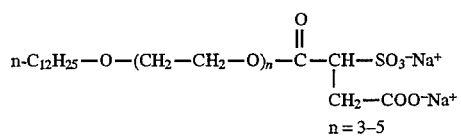 $n\text{-}C_{12}H_{25}-O-(CH_2-CH_2-O)_n-\overset{O}{\overset{\|}{C}}-CH(SO_3^-Na^+)-CH_2-COO^-Na^+$, n = 3–5 | Aerosol A102 (Cyanamid) |
| DA-18 | 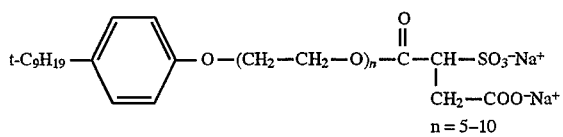 $t\text{-}C_9H_{19}\text{-phenyl-}O-(CH_2-CH_2-O)_n-\overset{O}{\overset{\|}{C}}-CH(SO_3^-Na^+)-CH_2-COO^-Na^+$, n = 5–10 | Aerosol A103 (Cyanamid) |
| DA-19 | 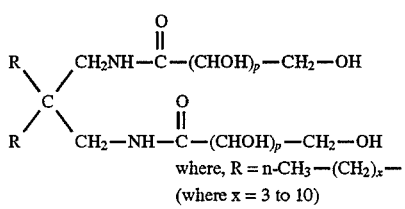 where, R = n-$CH_3-(CH_2)_x-$ (where x = 3 to 10); p = 3 to 10 | |
| DA-20 | 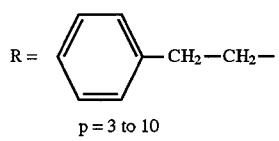 $R = $ phenyl-$CH_2-CH_2-$ | |
| DA-21 | 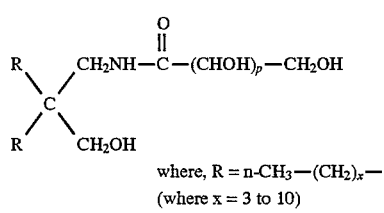 where, R = n-$CH_3-(CH_2)_x-$ (where x = 3 to 10) | |

TABLE VIII-continued
DA-22
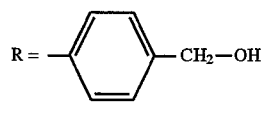
p = 3 to 15
DA-23
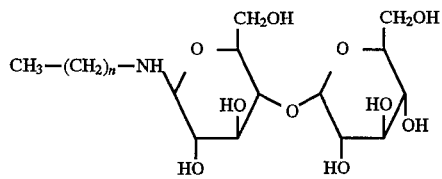
where, n = 3 to 15
DA-24
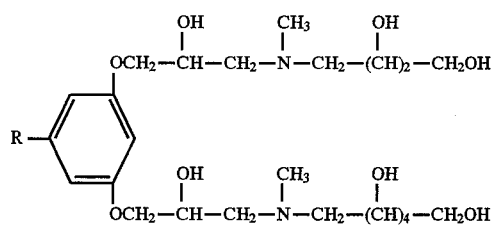
where, R = n-CH$_3$—(CH$_2$)$_x$—
(where x = 1 to 5)
DA-25
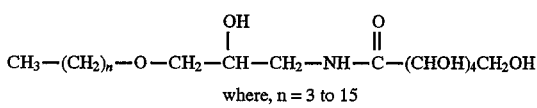
where, n = 3 to 15
DA-26
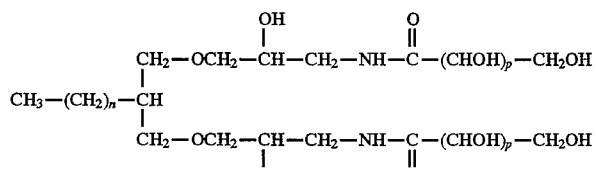
where, n = 2 to 12
p = 3 to 10
DA-27
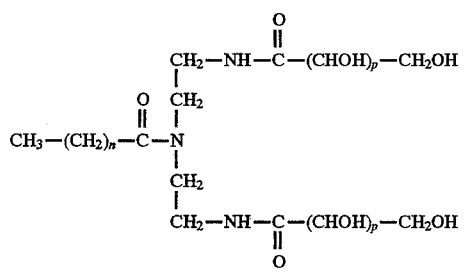
where, n = 2 to 18
p = 3 to 10

TABLE VIII-continued

DA-28

$$CH_3-(CH_2)_n-\overset{O}{\underset{\|}{C}}-\underset{|}{N}-\underset{|}{CH_2}$$
$$CH_3-(CH_2)_n-\underset{\|}{\underset{O}{C}}-\underset{|}{N}-\underset{|}{CH_2}$$

with pendant groups:
$CH_2-NH-\overset{O}{\underset{\|}{C}}-(CHOH)_p-CH_2OH$ (top)
$O-CH_2$ (linking)
$CH_2-NH-\overset{O}{\underset{\|}{C}}-(CHOH)_p-CH_2OH$ (bottom)

where, n = 2 to 18
p = 3 to 10

| ID | Name | Structure | Molecular Weight Range |
|---|---|---|---|
| DA-29 | Pluronic TM Polyols (BASF) | $HO-(CH_2CH_2-O)_a-(CH-CH_2-O)_b$ <br> $\quad\quad\quad\quad\quad\quad\quad\quad\quad\quad \| $ <br> $\quad\quad\quad\quad\quad\quad\quad\quad\quad CH_3$ <br> $\quad\quad\quad\quad\quad\quad H-(OCH_2-CH_2)_c$ | 1,100 to 14,000 |
| DA-30 | Pluronic TM-R Polyols (BASF) | $HO-(CH-CH_2-O)_a-(CH-CH_2-O)_b$ <br> $\quad\quad\quad \| \quad\quad\quad\quad\quad\quad \|$ <br> $\quad\quad\quad CH_3 \quad\quad\quad\quad\quad CH_3$ <br> $\quad\quad\quad\quad\quad\quad H-(O-CH_2-CH_2)_c$ <br> $\quad\quad\quad\quad\quad\quad\quad\quad\quad\quad\quad\quad \|$ <br> $\quad\quad\quad\quad\quad\quad\quad\quad\quad\quad\quad\quad CH_3$ | 1,100 to 14,000 |
| DA-31 | Plurodot TM Polyols (BASF) | Liquid Polyethers Based on Alkoxylated Triols | 3,200 to 7,500 |
| DA-32 | Tetronic TM Polyols (BASF) | $HO-(CH_2CH_2-O)_y-(CH-CH_2-O)_x$ <br> $\quad\quad\quad\quad\quad\quad\quad\quad\quad\quad \|$ <br> $\quad\quad\quad\quad\quad\quad\quad\quad\quad CH_3 \quad\quad N-CH_2-$ <br> $HO-(CH_2CH_2-O)_y-(CH-CH_2-O)_x$ <br> $\quad\quad\quad\quad\quad\quad\quad\quad\quad\quad \|$ <br> $\quad\quad\quad\quad\quad\quad\quad\quad\quad CH_3$ <br> $HO-(CH_2CH_2-O)_y-(CH-CH_2-O)_x$ <br> $\quad\quad\quad\quad\quad\quad\quad\quad\quad\quad \|$ <br> $\quad\quad\quad\quad\quad\quad\quad\quad\quad CH_3 \quad\quad N-CH_2-$ <br> $HO-(CH_2CH_2-O)_y-(CH-CH_2-O)_x$ <br> $\quad\quad\quad\quad\quad\quad\quad\quad\quad\quad \|$ <br> $\quad\quad\quad\quad\quad\quad\quad\quad\quad CH_3$ | 3,200 to 27,000 |
| DA-33 | (TX200) | $t\text{-}C_4H_9-CH_2C(CH_3)_2-\langle\text{phenyl}\rangle-OCH_2CH_2OCH_2CH_2$ <br> $\quad\quad\quad\quad\quad\quad\quad\quad\quad\quad\quad\quad\quad\quad\quad\quad\quad\quad\quad\quad \|$ <br> $\quad\quad\quad\quad\quad\quad\quad\quad\quad\quad\quad\quad\quad\quad\quad\quad\quad\quad\quad\quad SO_3^-Na^+$ | |
| DA-34 | (OMT) | $CH_3(CH_2)_7CH=CH(CH_2)_7C-N\overset{CH_3}{\underset{CH_2CH_2SO_3^-Na^+}{\diagdown}}$ with $\overset{O}{\underset{\|}{C}}$ | |

The process of the invention will be more particularly described with reference to the accompanying drawings of a preferred apparatus of the invention. Any other suitable apparatus for batch, continuous, or semi-continuous operation of the process of the invention can also be employed.

Precipitation by acidification in the form of a small particle sized colloid may be carried out by batch single-jet precipitation whereby a given volume of dye stock solution in the presence of appropriate dispersing aids and stabilizers is subjected to the addition of a suitable quantity of aqueous acid at a suitable rate and temperature such that the filter dye precipitates as a useful colloid with a particle size less than 10 µm in the largest dimension.

When prepared by a batch process, a batch reactor as shown in FIG. 1 is employed. Reactor 11 can be configured for operation in a single jet mode or double jet mode and can be jacketed for temperature control. The reactor should permit the temperature of the reaction mixture to be controlled in a range of from about 15° to 80° C., preferably 20° to 40° C. The reactor has sufficient volume to accommodate the pH controlled processes of the invention, generally 100 ml to 1600 liters.

Reagent reservoirs 22 and 13 hold acid solution and dye stock solution, respectively. These reagents are delivered to reactor 11 through delivery tubes 19 and 20 by the action of pumps 14 and 15.

The reactor also has high speed mechanical stirrer 18 which, in a preferred embodiment, is a disk affixed to the end of a rotating shaft to provide agitation when driven by motor 17 during the microprecipitation process. The reactor is also equipped with pH sensing electrodes 16 so that the rate of acid addition can be controlled to maintain a given pH set-point, range, or program during microprecipitation. The pH set-point generally ranges from about 3 to 6.5, preferably from about 4.5 to 5.5. A readily obtainable pH controller that provides the desired control features is a Radiometer-Copenhagen model TTT80 titrator. Any other suitable titrator which provides the desired pH and flow control features can also be employed.

The respective flow rates, stirring rates, temperature, and so on are controlled by circuitry and/or computer or microprocessor control algorithms implemented by a controller 28.

Preferably, reactor 11 is charged with a solution containing a dispersant, surfactant, and/or other suitable stabilizer as dispersing aids. Any suitable amounts of the dispersing aids can be employed, preferably totalling from about 0.01 to about 250% (w/w) of the amount of dye microprecipitated, more preferably from about 5 to about 100%.

In the single jet mode, reactor 11 is initially charged with a given volume (50 ml to 1600 liters) of dye stock solution in the presence of appropriate dispersing aids and stabilizers and subjected to the addition of a suitable quantity of aqueous acid (aqueous HCl, $H_2SO_4$, and the like) stock solution (corresponding on a mol equivalent basis to 0.3 to 1.0 molar equivalents of acid (protons) added per mol of ionized acid sites on the dye included in the reactor) from reservoir 22 which is pumped by means of pump 14 into the reactor at a suitable rate (0.1 ml/min to 16 l/min, preferably 0.5 ml/min to 3 l/min) and temperature (15° to 80° C., preferably 20° to 40° C.) such that the dye precipitates as a useful colloid with a particle size less than about 10 μm in largest dimension.

An appropriate pH generally ranges from about 3 to about 6.5, preferably 4.5 to 5.5. The overall pH in the reactor during precipitation is never allowed to drop below about 2. The desired reaction-time interval is the length of time over which acid is added plus the time the dispersion is allowed to equilibrate in the reactor following cessation of acid addition. Precipitation by acidification in the form of a small particle sized colloid may be done by batch double-jet precipitation whereby a given dye stock solution is metered into a batch reactor in the presence of appropriate dispersing aids and stabilizers (preferably from about 5 to about 100% of the dye precipitated) at a given flow rate (about 0.5 ml/min to 16 l/min), and subjected to the simultaneous addition of a suitable quantity of aqueous acid (preferably in the range of about 0.3 to 1.0 molar equivalents of acid protons added per mol of ionized acid sites on the dye added) at a suitable rate and temperature (preferably about 20° to 40° C.) such that the filter dye precipitates as a useful colloid having a particle size less than 10 μm (preferably less than 1 μm, most preferably less than 0.1 μm) in largest dimension. Acid solution may be added at a variable rate so as to maintain a particular pH or it may be added at a rate to maintain a particular pH profile as previously specified in an automatic control program. Alternatively, the acid stream may be added at a rate calculated to achieve a given volume of addition versus time profile irrespective of pH fluctuations.

In the single jet mode, as described earlier, reactor 11 is initially charged with dye solution and dispersing aid. Subsequently aqueous acid stock solution is pumped from reservoir 22 by means of pump 14 into reactor 11 according to the methods prescribed.

In the double jet mode, acid is added similarly. Dye solution is also added continuously in the double jet mode being pumped by means of pump 15 from reservoir 13 through injection tube 20. The pumping rates may be monitored and controlled using control circuitry 28. The mixing speed (stirring) may be controlled with circuitry in 28. The pH is monitored with pH meter circuitry in 28 and optionally pH-stat or other pH-control conditions are imposed using appropriate control circuitry in 28. Vessel volumes and pump flow rates are chosen as described above in accordance with the desired production scale.

Precipitation in the form of a small particle size colloid by acidification can be carried out continuously. A given volume of dye stock solution in the presence of appropriate dispersing aids and stabilizers is continuously metered into a mixing chamber and a corresponding acid stream is simultaneously metered into the same mixing chamber. The resulting colloidal filter dye exits the mixing chamber after a suitable delay and is stored until used.

Figure 2A:
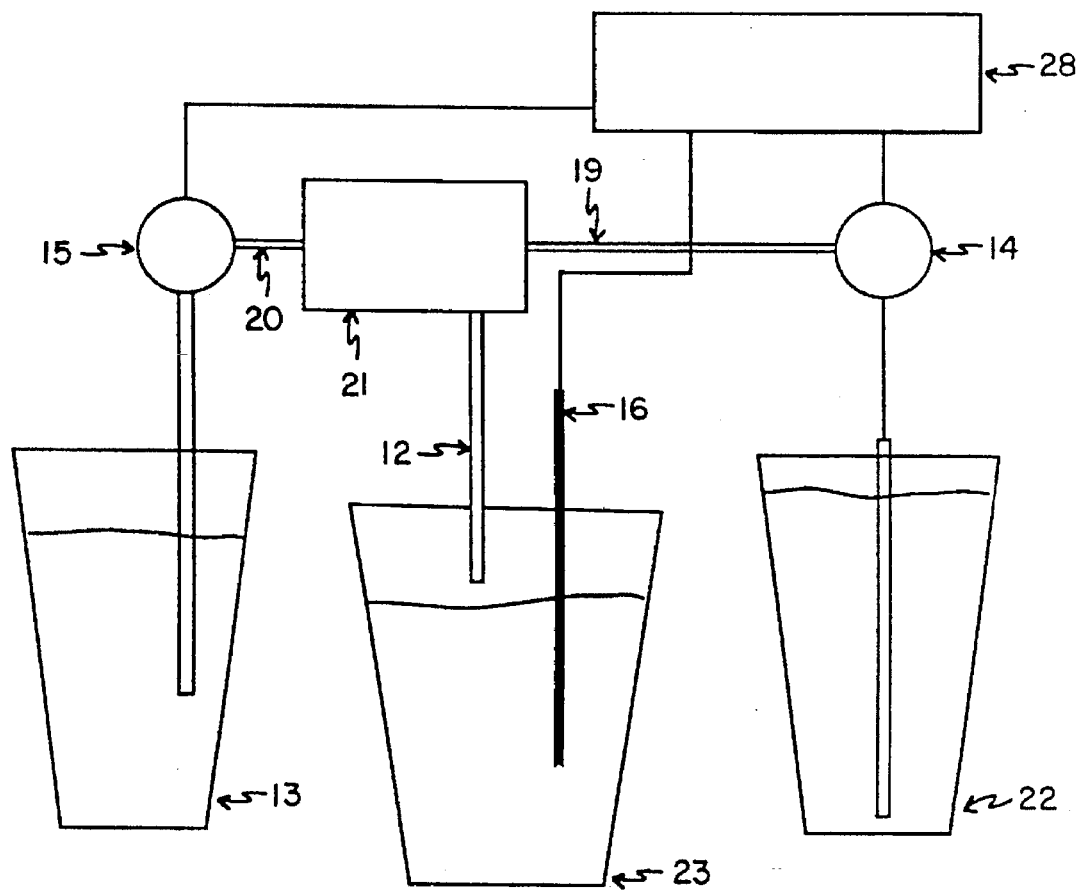
FIG. 2(a) is a schematic illustration of a continuous reactor for carrying out the process of the invention.

FIG. 2(a) schematically illustrates a continuous reactor for filter dye precipitation. Reservoirs 12 and 13, pumps 14 and 15, delivery tubes 19 and 20, pH probe 16, and control circuitry 28 are as described for FIG. 1. A generic mixer 21 with outlet 12 directs dispersion to reservoir 23. Reservoirs 22, 13, and 23 and mixer 21 may each be temperature controlled by conventional means.

Figure 2B:
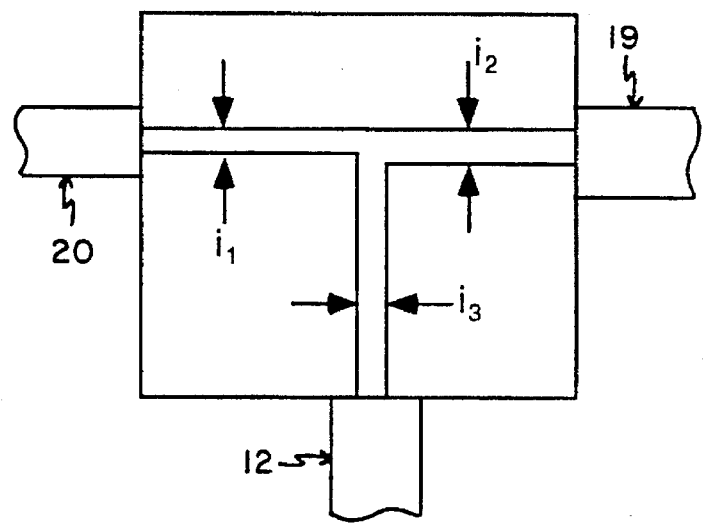
FIG. 2(b) is a cross section of a T-mixer design used in the continuous reactor of FIG. 2(a).

FIG. 2(b) shows in cross section a T-mixer design used in the continuous reactor of FIG. 2(a). Inlet tubes 19 and 20 and outlet tube 12 are as described for FIG. 2(a). In this embodiment, the continuation of the inlet tubes with inner diameters $i_1$ and $i_2$ meet at an angle of 180°, and the continuation of the outlet tube with inner diameter $i_3$ is situated at an angle of 90° to the inlet tube extensions.

Any batch or continuous method of precipitation may be used to accomplish precipitation by solvent shifting whereby dilution in water is used instead of the acid stream. Comparable flow rates and temperature ranges as described above for precipitation by acidification are used. Remaining water miscible organic solvent is removed by methods well known in the art, such as by diafiltration, evaporation, and distillation under reduced pressure.

Combinations of solvent shifting and acidification may be used as required to accomplish the precipitation of colloidal filter dyes.

Any suitable continuous precipitation technique can also be employed using any suitable continuous precipitation reactor with stoichiometric/pH control.

The mean diameter of the particles of filter dye in the microprecipitated dispersions prepared by the process of the invention range from about 3 to about 1000 nm, preferably from about 5 to about 100 nm.

The microprecipitated filter dye dispersions prepared by the process of the invention can be prepared in any suitable vehicle to which the filter dye dispersion has a solubility of less than about 0.05 weight % (w/w) such as, for example, those disclosed in U.S. Pat. No. 4,425,426, which is hereby incorporated herein by reference in its entirety, and *Research Disclosure* Section IX, and the publications cited therein, including an aqueous liquid having a pH low enough for the filter dye molecules to be insoluble, an organic solvent in which the filter dye is substantially insoluble, a monomer, or a polymeric binder or hydrophilic colloid. A gelatin solution is a preferred hydrophilic colloid.

Photographic elements can be prepared which comprise a support having disposed thereon a radiation sensitive emulsion layer and a layer, which can be the same as or different from the radiation sensitive layer, containing an amount effective as a photographic filter dye of a microprecipitated filter dye dispersion prepared by the process of the invention applied in a vehicle in which the filter dye dispersion is substantially insoluble.

In photographic elements, the filter dye dispersions prepared as described herein can be located in any layer of the element in which it is appropriate to attenuate the transmission of light of a given wavelength, such as filter dye interlayers and antihalation layers, for example.

Any amount of the filter dye dispersions prepared by the invention effective for their function as a photographic filter dye can be incorporated into a photographic element. Useful amounts of dispersion which can be incorporated range from about 0.01 to about 10.7 $g/m^2$ in a given layer. Preferably, the filter dye dispersion particle size should be less than about 1000 nm, more preferably less than about 100 nm. Small particles having sizes of 5 nm or less are most preferred.

Any suitable support can be used in the photographic elements. Some such suitable supports include cellulose esters such as, for example, cellulose triacetate, cellulose diacetate, and the like; polyesters of dibasic aromatic carboxylic acids with divalent alcohols such as, for example, poly(ethylene terephthalate); paper, polymer-coated paper, and the like.

The radiation-sensitive layer of photographic elements containing dispersions precipitated in accordance with the invention can contain any suitable radiation-sensitive material such as, for example, silver halide or other light sensitive silver salts. Silver halide is preferred. Silver halide emulsions can contain silver bromide, silver chloride, silver iodide, silver chloroiodide, silver chlorobromide, silver bromoiodide, and the like and mixtures thereof. The radiation-sensitive emulsion layer can include coarse, medium, or fine silver halide grains bounded by 100, 111, or 110 crystal planes. Also useful are tabular grain silver halide emulsions.

The radiation-sensitive materials of the photographic elements can be sensitized to a particular wavelength range such as the red, blue, or green portions of the visible spectrum, or to other wavelength ranges as desired such as, for example, ultraviolet, infrared, X-ray, and the like. Sensitization of silver halide can be accomplished with chemical sensitizers such as gold compounds, iridium compounds, or other metal compounds, or with spectral sensitizing dyes such as cyanine dyes, merocyanine dyes, or other known spectral sensitizers.

Multicolor photographic elements generally comprise a blue-sensitive silver halide layer having a cyan color-forming coupler associated therewith. Any suitable color photographic elements and color-forming couplers can be used.

Photographic elements may comprise any suitable type and number of layers such as, for example, overcoat layers, interlayers, barrier layers, antistatic layers, antihalation layers, and the like. The elements can also contain any suitable additives such as for example, optical brighteners, antifoggants, image stabilizers, light-absorbing materials such as filter layers of intergrain absorbers, light-scattering materials, gelatin hardeners, oxidized developer scavengers, plasticizers, lubricants, matting agents, development-inhibitor releasing couplers, bleach accelerator-releasing couplers, and the like and mixtures thereof.

When exposed, the photographic elements can be processed to produce an image. During processing, the microprecipitated filter dye dispersions prepared in accordance with the invention will generally be solubilized and undergo a sequence of dissolution and bleaching reactions in which any filter dye remaining in the photographic element is decolorized.

The photographic elements can be processed by any suitable method, preferably including a high pH and a nucleophile such as a sulfite or metabisulfite. A negative image can be developed by color development using one or more suitable processes. A positive image can be developed by first developing with a nonchromogenic developer, then uniformly fogging the element and then developing using any suitable color forming developer or by incorporating a color forming coupler in the developer solution.

Any suitable bleaching and fixing materials can be used for that purpose. Bleach baths generally comprise an aqueous solution of an oxidizing agent such as water soluble salts and complexes of iron (III) including, for example, potassium ferricyanide, ferric chloride, ammonium or potassium salts of ferric ethylenediamine-tetraacetic acid; water soluble persulfates such as, for example, potassium, sodium and ammonium persulfate; water soluble dichromates such as, for example, potassium, sodium, lithium dichromate and the like and mixtures thereof. Fixing baths generally comprise an aqueous solution of compounds that form soluble salts with silver ions such as sodium thiosulfate, ammonium thiosulfate, potassium thiocyanate, sodium thiocyanate, thioureas, and the like and mixtures thereof.

Any of the supports, radiation-sensitive layers, sensitizers, multicolor elements, and other additives and processing procedures and materials described in U.S. Pat. Nos. 4,362,806; 4,425,426; 4,092,168; 4,855,221 and the like, for example, can also be employed.

The invention is further illustrated but is not intended to be limited by the following examples in which all parts and percentages are by weight unless otherwise specified.

EXAMPLE 1

Preparation of Fully Protonated Dye I-1

About 50 ml of acetic anhydride, 6 g (40 mmol) of ethyl orthoformate, and 6.5 g (30 mmol) of 1-(p-carboxyphenyl)-3-methyl-2-pyrazolin-5-one were combined and refluxed for about 15 minutes. The reaction mixture was then immediately chilled in ice and kept on ice for about 30 minutes, filtered, washed with methanol, and dried to yield about 6.3 g of a golden yellow powder ($\lambda_{max}$=430 nm). The powder was recrystallized from about 150 ml refluxing acetic anhydride, washed with methanol, washed with ligroin, and dried in a vacuum oven to yield about 3.2 g of product.

Microprecipitation

An aqueous stock solution of about 3.7% (w/w) of Dye I-1 was prepared by slurrying about 6.9 g of the fully protonated dye in about 120 ml of distilled water and metering in about 20 ml of 2N aqueous NaOH to give a final pH of about 9. The solution was filtered and stored until precipitated.

Double jet precipitation was carded out in pH-stat mode using a reactor configured as described in FIG. 1. The pH monitoring, pH-stat control, acid addition, and dye stock solution addition were accomplished using a REC80 Servograph, a TTT80 Titrator, a PHM63 Digital pH meter, and two ABU80 Autoburettes (Radiometer, Copenhagen). A 2-cm diameter disk stirrer of the type illustrated in FIG. 1 was used. Stirring rate was increased linearly from about 1500 rpm to about 3000 rpm over the first 75% of dye addition and held at about 3000 rpm thereafter. The 75 ml reactor was initially charged with a dispersant solution, 50 g total weight, comprising about 330 mg of 30% dispersing aid DA-17, 41 g water and 9.4 g of 12.5% (w/w) gelatin. The jacketed reactor temperature was maintained at about 40° C. over the course of the precipitation. Acidification and precipitation was done using pH-stat addition of 1N $H_2SO_4$ at pH 5.2. A total volume of about 3.9 ml of aqueous acid was added over the course of the precipitation.

Comparison Dispersion

A comparison dispersion was produced by roller milling fully protonated Dye I-1. Water (22 ml) and about 150 mg of dispersing aid DA-34 were placed in a 60 ml screw-capped bottle. About a 1 g sample of fully protonated Dye I-1 was added. Zirconium oxide (ZrO) beads (40 ml; 2-mm diameter) were added and the container with the cap tightly secured was placed in a roller mill and the contents were milled for four days. The container was removed and the contents added to about 12.5% (w/w) aqueous gelatin (8 g). The resulting mixture was placed on the roller mill for about 10 minutes to reduce foaming and the product filtered to remove the ZrO beads.

Coating and Evaluation of Dispersions

Figure 3:
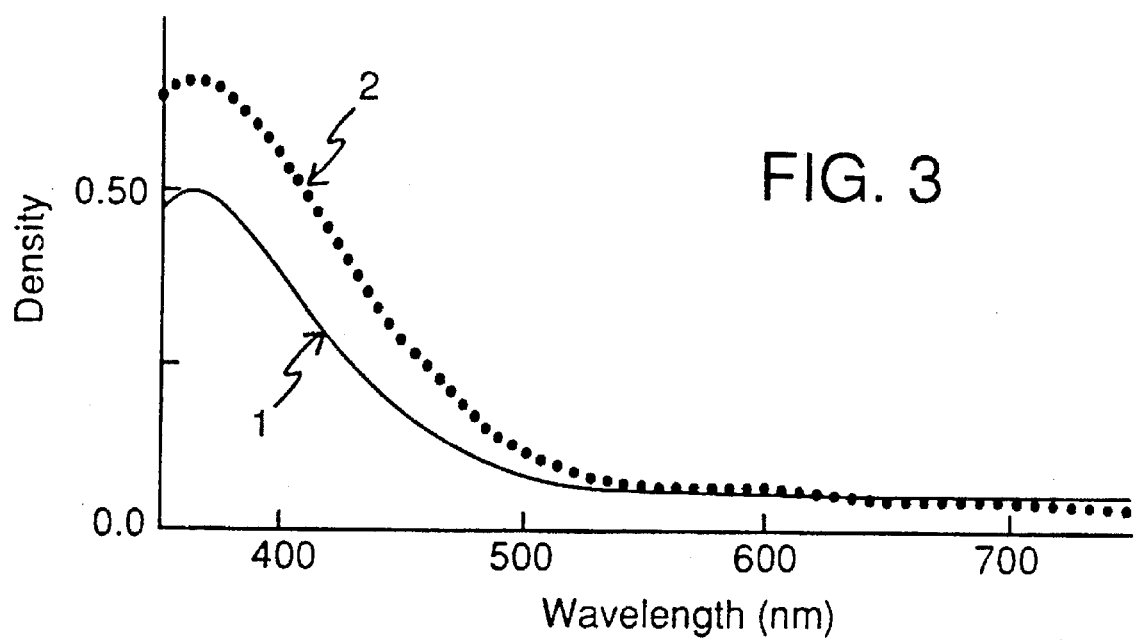

Dispersions of Dye I-1 described above were coated in a single layer format containing about 161 $g/m^2$ gelatin (hardened with bis[vinylsulfonylmethyl]ether added at a level of about 1.5% [w/w] of the total amount of gelatin) at Dye I-1 coating coverages of about 157 $mg/m^2$ (comparison) and 118 $mg/m^2$ (microprecipitated dispersion of Dye I-1). Coating melts were adjusted to pH 5.2 before coating. The absorption envelopes obtained for the dispersions are illustrated in FIG. 3. Both dispersions had comparable covering powers, CP, of 0.0042 (CP=absorption density at wavelength of maximum absorption divided by coated coverage of dye in $mg/m^2$). Microscopic evaluation of the coatings indicated that the precipitated dispersion of the invention had smaller particles than the comparison dispersion. The smaller size lead to faster washout rates when the dyes are removed from film layers in alkaline development.

EXAMPLE 2

Preparation of Fully Protonated Dye III-2

The intermediate 5-methylsulfonamido-2-methylbenzoxazole (i-1) was synthesized by stirring a solution of 5-amino-2-methylbenzoxazole (14.8 g, 0.1 mol) in 50 ml pyridine, cooled to 0° C. for the addition of 12.5 g (0.11 mol) of methane sulfonyl chloride, for 3 days under nitrogen at room temperature. A tan precipitate formed and the crude reaction mixture was poured into 800 ml of ligroin and stirred for 2 hours. The tan precipitate which formed was filtered off and washed with ligroin. The crude product was dissolved in 400 ml methylene chloride and washed four times with 100 ml water. The wash water was back extracted with about 100 ml of methylene chloride. The organic layers were combined and dried over magnesium surf ate, filtered, and concentrated in vacuo to a tan brown solid. The solid was dissolved in about 12.5 ml of hot methanol to which was added about 25 ml isopropyl alcohol. The solution was chilled at about 2° C. overnight, filtered, washed with isopropanol, washed with ether, and air dried to yield about 15.2 g of i-1 (mp: 148°–152° C.).

The ethyl iodide quaternary salt of i-1, designated as intermediate i-2, was prepared by combining about 4.52 g i-1 (20 mmol) with about 4.4 g (22 mmol) of ethyl p-toluenesulfonate in a large test tube and heating over a hot air gun with manual stirring for about 5 minutes. A brownish melt formed which solidified to a glass on cooling to room temperature. The glass was dissolved in about 50 ml of hot methanol, diluted with about 100 ml of hot ethanol, and about 9 g (24 mmol) of tetrabutylammonium iodide dissolved in about 20 ml ethanol were added. The brown, clear solution that formed was cooled to room temperature and then cooled in ice for about 4 hours. Filtration of the resulting crystalline product gave about 5.92 g of off-white crystals of i-2 (mp: 188°–194° C.).

Another intermediate, i-3, the 2-diphenylformamidine derivative of i-2 was prepared by combining about 1 g i-2 with about 2.2 g of diphenylformamidine and heating over a hot air gun with manual stirring until a yellow-orange color formed. The reaction mixture was then heated for about 1 minute at full heat until it became totally liquid. On cooling to room temperature the reaction solidified. The solid was dissolved in about 20 ml hot acetone, poured into about 100 ml ether with stirring, stirred for about 1 hour, filtered, and washed with ether to give about 1.2 g of i-3 orange powder ($\lambda_{max}$=385 nm).

Dye III-2 was synthesized by combining about 3.8 g (7.8 mmol) of i-3 with about 20 ml ethanol in a large test tube and manually stirring. To this reaction mixture was added about 1.08 g (1.03 ml; 0.01 mol) acetic anhydride and about 1.5 ml of triethylamine (1.1 g; 0.011 mol). The reaction mixture was heated for about 2 minutes, stirred without heating for about 5 minutes, cooled to room temperature, diluted with about 20 ml of isopropanol, filtered, washed with about 50 ml of isopropanol, washed with about 50 ml ether, and air dried to give about 3 g of orange-brown powder. A broad band with $\lambda_{max}$=446 nm in methanol was observed. This material was recrystallized by dissolving it in about 75 ml of hot cyclohexanone, diluting with about 200 ml isopropanol, storing overnight at about 2° C., filtering, washing with ether, and air drying to yield about 2.4 g product. A trace of cationic impurity was observed in an ionogram. The dye was dissolved in cyclohexanone and passed through a column of Amberlyst-15. The dye precipitated with hexane and was air dried to yield about 2.2 g product.

Microprecipitation

A stock solution of about 1% (w/w) of Dye III-2 was prepared by dissolving about 0.56 g of fully protonated Dye III-2 in about 56 g of a 30/70 volume ratio mixture of isopropanol and pH 10 phthalate buffer (VWR). The solution was filtered and stored until precipitated.

Double jet precipitation was carded out in the pH-stat mode using a reactor configured as in FIG. 1 and described above in Example 1. The reactor was initially charged with an aqueous dispersant solution 50 g in total weight and comprising about 300 mg of dispersing aid DA-29 (with a approximately equal to c approximately equal to 132 and b approximately equal to 51; m.w. about 14600). The initial pH of the dispersant solution was 7.8. The jacketed reactor temperature was maintained at about 22° C. over the course of the precipitation. A total volume of about 20 ml of dye stock solution was added to the reactor at a constant flow rate of about 1 ml/min. Acidification and precipitation was carried out using pH-stat addition of 2N $H_2SO_4$ at pH 6. A total volume of about 0.88 ml of aqueous acid was added over the course of the precipitation.

Comparison Dispersion

A comparison dispersion was prepared by roller milling fully protonated Dye III-2. About 82.6 g water and about 7.4 g of an approximately 6.7% solution of dispersing aid DA-33 were placed in a one pint screw-capped jar and the solution pH was adjusted to 4.5. A 10 g sample of Dye III-2 was added. Zirconium oxide (ZrO) beads (220 ml; 1.8 mm diameter) were added and the container with the cap tightly secured was placed in a roller mill and the contents milled for twelve days. The container was removed and a 4% (w/w) aqueous gelatin (100 g) solution was added to the slurry. This new mixture was placed on the roller mill for about 20 minutes to reduce foaming, and the resulting mixture was filtered to remove the ZrO beads.

Coating and Evaluation of Dispersions

Figure 4:
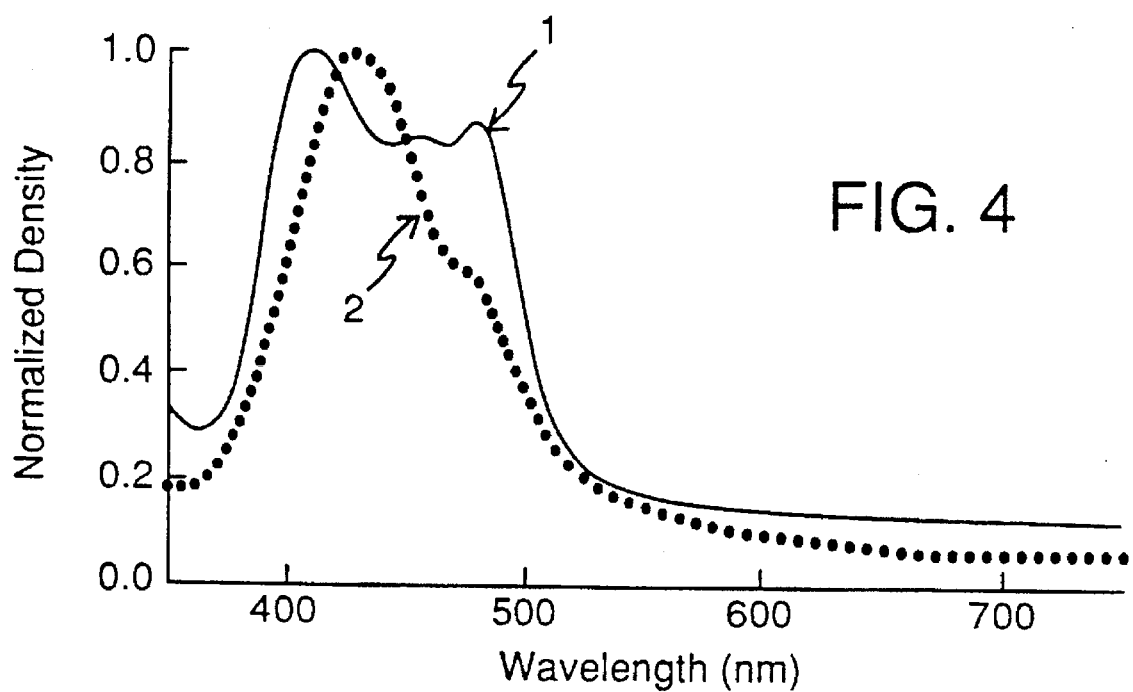

Dispersions of Dye III-2 prepared as described above were coated in a single layer format containing 1.61 g/m² of gelatin (hardened with bis[vinylsulfonylmethyl]ether, added at about 1.5% (w/w) of the total amount of gelatin) at Dye III-2 coverages of about 227 mg/m² (comparison dispersion) and about 91 mg/m² (process of the invention). Absorption envelopes obtained for the dispersions are shown in FIG. 4. Visible spectra of coated dispersions of Dye III-2 prepared by the process of the invention (Curve 1) and by roller milling (Curve 2) are shown. The spectra have been scaled so that they have the same height. The respective $D_{max}$ measured were 0.54 at 410 nm and 1.69 at 427 nm for Curve 1 and Curve 2, respectively.

The comparison dispersion had a coated covering power (CP as defined above) of 0.007 and the dispersion prepared by the process of the invention had a CP of 0.006. Clearly, the absorption envelope obtained by the process of the invention results in more of a "square wave" absorption providing more uniform fight absorption over a wider range of wavelength. Further, a more sharply cutting absorption edge on the long wavelength side of the absorption band is provided.

EXAMPLE 3

Preparation of Fully Protonated Dye VI-2

1-(3,5-Dicarboxyphenyl)-3-methyl-2-pyrazolidone (about 5.2 g) was combined with about 9.5 g acetanilidovinylbenzoxazolium iodide, 6 g triethylamine, and 100 ml ethanol and refluxed. After about 30 a dark orange precipitate formed. The mixture was cooled to room temperature, diluted with about 150 ml water and 5 ml glacial acetic acid were added with rapid stirring. The orange precipitate was filtered, washed with about 100 ml water and dried. The product was slurried in about 300 ml refluxing methanol, allowed to cool to room temperature and stirred for an additional 20 minutes. The solid was filtered, washed with about 200 ml methanol and dried to yield about 7.6 g of Dye VI-2. The wavelength maximum in methanol and triethylamine was 452 nm, $\epsilon=7.19\times10^4$, m.p.=310° C.

Microprecipitation

A stock solution of about 1.9% (w/w) of Dye VI-2 was prepared by dissolving about 2 g of fully protonated dye in water by adding 2N NaOH dropwise; the pH of the stock solution was about 7.5.

Double jet precipitation was carried out in the pH-stat mode using the reactor described in Example 1 configured as in FIG. 1. The reactor was charged initially with about 46 g total weight of a dispersant solution comprising about 15 g of polyvinyl alcohol (m.w. ranging from about 15,000 to about 30,000) and distilled water and the initial pH of 5.93 was adjusted to about 5 with the acid feed stock. The jacketed reactor temperature was maintained at about 24° C. during precipitation. A total volume of about 40.5 ml of dye stock solution was added to the reactor at a constant flow rate of about 1 ml/min. Acidification and precipitation was completed using pH-stat addition of 2N sulfuric acid at pH 5. A total volume of about 2.13 ml of aqueous acid was added over the course of the precipitation.

Comparison Dispersion

A comparison dispersion was prepared by roller milling fully protonated Dye VI-2. About 22 ml water and about 2.7 g of a 6.7% solution of dispersing aid DA-33 were placed in a 60 ml screw-capped bottle. A 1 g sample of Dye VI-2 was added to this solution. ZrO beads (40 ml; 2 mm diameter) were added and the container with the cap tightly secured was placed in a roller mill and the contents were milled for four days. The container was removed and the contents added to 12.5% (w/w) aqueous gelatin (8 g). The resulting mixture was placed on the roller mill for about 10 minutes to reduce foaming and then filtered to remove the ZrO beads.

Coating and Evaluation of Dispersions

Figure 5:
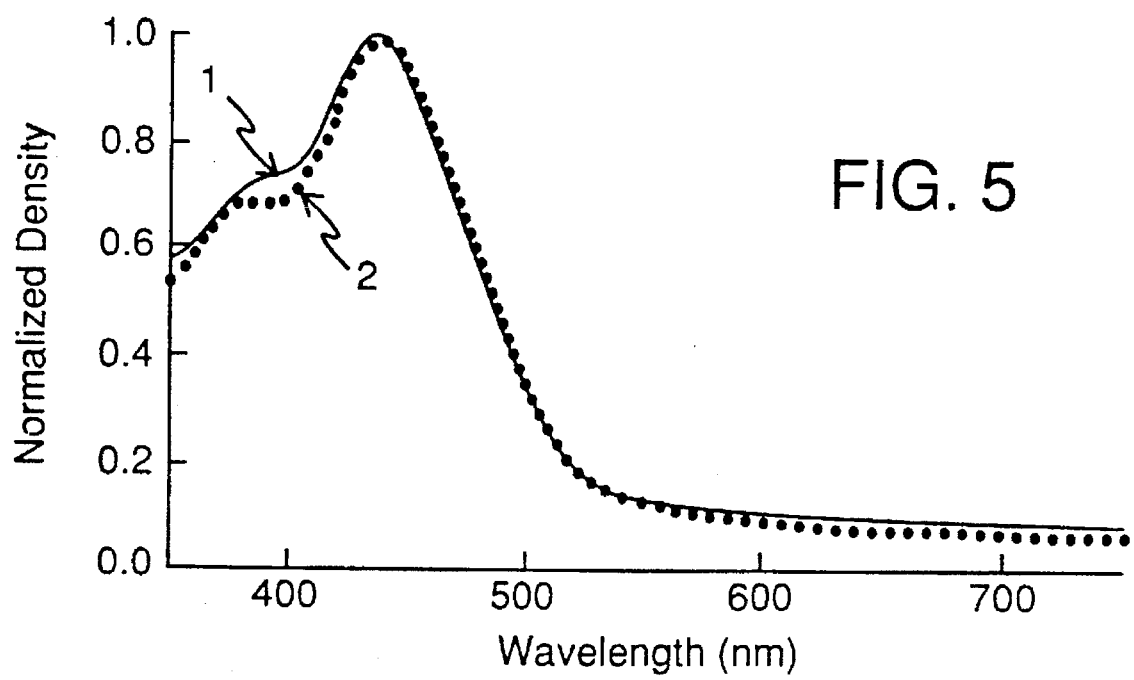

Dispersions of Dye VI-2 prepared as described above were coated in a single layer format containing 1.61 g/m² of gelatin (hardened with bis[vinylsulfonylmethyl]ether, added at about 1.5% (w/w) of the total amount of gelatin) at Dye VI-2 coverages of about 320 mg/m² (comparison dispersion) and about 107 mg/m² (process of the invention). Absorption envelopes obtained for the dispersions are shown in FIG. 5 which shows that equivalent absorption envelopes are obtained. However, the process of the invention is much faster, requiring less than about two hours to complete from start to finish. The comparison process requires four to five days to complete.

Visible spectra of coated dispersions of Dye VI-2 prepared by the process of the invention (Curve 1) and by roller milling (Curve 2) are shown in FIG. 5. The spectra have been scaled so that they have the same height. The respective $D_{max}$ measured were 0.66 at 437 nm and 1.72 at 440 nm for Curve 1 and Curve 2, respectively.

EXAMPLE 4

Preparation of Fully Protonated Dye IV-1

The intermediate, isopropyl-2-bromoacetate (i-4), was synthesized by placing 60.5 g (63 ml; 0.5 mol) of N,N-dimethylaniline, 30 g (38.2 ml; 0.5 mol) isopropyl alcohol, and 100 ml of anhydrous ether in a 3-necked 500 ml flask equipped with a mechanical stirrer, an addition funnel, thermometer, and nitrogen inlet tube to insure dryness. The mixture was cooled in an ice bath and 100.5 g (43.3 ml; 0.5 mol) of bromoacetylbromide was added dropwise such that the temperature was kept below 10° C. This addition required about 1½ hours. The ice bath was removed and the mixture stirred at room temperature for about 2 hours, after which about 100 ml of water was added. The layers were separated and the water layer was extracted twice with ether. The combined ether portions were washed with 50 ml water, with 50 ml 10% (v/v) sulfuric acid, with 30 ml 10% (v/v) sulfuric acid, and with 30 ml water. The ether solution was dried over sodium sulfate. The ether was then removed at 40° C. under vacuum on a rotary evaporator to give 87.9 g of the desired intermediate, i-4, a colorless oil (a lachrymator).

A second intermediate, i-5, N,N-di(isopropyl-2-acetyl)-m-toluidine was prepared by stirring a mixture of 5.3 g m-toluidine, 18 g i-4, 7 g potassium carbonate, 50 ml isopropyl alcohol, and 5 ml water at room temperature for about 2 hours and then heating overnight (about 16 hours) at reflux. The solvent was removed on a rotary evaporator at about 50° C. (under aspirator vacuum) and the residue was dissolved in ether and decanted from the salts. The ether solution was then removed on a rotary evaporator at about 60° C. to yield about 13.5 g of desired product, i-5, a colorless oil.

A third intermediate, i-6, the ortho-aldehyde derivative of i-5, was prepared by adding about 4.3 ml of $POCl_3$ dropwise to about 20 ml of dry dimethylformamide in a 100-ml flask stirred in an ice bath. To this mixture was then added about 13.4 g (0.044 mol) of i-5 dropwise and the resulting solution was stirred at room temperature for about 30 minutes and then heated over a steam bath for about 2 hours. The hot mixture was poured into about 100 ml of saturated sodium acetate and stirred for about 15 minutes. This mixture was cooled in an ice bath and stirred until the product solidified; about 30 ml water was added. The solid was collected, washed with water, and recrystallized from about 50 ml of isopropyl alcohol to yield about 7.5 g of i-6, a white solid (mp: 71°–72° C.).

The final dye was prepared by forming a mixture of about 0.9 g of i-6, 0.6 g of cyanoaceto-4-(methylsulfonamido) phenone, 20 ml isopropyl alcohol, and 0.05 g piperidine acetate and heating this mixture at reflux for about 2 hours. During the last 15 min, 1 g charcoal was added. The hot mixture was filtered through Celite. The desired product crystallized from this filtrate as the filtrate was allowed to cool. The product was collected and washed with isopropyl alcohol and then with ether, and then dried to give about 0.85 g of product. This product was then recrystallized from isopropanol (mp: 130°–121° C.; $\epsilon=41,600$ at $\lambda_{max}=420$ nm in acetonitrile).

Microprecipitation

A stock solution of about 4.4% (w/w) of Dye IV-1 in ethanol (76.5%) and water (18.9%) was prepared by dissolving about 5 g of fully protonated dye in about 83 g ethanol and 20 g water with the addition of about 54 drops of 4N NaOH. The pH of the stock solution was about 10.4. An acidification stock solution was prepared containing about 3% (w/w) aqueous gelatin, 0.04M acetic acid, 0.1M sodium acetate and was 0.1% (w/w) in dispersing aid DA-17. This stock solution was maintained at about 40° C. during use.

Continuous precipitation was carried out using a reactor configured as shown in FIG. 2(a). The reactor utilized a T-mixer having $i_1$, $i_2$, and $i_3$ dimensions (FIG. 2(b)) of about 0.0625", 0.125", and 0.125", respectively. The acidification stock solution was pumped into the reactor at a flow rate of about 80 ml/min and the dye stock solution was pumped into the reactor at a flow rate of 10 ml/min. The product dispersion was collected, maintained at 40° C., sonicated, and immediately coated for evaluation. Sonication was done using a Heat Systems-Ultrasonics, Inc. W-385 Sonicator with a ½"-diameter probe. The probe was placed in the dispersion and ultrasonic power was applied for 60" using Output Control setting No. 6.

Comparison Dispersion

A comparison dispersion was prepared by roller milling fully protonated Dye IV-1. About 22 ml water and about 2.7 g of a 6.7% solution of dispersing aid DA-33 was placed in a 60 ml screw-capped bottle. A 1 g sample of Dye IV-1 was added to this solution. ZrO beads (40 ml; 2-mm diameter) were added and the container with the cap tightly secured was placed in a roller mill and the contents were milled for four days. The container was removed and the contents added to 12.5% (w/w) aqueous gelatin (8 g). The resulting mixture was placed on the roller mill for about 10 minutes to reduce foaming and then filtered to remove the ZrO beads.

Coating and Evaluation of Dispersions

Figure 6:
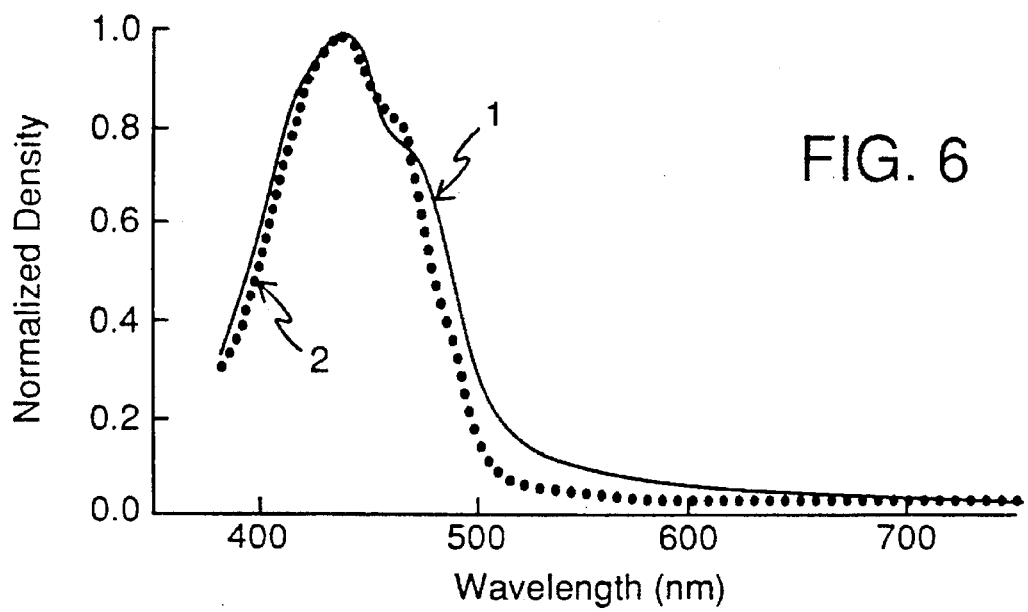

Dispersions of Dye IV-1 prepared as described above were coated in a single layer format containing 1.61 g/m² of gelatin (hardened with bis[vinylsulfonylmethyl]ether, added at about 1.5% (w/w) of the total amount of gelatin) at Dye IV-1 coverages of about 161 mg/m² (comparison dispersion) and about 157 mg/m² (process of the invention). Absorption envelopes obtained for the dispersions are shown in FIG. 6 where it is seen that similar absorption envelopes are obtained by the comparison process and the process of the invention. (The visible spectra of coated microprecipitated dispersions of Dye IV-1 (Curve 1) and the comparison dispersion (Curve 2) shown in FIG. 6 have been scaled so that they have the same height. The respective $D_{max}$ measured were 0.66 at 437 nm and 1.72 at 440 nm for Curve 1 and Curve 2, respectively.) However, the microprecipitated dispersion of the invention yields an absorption band that cuts further into the long wavelength region than the comparison dispersion. The dispersion of this invention yielded CP=0.093 and that of the comparison dispersion yielded a CP=0.057.

EXAMPLES 5–44

Preparation of Fully Protonated Dye I-5

About 100 ml ethanol, about 10 ml triethylamine, about 5.7 g (20 mmol) glutacondialdehyde dianilhydrochloride, and about 8.7 g (40 mmol) of 1-(p-carboxyphenyl)-3-methyl-1-pyrazolin-5-one were combined and heated at reflux for about 10 minutes before being chilled in ice. No precipitate formed after 30 minutes. The blue solution was diluted with an additional 200 ml of ethanol and the cold solution stirred rapidly as concentrated HCl was added over about 30 seconds. A precipitate formed immediately. The resulting slurry was stirred for about 30 minutes, filtered, washed with ethanol, ligroin, and sucked dry to give about 9.6 g of black powder ($\lambda_{max}$ 625 nm in methanol). This crude dye was dissolved in about 100 ml ethanol and 5 ml triethylamine (3.7 g; 35 mmol) with refluxing. About 8.5 g NaI (54 mmol) dissolved in about 40 ml methanol was added and allowed to cool until just warm with stirring. The resulting solution was then filtered to collect solids and washed with 100 ml ethanol, 50 ml methanol, and dried to yield about 8.3 g dye. The resulting intermediate product (7.3 g) was pulverized to a fine powder, refluxed with about 150 ml of methanol for about 30 minutes, and then filtered while hot and sucked dry overnight to yield about 6.9 g of intermediate product. This dye intermediate was dissolved in about 300 ml of methanol and 10 ml triethylamine at reflux. To this solution was then added about 100 ml water and about 10 ml concentrated HCl. The resulting slurry was stirred for about 10 minutes, filtered while hot, washed with ethanol, methanol, diethylether, and dried to yield 5.32 g of fully protonated Dye I-5.

Comparison Dispersion of Dye I-5

A comparison dispersion, produced by roller milling according to the methods described herein was prepared of fully protonated Dye I-5.

Preparation of Fully Protonated Dye II-5

A slurry of 1-(4-carboxyphenyl)-3-methyl-2-pyrazolin-5-one (21.8 g, 0.1 mol), 4-dimethylaminobenzaldehyde (14.9 g, 0.1 mol), and about 250 ml ethanol was heated at reflux for about two hours. The reaction mixture was cooled to room temperature and a crude orange product was isolated by filtration. The product was washed with ether, dried, and purified by slurrying in about 700 ml of ethanol at refluxing temperature and filtering to recover the dye. The purification treatment was repeated. The melting point of the product was above 310° C. NMR and IR spectra were consistent with the structure assigned. The C, H, and N elemental analyses confirmed the empirical formula.

Dispersion of Dye II-25

A solid particle dispersion was produced by roller milling fully protonated Dye II-25. Water (22 ml) and 2.65 g of a 6.7% solution of dispersing aid DA-33 were placed in a 60 ml screw-capped bottle. A 1 g sample of Dye II-25 was added to this solution. Zirconium oxide (ZrO) beads (40 ml; 2 mm diameter) were added and the container with the cap tightly secured was placed in a roller mill and the contents were milled for four days. The container was removed and the contents added to 12.5% (w/w) aqueous gelatin (8.0 g). This new mixture was placed on the roller mill for 10 minutes to reduce foaming, and the resulting mixture was then filtered to remove the ZrO beads.

Precipitation (Examples 6–43)

A Dye I-5 stock solution was prepared by slurrying about 64 g of fully protonated Dye I-5 in about 500 g water. The slurry was stirred while 4N aqueous NaOH was added with pH-stat control at pH 9. The final dye concentration was 8%.

Precipitation and coating preparation were achieved simultaneously using a stainless steel reactor as described herein having a volume of about one liter. The reactor was placed in a constant temperature bath maintained at about 46° C. throughout precipitation and coating preparation.

Initially, about 188 g of a 10% (w/w) gelatin stock solution was added to the reactor with stirring at the rates indicated in Table IX. A 1.5" diameter marine propellar type stirrer was used.

About 1.9 ml of a 10% (w/w) solution of dispersing aid DA-5 was added followed by about 1.3 ml $KNO_3$ solution (220 g $KNO_3$/filter) and then by the addition of about 200 ml of water. The solution was heated to a temperature of 46° C. and the pH recorded (Table IX, pH #1). Thereafter, a given quantity of Dye I-5 stock solution (see Table IX for amount) was added, in the case of Examples 6–43, or, in the case of Examples 5 and 44, a given amount of comparison dispersion of Dye I-5 was added. In the case of Examples 6–43, a given quantity (see Table IX for amount) of 0.2N $H_2SO_4$ solution was added to precipitate the Dye I-5 dispersion (see Table IX for stirring speed in rpm). The slurry was then held at 46° C. for 12.5–20 minutes (hold #1; see Table IX), and the pH was then recorded (pH #2). The pH was then adjusted to 5.2±0.2 (pH #3; see Table IX for set value). Thereafter, 5.1 to 5.7 g of the yellow Dye II-25 dispersion was added (see Table IX for quantity), and held with stirring for an additional time period (hold #2; see Table IX). Water was added to bring the total slurry (melt) weight to 746.2 g.

Comparison Melts (Examples 5 and 44)

These melts were prepared as described above in the precipitations, except that the comparison dispersion of Dye I-5 was added in place of Dye I-5 stock solution. The chief differences are indicated in the entries for coatings 1 and 40 in Table IX. The amount of Dye II-25 added to these comparison melts was about 10% more than the average amount added in the precipitated melts.

Coating and Evaluation of Dispersions

Figure 7:
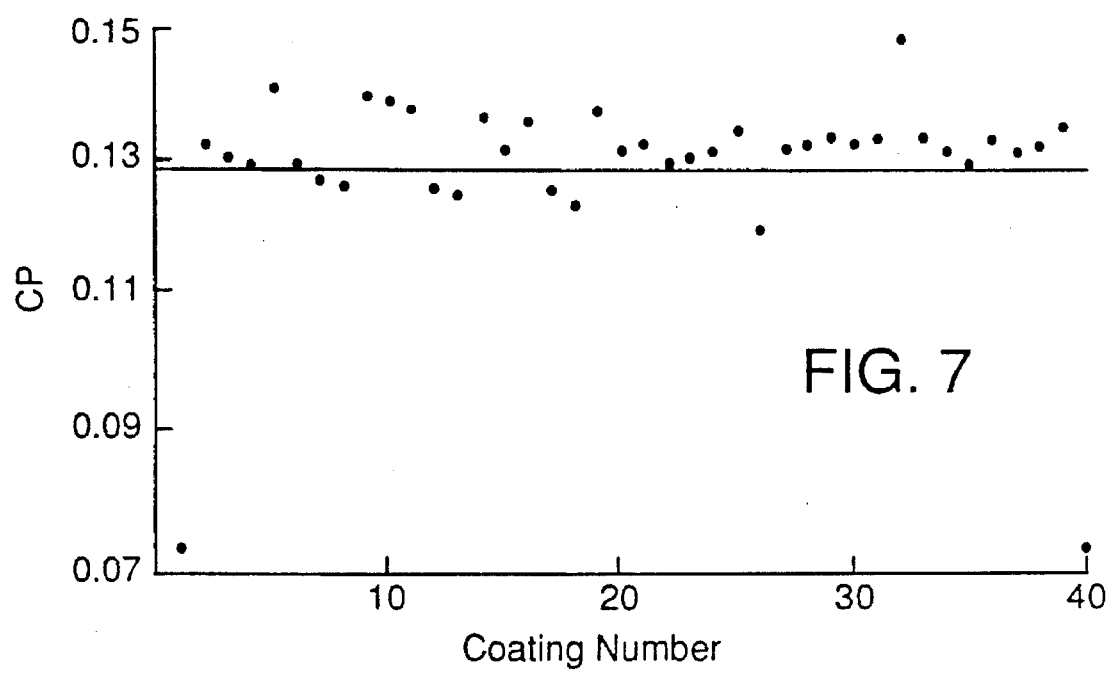
FIG. 7 compares covering power at 640 nm for the coatings of Examples 5–44.

Dispersions of Dye I-5 described above were coated in a single layer format containing about 1.61 g/m$^2$ gelatin (hardened with bis[vinylsulfonylmethyl]ether at about 1.5% [w/w] of total gelatin) at dye coating coverages ranging from about 72.4 to 84.9 mg/m$^2$ (comparison dispersion) and 68.7 to 79.8 mg/m$^2$ (dispersion prepared by the process of the invention). The corresponding CP values, determined at 640 nm from the coating optical densities and Dye I-5 coverages in mg/m$^2$, obtained for these coatings are illustrated in FIG. 7 and Table X. As FIG. 7 shows, the comparison coatings have a significantly lower CP than the coatings of microprecipitated dispersions prepared by the process of the invention.

The absorption envelopes obtained for coatings of these dispersions are illustrated in FIG. 8. Curves 1 (dotted) and 2 (solid line) represent the bounds on the coatings obtained with microprecipitated Dye I-5 dispersions of the invention (range of visible spectra obtained for coatings 2–39 corresponding to Examples 6–43). Curves 3 (solid line) and 4 (dotted) are the spectra obtained for comparison dispersion coatings 1 and 40, respectively (Examples 5 and 44).

It is clear that the process of the invention is robust with respect to reasonably large fluctuations in added acid and stirring speed. Moreover, it is clear that the coated dispersions of this invention yield significantly higher covering power than the comparison dispersions of Dye I-5.

Although the invention has been described in considerable detail in the foregoing, it is to be understood that such detail is solely for the purpose of illustration and that variations may be made without departing from the spirit and scope of the invention except as set forth in the claims.

TABLE IX

| Example No. | Ctg. No.[a] | pH No. 1 | Dye I-5 Stock (g) | RPM[b] | 0.2 N $H_2SO_4$ (ml) | Hold No. 1 (min) | pH No. 2 | pH No. 3 | Dye II-5 Stock (g) | Hold No. 2 (min) |
|---|---|---|---|---|---|---|---|---|---|---|
| 5 | 1 | 5.72 | 46.64 | 635 | 30 | 5 | 4.56 | 5.3 | 6.22 | 5 |
| 6 | 2 | 5.71 | 10.89 | 635 | 30 | 15 | 5.19 | 5.2 | 5.4 | 3 |
| 7 | 3 | 5.72 | 10.39 | 818 | 31.5 | 17.5 | 5.07 | 5.0 | 5.65 | 2 |
| 8 | 4 | 5.72 | 10.39 | 818 | 28.5 | 12.5 | 5.19 | 5.0 | 5.65 | 4 |
| 9 | 5 | 5.71 | 10.39 | 818 | 31.5 | 12.5 | 5.08 | 5.4 | 5.15 | 4 |
| 10 | 6 | 5.72 | 10.39 | 452 | 31.5 | 17.5 | 5.09 | 5.0 | 5.15 | 4 |
| 11 | 7 | 5.71 | 11.43 | 452 | 28.5 | 17.5 | 5.29 | 5.0 | 5.65 | 2 |

TABLE IX-continued

| Example No. | Ctg. No.[a] | pH No. 1 | Dye I-5 Stock (g) | RPM[b] | 0.2 N H$_2$SO$_4$ (ml) | Hold No. 1 (min) | pH No. 2 | pH No. 3 | Dye II-5 Stock (g) | Hold No. 2 (min) |
|---|---|---|---|---|---|---|---|---|---|---|
| 12 | 8 | 5.71 | 11.43 | 818 | 28.5 | 17.5 | 5.27 | 5.0 | 5.15 | 4 |
| 13 | 9 | 5.71 | 11.43 | 452 | 31.5 | 17.5 | 5.19 | 5.4 | 5.15 | 2 |
| 14 | 10 | 5.70 | 11.43 | 818 | 28.5 | 12.5 | 5.27 | 5.4 | 5.65 | 2 |
| 15 | 11 | 5.71 | 11.43 | 452 | 28.5 | 12.5 | 5.26 | 5.4 | 5.15 | 4 |
| 16 | 12 | 5.69 | 10.89 | 635 | 30 | 15 | 5.18 | 5.2 | 5.40 | 3 |
| 17 | 13 | 5.69 | 11.43 | 818 | 31.5 | 12.5 | 5.13 | 5.0 | 5.15 | 2 |
| 18 | 14 | 5.69 | 10.39 | 452 | 31.5 | 12.5 | 5.07 | 5.4 | 5.65 | 2 |
| 19 | 15 | 5.71 | 11.43 | 818 | 31.5 | 17.5 | 5.16 | 5.4 | 5.65 | 4 |
| 20 | 16 | 5.69 | 10.39 | 818 | 28.5 | 17.5 | 5.19 | 5.4 | 5.15 | 2 |
| 21 | 17 | 5.69 | 11.43 | 452 | 31.5 | 12.5 | 5.13 | 5.0 | 5.65 | 4 |
| 22 | 18 | 5.69 | 10.39 | 452 | 28.5 | 12.5 | 5.18 | 5.0 | 5.15 | 2 |
| 23 | 19 | 5.70 | 10.39 | 452 | 28.5 | 17.5 | 5.17 | 5.4 | 5.65 | 4 |
| 24 | 20 | 5.69 | 10.89 | 635 | 30 | 15 | 5.16 | 5.2 | 5.4 | 3 |
| 25 | 21 | 5.68 | 10.89 | 635 | 30 | 15 | 5.10 | 5.2 | 5.4 | 3 |
| 26 | 22 | 5.62 | 10.89 | 635 | 30 | 20 | 5.07 | 5.2 | 5.4 | 3 |
| 27 | 23 | 5.63 | 10.89 | 635 | 27 | 15 | 5.27 | 5.2 | 5.4 | 3 |
| 28 | 24 | 5.69 | 9.86 | 635 | 30 | 15 | 5.08 | 5.2 | 5.4 | 3 |
| 29 | 25 | 5.68 | 10.89 | 635 | 30 | 15 | 5.12 | 5.2 | 5.4 | 3 |
| 30 | 26 | 5.68 | 10.89 | 635 | 30 | 15 | 5.12 | 4.8 | 5.4 | 3 |
| 31 | 27 | 5.67 | 10.89 | 1000 | 30 | 15 | 5.13 | 5.2 | 5.4 | 3 |
| 32 | 28 | 5.68 | 10.89 | 635 | 30 | 15 | 5.12 | 5.2 | 5.9 | 3 |
| 33 | 29 | 5.67 | 10.89 | 635 | 30 | 15 | 5.12 | 5.2 | 5.4 | 5 |
| 34 | 30 | 5.65 | 10.89 | 635 | 30 | 15 | 5.12 | 5.2 | 5.4 | 3 |
| 35 | 31 | 5.66 | 10.89 | 250 | 30 | 15 | 5.11 | 5.2 | 5.4 | 3 |
| 36 | 32 | 5.66 | 10.89 | 635 | 30 | 15 | 5.12 | 5.6 | 5.4 | 3 |
| 37 | 33 | 5.65 | 10.89 | 635 | 30 | 15 | 5.10 | 5.2 | 5.4 | 3 |
| 38 | 34 | 5.66 | 11.96 | 635 | 30 | 15 | 5.21 | 5.2 | 5.4 | 3 |
| 39 | 35 | 5.67 | 10.89 | 635 | 30 | 15 | 5.10 | 5.2 | 5.4 | 1 |
| 40 | 36 | 5.65 | 10.89 | 635 | 30 | 10 | 5.10 | 5.2 | 5.4 | 3 |
| 41 | 37 | 5.67 | 10.89 | 635 | 30 | 15 | 5.10 | 5.2 | 4.9 | 3 |
| 42 | 38 | 5.66 | 10.89 | 635 | 33 | 15 | 5.01 | 5.2 | 5.4 | 3 |
| 43 | 39 | 5.66 | 10.89 | 635 | 30 | 15 | 5.10 | 5.2 | 5.4 | 3 |
| 44 | 40 | 5.72 | 46.64 | 635 | 30 | 5 | 4.56 | 5.3 | 6.22 | 5 |

[a]Coating number
[b]Stirring speed (revolutions per minute)

TABLE X

| Example No. | Coating No. | Density at 640 nm | Dye I-5 Coverage (mg/m$^2$) | CP |
|---|---|---|---|---|
| 5 | 1 | 0.580 | 84.8 | 0.0068 |
| 6 | 2 | 0.893 | 72.4 | 0.0123 |
| 7 | 3 | 0.835 | 69.2 | 0.0121 |
| 8 | 4 | 0.836 | 65.6 | 0.0120 |
| 9 | 5 | 0.939 | 71.3 | 0.0131 |
| 10 | 6 | 0.888 | 74.1 | 0.0120 |
| 11 | 7 | 0.916 | 77.2 | 0.0118 |
| 12 | 8 | 0.892 | 76.0 | 0.0117 |
| 13 | 9 | 1.001 | 76.8 | 0.0130 |
| 14 | 10 | 1.020 | 78.9 | 0.0129 |
| 15 | 11 | 1.007 | 78.6 | 0.0128 |
| 16 | 12 | 0.897 | 76.3 | 0.0117 |
| 17 | 13 | 0.911 | 78.6 | 0.0116 |
| 18 | 14 | 0.916 | 71.7 | 0.0128 |
| 19 | 15 | 0.984 | 79.8 | 0.0123 |
| 20 | 16 | 0.899 | 70.8 | 0.0127 |
| 21 | 17 | 0.906 | 77.4 | 0.0117 |
| 22 | 18 | 0.833 | 72.0 | 0.0115 |
| 23 | 19 | 0.907 | 70.6 | 0.0128 |
| 24 | 20 | 0.898 | 73.1 | 0.0123 |
| 25 | 21 | 0.926 | 74.6 | 0.0124 |
| 26 | 22 | 0.905 | 75.1 | 0.0121 |
| 27 | 23 | 0.907 | 74.6 | 0.0122 |
| 28 | 24 | 0.832 | 67.8 | 0.0123 |
| 29 | 25 | 0.918 | 73.1 | 0.0126 |
| 30 | 26 | 0.816 | 72.9 | 0.0112 |
| 31 | 27 | 0.896 | 73.1 | 0.0123 |
| 32 | 28 | 0.911 | 73.7 | 0.0124 |
| 33 | 29 | 0.941 | 75.6 | 0.0125 |
| 34 | 30 | 0.918 | 74.4 | 0.0124 |
| 35 | 31 | 0.904 | 73.1 | 0.0125 |
| 36 | 32 | 1.044 | 75.1 | 0.0139 |
| 37 | 33 | 0.931 | 74.6 | 0.0125 |
| 38 | 34 | 1.006 | 81.9 | 0.0123 |
| 39 | 35 | 0.919 | 76.0 | 0.0121 |
| 40 | 36 | 0.930 | 74.4 | 0.0125 |
| 41 | 37 | 0.908 | 73.9 | 0.0123 |
| 42 | 38 | 0.922 | 74.6 | 0.0124 |
| 43 | 39 | 0.969 | 77.0 | 0.0127 |
| 44 | 40 | 0.574 | 83.7 | 0.0069 |

What is claimed is:

1. A process for preparing microprecipitated dispersions of filter dyes which comprises preparing a concentrated slurry in aqueous medium of a filter dye having ionizable acid sites on the filter dye molecule, adding sufficient aqueous hydroxide to dissolve the filter dye, acidifying the filter dye composition in the presence of a dispersing aid with a stoichiometric mount of acidic protons to reprotonate up to 100% of the total ionizable acid sites on the dye molecule and provide a microprecipitated dispersion of the filter dye that is insoluble in aqueous media at pH values less than 3 and soluble in aqueous media at pH greater than 10.

2. The process of claim 1 wherein a dispersing aid is added to the filter dye composition prior to acidification.

3. The process of claim 2 wherein the dispersing aid is a stabilizer, dispersant, surfactant, polymeric colloid, or mixture of any of them.

4. The process of claim 1 wherein the concentrated slurry of the filter dye contains from about 0.1 to about 50 weight % of the filter dye.

5. The process of claim 4 wherein the concentrated slurry contains from about 0.1 to about 20 weight % of the filter dye.

6. The process of claim 1 wherein the aqueous medium is water or a mixture of water with a water miscible organic solvent.

7. The process of claim 6, wherein the aqueous medium is water.

8. The process of claim 6 wherein the aqueous medium is a mixture containing water and less than about 50% by volume of a water miscible solvent.

9. The process of claim 8 wherein the water miscible solvent is methanol, ethanol, isopropanol, or tetrahydrofuran.

10. The process of claim 8 wherein the mixture contains less than 10% of solvent.

11. The process of claim 1 wherein the aqueous hydroxide is an aqueous alkali metal or tetraalkylammonium hydroxide or a mixture thereof.

12. The process of claim 11 wherein the aqueous hydroxide is lithium, sodium, potassium, cesium, rubidium or tetramethylammonium hydroxide.

13. The process of claim 11 wherein the aqueous hydroxide is sodium hydroxide or potassium hydroxide.

14. The process of claim 1 wherein the addition of the hydroxide is controlled within a pH range of from about 8 to about 12.

15. The process of claim 14 wherein the addition of the hydroxide is controlled within a pH range of from about 8.5 to about 10.

16. The process of claim 1 wherein the microprecipitated filter dye has a solubility of less than about 0.05% in water at pH 5.

17. The process of claim 1 wherein the dissolved filter dye has a solubility greater than 1% in aqueous media.

18. The process of claim 1 wherein the microprecipitated filter dye has the formula

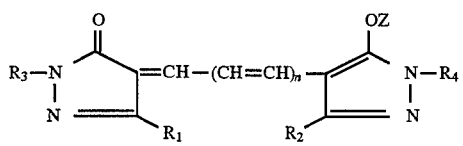

wherein n is 0, 1, or 2; $R_1$, $R_2$, $R_3$, and $R_4$ are the same or different substituted or unsubstituted alkyl, aryl, aralkyl, or alkaryl groups, one or more of $R_1$, $R_2$, $R_3$, and $R_4$ contains carboxy substituent —$CO_2^-Z^+$, wherein $Z^+$ is a mixture of hydrogen ($H^+$) and alkali or tetraalkylammonium cations ($M^+$) such that $Z^+=xH^+ + (1-x)M^+$, where x (>0) is greater than zero and less than or equal to 1.

19. The process of claim 1 wherein the microprecipitated filter dye has the formula

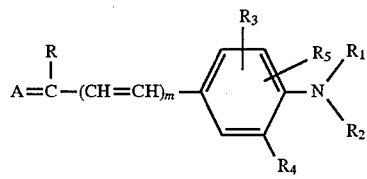

wherein A is a substituted or unsubstituted nucleus derived from a rhodanine, hydantoin, 2-thiohydantoin, 4-thiohydantoin, 2,4-oxazolidindione, 2-thio-2,4-oxazolidindione, isoxazolinone, barbituric, thiobarbituric, or indandione, the nucleus having a carboxyphenyl or sulfonamidophenyl substituent; R is hydrogen, alkyl having 1 to 4 carbon atoms, or benzyl; $R_1$ and $R_2$ are each independently alkyl or aryl or, taken together with $R_4$, $R_5$, N and the carbon atoms to which they are attached, complete a julolidinyl ring; $R_3$ is H, alkyl or aryl; $R_4$ and $R_5$ are each independently H, or $R_4$, taken together with $R_1$, or $R_5$, taken together with $R_2$, each may complete a carbocyclic ring; and m is 0 or 1.

20. The process of claim 1 wherein the microprecipitated filter dye has the formula

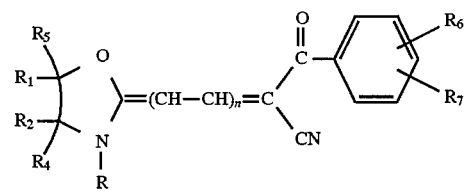

wherein n is 1 or 2; $R_1$ and $R_2$ are each independently substituted or unsubstituted alkyl or aryl or, taken together, may complete a substituted or unsubstituted 5-or 6-member ring, provided that $R_1$ is hydrogen when $R_4$ is substituted or unsubstituted alkyl; $R_3$ is substituted or unsubstituted alkyl or aryl; $R_4$ is substituted alkyl or, together with $R_5$, forms a double bond; $R_5$ is H or, together with $R_4$, forms a double bond; $R_6$ and $R_7$ are each independently H, substituted or unsubstituted alkyl, substituted or unsubstituted aryl, secondary or tertiary amine, —$CO_2H$ or —$NHSO_2R_8$, provided that at least one of $R_6$, $R_7$, or a substituent on an aryl ring in $R_3$, or on an aryl ring in $R_1$ or $R_2$, or on an aryl ring in $R_6$ or $R_7$, or on an aryl ring formed by $R_1$ and $R_2$ is —$CO_2H$ or —$NHSO_2R_8$; and $R_8$ is substituted or unsubstituted alkyl or aryl.

21. The process of claim 1 wherein the microprecipitated filter dye has the formula

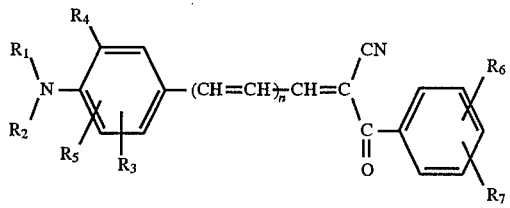

wherein n is 0 or 1; $R_1$ and $R_2$ are each independently substituted or unsubstituted alkyl or aryl or, taken together with $R_4$, $R_5$, N and the atoms to which they are attached, complete a juloyldyl ring; $R_3$ is H, substituted or unsubstituted alkyl or aryl; $R_4$ and $R_5$ are each independently H, substituted or unsubstituted alkyl, or $R_5$, taken together with $R_2$, or $R_4$, taken together with $R_1$, complete a heterocyclic ring; $R_6$ and $R_7$ are each independently H, substituted or unsubstituted alkyl or aryl, secondary or tertiary amino, —$CO_2H$, or —$NHSO_2R_8$, provided that at least one of $R_6$, $R_7$, or a substituent on an aryl ring in $R_3$, on an aryl ring in $R_6$ or $R_7$, is —$CO_2H$ or —$NHSO_2R_8$, and $R_8$ is substituted or unsubstituted alkyl or aryl.

22. The process of claim 1 wherein the microprecipitated filter dye has the formula

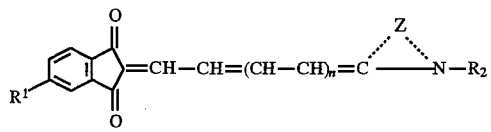

wherein n is 0 or 1; $R_1$ is —$CO_2H$ or —$NHSO_2R_2$, where $R_2$ is substituted or unsubstituted alkyl or aryl; $R_3$ is substituted or unsubstituted alkyl or aryl; Z is atoms necessary to complete a substituted or unsubstituted heterocyclic ring.

23. The process of claim 1 wherein the microprecipitated filter dye has the formula

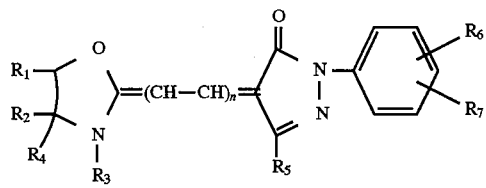

wherein n is 1 or 2; $R_1$ and $R_4$ are each independently substituted or unsubstituted alkyl or aryl or, taken together, complete a substituted or unsubstituted 5- or 6-member ring; $R_2$ is substituted or unsubstituted alkyl or part of a double bond between the ring carbon atoms to which $R_1$ and $R_4$ are attached; $R_3$ and $R_8$ are each independently substituted or unsubstituted alkyl or aryl; $R_5$ is H, substituted or unsubstituted alkyl or aryl, carboxylate, or substituted or unsubstituted acyl; $R_6$ and $R_7$ are each independently H, substituted or unsubstituted alkyl, aryl, —$CO_2H$, or —$NHSO_2R_8$, provided that at least one of the aryl rings of the molecule has at least one substituent that is —$CO_2H$ or —$NHSO_2R_8$.

24. The process of claim 1 wherein the microprecipitated filter dye has the formula

wherein D is a chromophoric light-absorbing moiety, which is an aromatic ring if y is 0; A is an aromatic ring bonded directly or indirectly to D; X is a substituent other than carboxy having an ionizable proton either on A or on an aromatic ring portion of D, having a $pK_a$ of 4 to 11 in a 50/50 mixture (volume basis) of ethanol and water; y is 0 to 4; n is 1 to 7; and the dye has a log partition coefficient of from 0 to 6 when the compound is in unionized form.

25. The process of claim 1 wherein the microprecipitated filter dye particles have a mean diameter ranging from about 3 to about 1000 nm.

26. The process of claim 25 wherein the microprecipitated filter dye particles have a mean diameter ranging from about 5 to about 100 nm.

27. A process for preparing microprecipitated dispersions of filter dyes which comprises preparing a concentrated slurry in aqueous medium of a filter dye having ionizable sites on the filter dye molecule, wherein the aqueous medium is water or a mixture of water with a water-miscible organic solvent; adding sufficient aqueous hydroxide to dissolve the filter dye, wherein the resulting dye stock solution is 0.1–50 weight % filter dye; and acidifying this filter dye solution in the presence of a dispersing aid with up to a stoichiometric amount of acidic protons to reprotonate up to 100% of the total ionizable acid sites on the filter dye molecules and provide a microprecipitated dispersion of the filter dye that is insoluble in aqueous media at pH values less than 3, soluble to an extent of less than 0.05 weight % at pH 5, and soluble in aqueous media at pH greater than 10.

28. The process of claim 1 wherein the ionizable groups are selected from hydroxyl, carboxyl, sulfonamido, and mixtures thereof.

29. The process of claim 1 wherein a dispersing aid is added to the dye slurry.

30. The process of claim 1 wherein a dispersing aid is added to the dissolved filter dye.

* * * * *